United States Patent
Nakamura et al.

(10) Patent No.: US 9,754,357 B2
(45) Date of Patent: Sep. 5, 2017

(54) IMAGE PROCESSING DEVICE, STEREOSCOOPIC DEVICE, INTEGRATED CIRCUIT, AND PROGRAM FOR DETERMINING DEPTH OF OBJECT IN REAL SPACE GENERATING HISTOGRAM FROM IMAGE OBTAINED BY FILMING REAL SPACE AND PERFORMING SMOOTHING OF HISTOGRAM

(71) Applicant: PANASONIC INTELLECTUAL PROPERTY CORPORATION OF AMERICA, Torrance, CA (US)

(72) Inventors: Tsuyoshi Nakamura, Fukuoka (JP); Tadanori Tezuka, Fukuoka (JP); Yoshiteru Tanaka, Fukuoka (JP); Masahiro Ohashi, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 555 days.

(21) Appl. No.: 14/003,084

(22) PCT Filed: Mar. 5, 2013

(86) PCT No.: PCT/JP2013/001802
§ 371 (c)(1),
(2) Date: Sep. 4, 2013

(87) PCT Pub. No.: WO2013/140776
PCT Pub. Date: Sep. 26, 2013

(65) Prior Publication Data
US 2014/0071251 A1    Mar. 13, 2014

(30) Foreign Application Priority Data
Mar. 23, 2012 (JP) .................................. 2012-066612

(51) Int. Cl.
*G06F 3/0346* (2013.01)
*G06T 5/40* (2006.01)
(Continued)

(52) U.S. Cl.
CPC ............ *G06T 5/002* (2013.01); *G06F 3/0346* (2013.01); *G06F 3/03545* (2013.01);
(Continued)

(58) Field of Classification Search
CPC ............... G06F 3/0346; G06F 3/03545; G06F 3/04815; G06T 5/002; G06T 5/40;
(Continued)

(56) References Cited

U.S. PATENT DOCUMENTS 4,991,092 A * 2/1991 Greensite ............... G06T 5/009
382/131
5,484,966 A    1/1996 Segen
(Continued)

FOREIGN PATENT DOCUMENTS

JP    6-131442    5/1994
JP    7-200158    8/1995
(Continued)

OTHER PUBLICATIONS

Bradski "Computer Vision Face Tracking for Use in a Perceptual User Interface" Intel Technology Journal, pp. 1-15, 1998.*
(Continued)

*Primary Examiner* — Mohammed Rahaman
*Assistant Examiner* — James Boylan
(74) *Attorney, Agent, or Firm* — Wenderoth, Lind & Ponack, L.L.P.

(57) ABSTRACT

A histogram generator generates a histogram that indicates a count of pixels of a designated color in association with coordinates along a basic axis of a screen, for frame image data obtained by filming a real space. A histogram smoother
(Continued)

performs smoothing of the generated histogram. A three-dimensional coordinates generator selects a value associated with particular coordinates from among the counts indicated in the smoothed histogram, and performs depth value determination for a target object using the selected value.

12 Claims, 32 Drawing Sheets

(51) Int. Cl.
- G06T 7/50 (2017.01)
- H04N 13/04 (2006.01)
- G06T 5/00 (2006.01)
- G06F 3/0481 (2013.01)
- G06F 3/0354 (2013.01)
- H04N 13/02 (2006.01)

(52) U.S. Cl.
CPC ............ *G06F 3/04815* (2013.01); *G06T 5/40* (2013.01); *H04N 13/0271* (2013.01); *H04N 13/04* (2013.01); *H04N 13/0275* (2013.01)

(58) Field of Classification Search
CPC .............. G06T 7/0051; H04N 13/0271; H04N 13/0275; H04N 13/04
USPC .............................................. 348/51; 382/154
See application file for complete search history.

(56) References Cited

U.S. PATENT DOCUMENTS

| | | | | |
|---|---|---|---|---|
| 5,521,843 A * | 5/1996 | Hashima | ................ | B25J 9/1697 340/815.54 |
| 5,748,771 A * | 5/1998 | Fujiwara | .................. | G06T 1/60 382/162 |
| 6,795,068 B1 | 9/2004 | Marks | | |
| 2002/0176001 A1 * | 11/2002 | Trajkovic | ............. | G06K 9/4652 348/169 |
| 2005/0024379 A1 | 2/2005 | Marks | | |
| 2005/0026689 A1 | 2/2005 | Marks | | |
| 2006/0126941 A1 * | 6/2006 | Higaki | ............... | G06K 9/00201 382/190 |
| 2006/0160616 A1 * | 7/2006 | Kato | ...................... | A63F 13/10 463/30 |
| 2006/0238549 A1 | 10/2006 | Marks | | |
| 2006/0239549 A1 * | 10/2006 | Kelly | ...................... | H04N 1/58 382/167 |
| 2008/0144932 A1 * | 6/2008 | Chien | .................. | G06K 9/4671 382/169 |
| 2011/0081081 A1 * | 4/2011 | Smith et al. | ....... | G06K 9/00818 382/170 |
| 2011/0085028 A1 * | 4/2011 | Samadani | .......... | G06K 9/00234 348/51 |
| 2011/0254976 A1 * | 10/2011 | Garten | .................. | G06F 3/1454 348/229.1 |
| 2012/0262558 A1 * | 10/2012 | Boger | ................ | G02B 27/0093 348/61 |
| 2013/0165205 A1 * | 6/2013 | Collette | ............. | G07F 17/3211 463/20 |

FOREIGN PATENT DOCUMENTS

| | | |
|---|---|---|
| JP | 2002-140705 | 5/2002 |
| JP | 2006-171929 | 6/2006 |
| JP | 2006-185109 | 7/2006 |

OTHER PUBLICATIONS

International Search Report issued May 7, 2013 in corresponding International Application No. PCT/JP2013/001802.

Gary R. Bradski, "Computer Vision Face Tracking for Use in a Perceptual User Interface", Intel Technology Journal, No. Q2, pp. 1-15, 1998.

\* cited by examiner

FIG. 7A

Designated colour look-up table (YCrCb Format)

| mp | Y:0~255 | Cr:0~255 | Cb:0~255 |
|---|---|---|---|
| mq | Y:0~255 | Cr:0~255 | Cb:0~255 |
| mr | Y:0~255 | Cr:0~255 | Cb:0~255 |
| ... | | | |

FIG. 7B

Y: MSB [1 1 0 0 0 *] LSB (8 7 6 5 4 3 2 1)
Cr: MSB [1 0 0 0 1 *] LSB (8 7 6 5 4 3 2 1)
Cb: MSB [0 0 1 1 1 *] LSB (8 7 6 5 4 3 2 1)

FIG. 7C

Designated colour look-up table (RGB Format)

| mp | R:0~255 | G:0~255 | B:0~255 |
|---|---|---|---|
| mq | R:0~255 | G:0~255 | B:0~255 |
| mr | R:0~255 | G:0~255 | B:0~255 |
| ... | | | |

FIG. 7D

R: MSB [1 1 0 0 0 *] LSB (8 7 6 5 4 3 2 1)
G: MSB [1 0 0 0 1 *] LSB (8 7 6 5 4 3 2 1)
B: MSB [0 0 1 1 1 *] LSB (8 7 6 5 4 3 2 1)

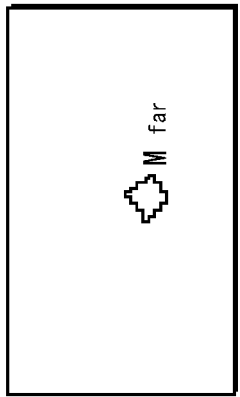
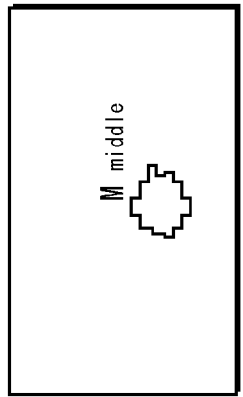
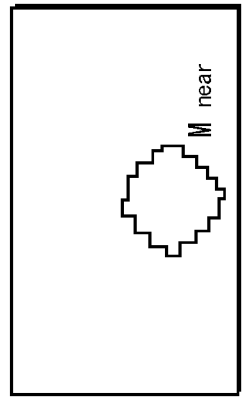
FIG. 9A
FIG. 9B
FIG. 9C

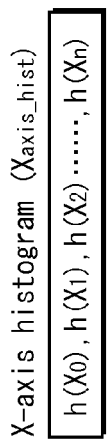
FIG. 10B
X-axis histogram (X$_{axis\_hist}$)
h(X$_0$), h(X$_1$), h(X$_2$)......, h(X$_n$)
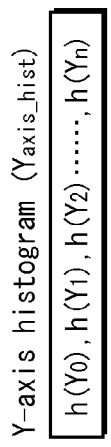
FIG. 10C
Y-axis histogram (Y$_{axis\_hist}$)
h(Y$_0$), h(Y$_1$), h(Y$_2$)......, h(Y$_n$)
FIG. 10E
$I[n] = DTFT^{-1}[H(w)]$ ··· (Math. 1)
$I[n] * x[n] = \sum_{m=0}^{M} I[m] x[n-m]$ ··· (Math. 2)
$I[n] = \begin{cases} I^n, & n \geq 0 \\ 0, & \text{otherwise} \end{cases}$ ··· (Math. 3)
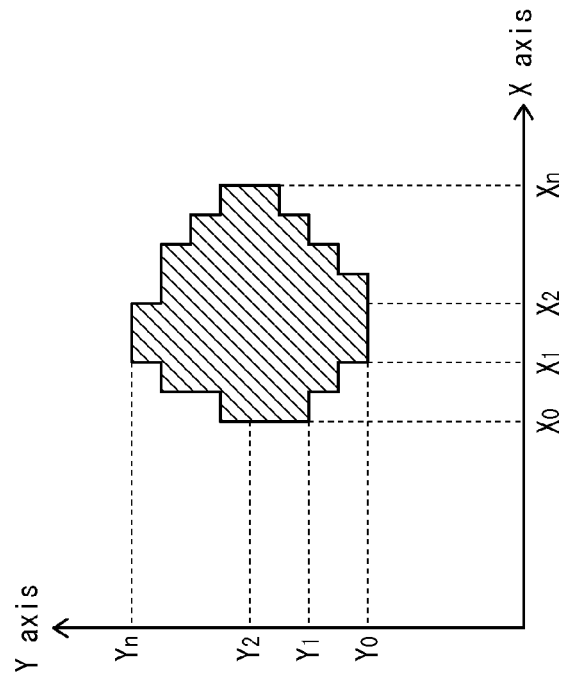
FIG. 10A
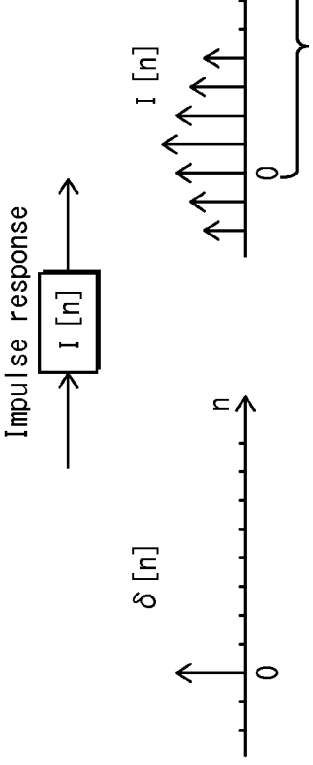
FIG. 10D

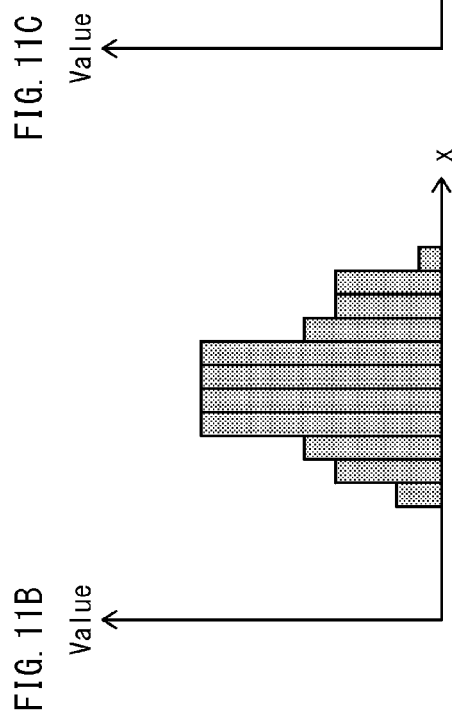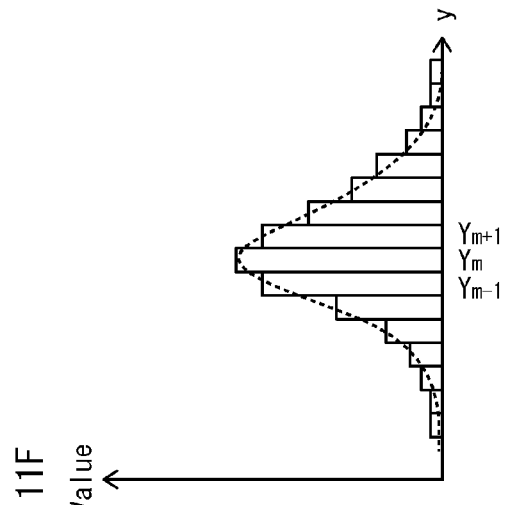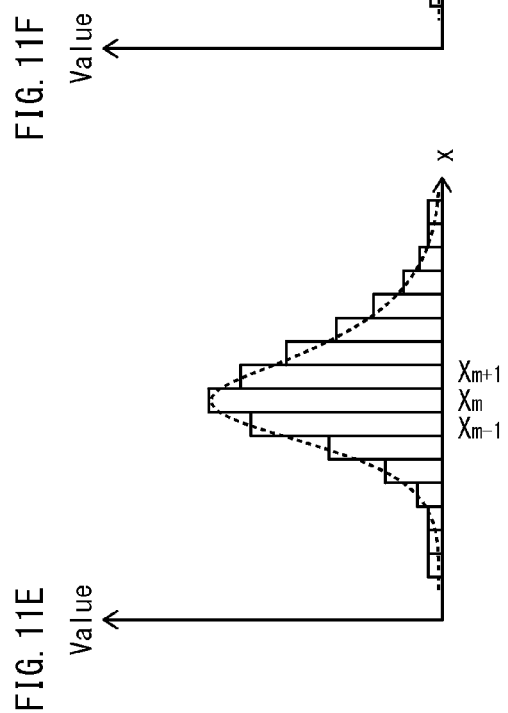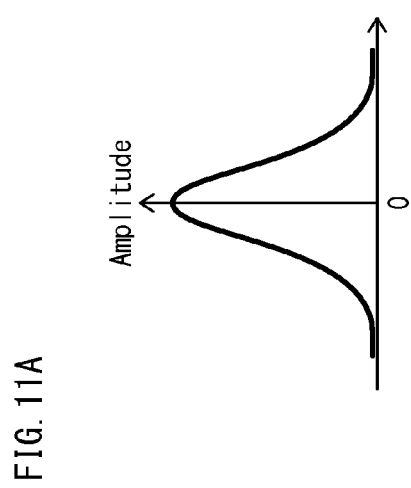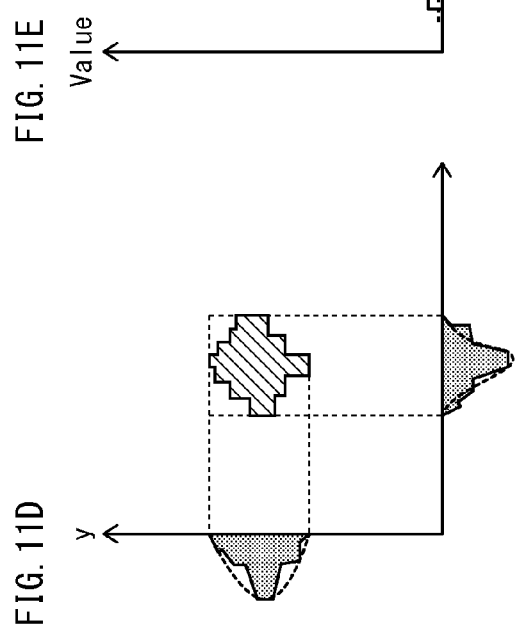

Increased Sensitivity
Multiply values of colour mb enclosed in colour ma by $\alpha$ ($\alpha > 1.0$), and add to values of colour ma FIG. 29A
Tier 1
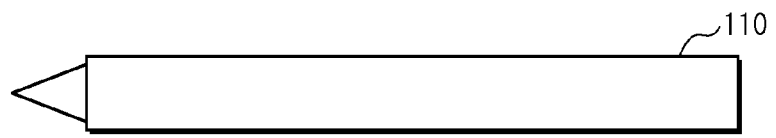
Tier 2
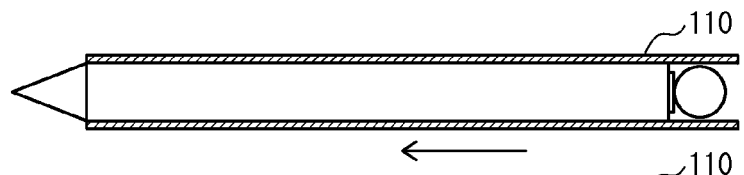
Tier 3
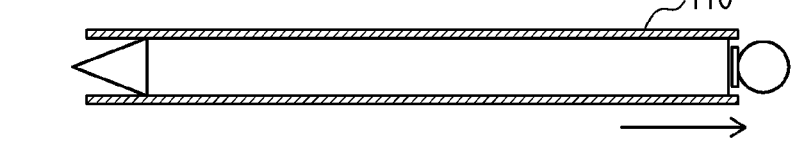
FIG. 29B
Tier 1
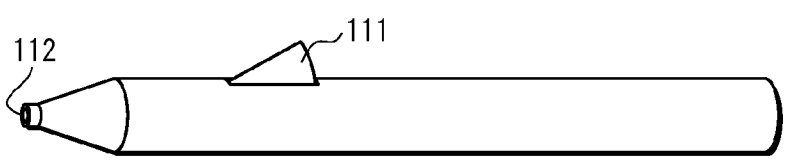
Tier 2
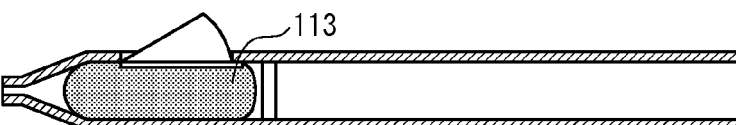
Tier 3
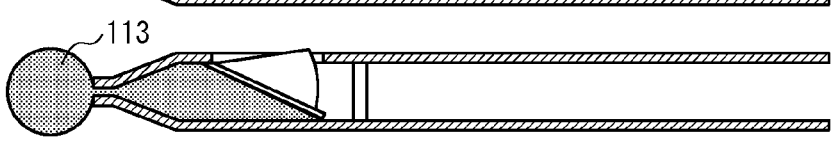
FIG. 29C
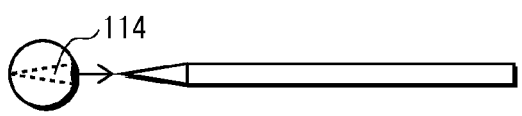
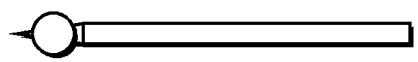
FIG. 29D
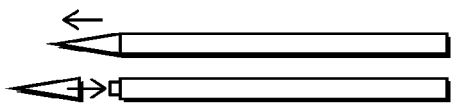
FIG. 29E
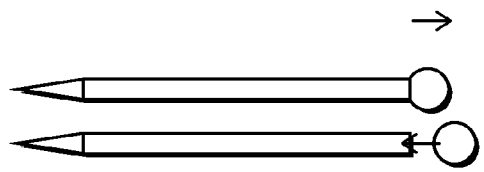

FIG. 31
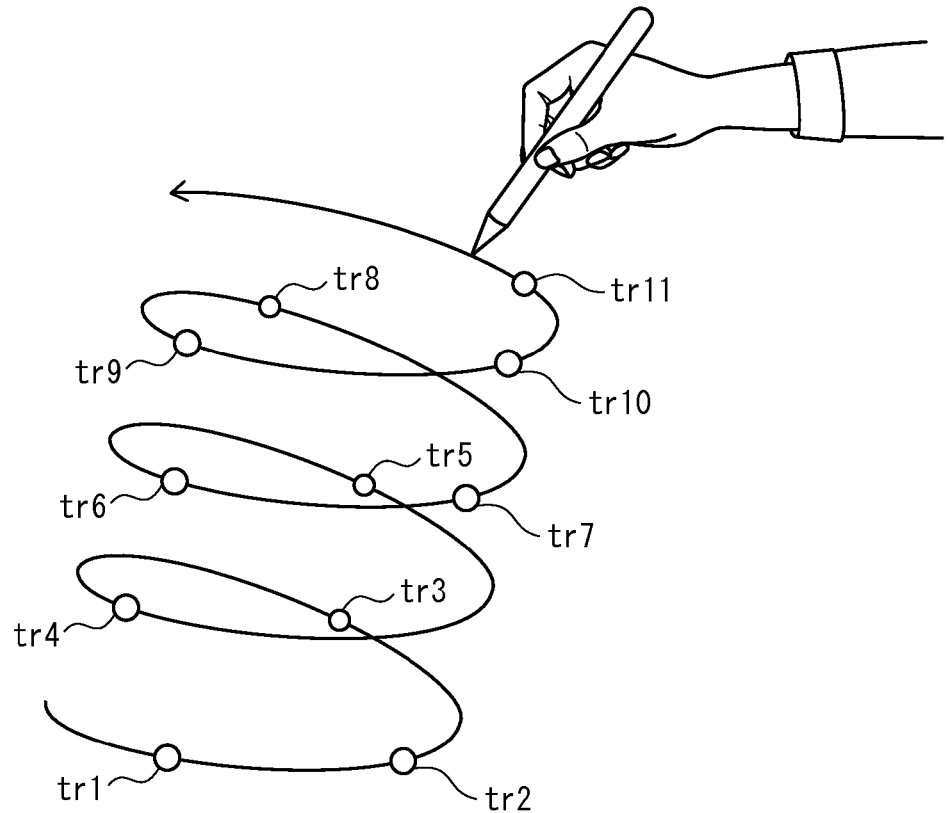
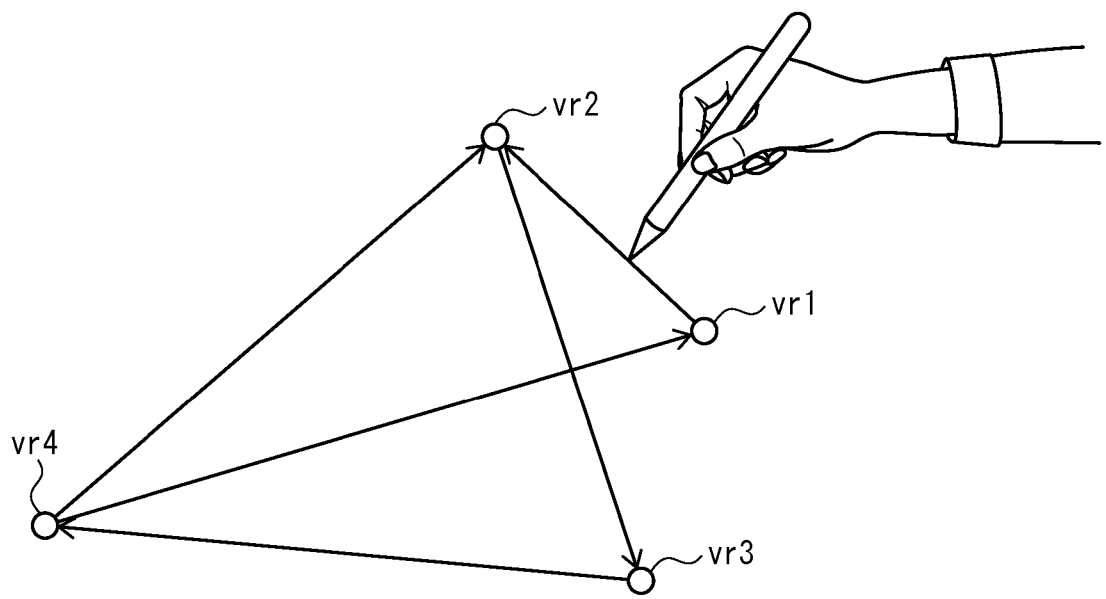

FIG. 32A
Left: Orb on shaft 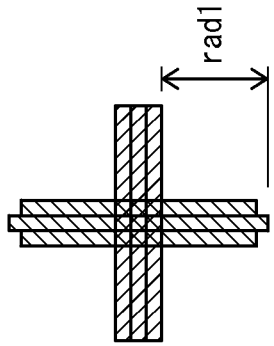 Centre: Extracted pixel group 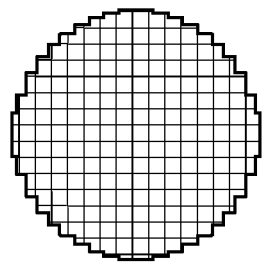 Right: Centroid 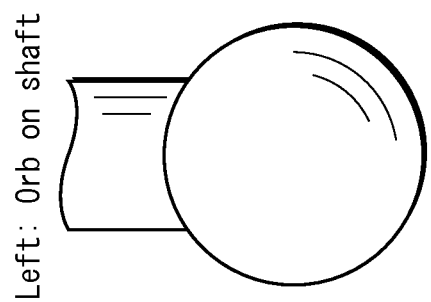
FIG. 32B
Left: Pen tip 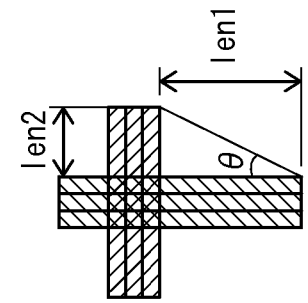 Centre: Extracted pixel group 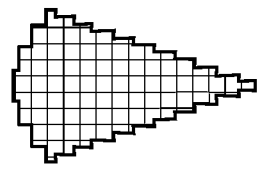 Right: Centroid 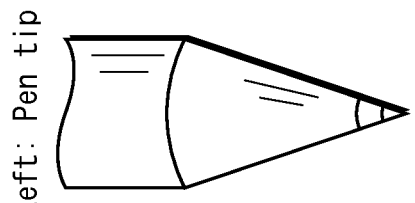

IMAGE PROCESSING DEVICE, STEREOSCOOPIC DEVICE, INTEGRATED CIRCUIT, AND PROGRAM FOR DETERMINING DEPTH OF OBJECT IN REAL SPACE GENERATING HISTOGRAM FROM IMAGE OBTAINED BY FILMING REAL SPACE AND PERFORMING SMOOTHING OF HISTOGRAM

TECHNICAL FIELD

The present invention pertains to the field of coordinate generation technology.

BACKGROUND ART

Coordinate generation technology is the field of detecting a positional relationship of a portion of a user's body, an operator member, or similar, and generating the coordinates of a capture target based on the results. A smartphone, a tablet terminal, or the like determines most-likely coordinates on a screen by detecting a position of a touch made on the screen. However, detection of a touch position is limited to detectable positions on the surface of the screen, which reduces the degree of freedom available for operations. As such, improvements are progressing in terms of generating stereoscopic coordinates of an object subject to capture by filming an image. The following patent and non-patent literature describes prior art in the field of determining depth for a target in real space.

CITATION LIST

Patent Literature

[Patent Literature 1]
Japanese Patent Application Publication No. 2002-140705

Non-Patent Literature

[Non-Patent Literature 1]
G. R. Bradski "Computer Vision Face Tracking for Use in a Perceptual User Interface", Intel Technology Journal, Q2, 15 p. (1998)

SUMMARY OF INVENTION

Technical Problem

It is generally known that when an image filmed by a webcam or similar is examined at the micro level, an object in real space appears as a collection of pixels in various tones. As such, the shape of the target object is not correctly reproduced, but rather resembles the collection of pixels in various tones. In some circumstances, the target object may appear as a pixel group having a distorted shape.

According to the above, technology for determining depth of a target object is based on depth determination of a filmed image of the target object. When three-dimensional coordinates are generated using a pixel group having such a distorted shape, the resulting three-dimensional coordinates are strange and potential produce inaccurate tracking of the target object. Repeatedly executing the three-dimensional coordinates generation algorithm in order to increase accuracy has been considered. However, this approach expends time until the repetitions converge, and is not able to track the motion of the target object. This dramatically decreases responsiveness and causes stress for the user.

The present invention aims to determine a most-likely depth of the target object despite the pixel group of the filmed target object appearing as a distorted shape.

Solution to Problem

In order to resolve the aforementioned problem, image processing is performed by generating a histogram for a designated colour in frame image data obtained by filming the real space, the histogram indicating each of a plurality of designated colour pixel counts at each of a plurality of coordinates in a reference axis of a screen, and selecting one among the designated colour pixel count. a selected count being associated with a specific set of coordinates, and determining the depth of the target object using the selected count.

Advantageous Effects of Invention

The above-described generated histogram expresses the length of continuous pixels of the designated colour with respect to the reference axis of the screen. Thus, the vertical and horizontal maximum and minimum values of the pixel group in the image of the target object in real space within the frame image are logically obtainable through histogram generation. A depth determined from the vertical and horizontal maximum and minimum values is correct and enables generation of three-dimensional coordinates for the target object in real space with high precision.

Histogram generation involves counting a predetermined combination of luminance Y, red-difference Cr, and blue-difference Cb when a line of filmed pixels is transferred from the camera. Given that the algorithm is not executed repeatedly, three-dimensional coordinates generation is enabled so as to track the motion of the target object with no decrease in responsiveness.

BRIEF DESCRIPTION OF DRAWINGS

FIGS. 7A through 7D illustrate the internal configuration of a look-up table for extracting a designated pixel colour and the bit configuration of entries therein.

FIGS. 9A, 9B, and 9C illustrate changes in the pixel group over three cases in which a stylus is close to a screen, far from the screen, and somewhere in between, respectively.

FIGS. 10A through 10E illustrate a pixel group, an array variable for an X-axis histogram, an array variable for a Y-axis histogram, and an impulse response for smoothing.

FIGS. 11A through 11F illustrate a curve approximating the shape of a histogram smoothed by applying an impulse response, as well as histograms before and after smoothing.

FIGS. 29A through 29E illustrate various forms of the stylus.

FIG. 31 illustrates shapes drawn in space by a user and three-dimensional coordinates generated from the motions of the stylus.

FIGS. 32A and 32B illustrate depth adjustment performed according to the capture target.

DESCRIPTION OF EMBODIMENTS

Figure 1A:
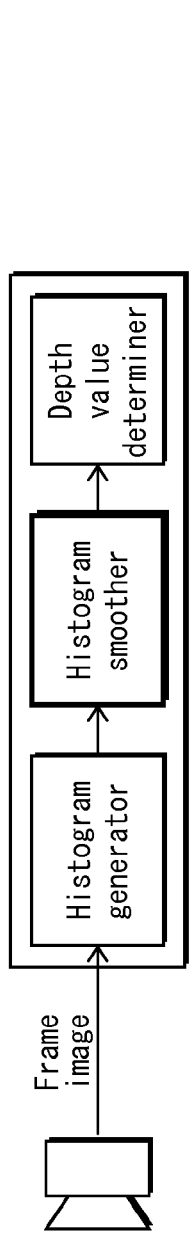
FIGS. 1A through 1D illustrate various internal configurations of a device equipped to overcome obstacles to realisation.

The inventors have been faced with many technical obstacles regarding the realisation of image processing that performs depth value determination as described above. The following discussion pertains to overcoming these obstacles. The inventors selected game controller technology using a columnar controller, described in Patent Literature 1, as a reference for research development.

Paragraph 0059 of Patent Literature 1 discloses the cylinder having an inclination $\phi$. The inclination $\phi$ can be computed according the ratio w1:w2 of width values w1 and w2 of a pixel group. A pixel group representing the cylinder has widths w2 and w1 such that the fraction w2/w1 is proportional to the inclination $\phi$ of the cylinder in the Y-Z plane. As such, the magnitude of the inclination $\phi$ is found by computing the fraction w2/w1. Ordinarily, the fraction w2/w1 is computed by taking the average of a plurality of evenly-spaced measurements between the edges of the pixel group, so as to produce a more accurate value.

Paragraph 0062 of Patent Literature 1 discloses a method for computing a depth value z. This is a method of counting the total number of pixels corresponding to the object among the pixel group obtained by filming. The number of pixels in the pixel group representing the cylinder is affected by the inclination $\phi$. Thus, a weighted value N$\phi$ is first computed by multiplying a weighting factor N by $\phi$. The depth value z is then computed from N$\phi$, N$\phi$ being proportional to the depth value z.

The depth value calculation of Patent Literature 1, which pertains to game controller technology, presumes that the pixel group cleanly reproduces a cylindrical shape. However, in reality, the game system is frequently equipped with a cheap, low-resolution camera. As such, the images filmed by the camera do not clearly reproduce the shape of the target object. Rather, the target object is represented by a pixel group having a distorted shape. Using Patent Literature 1 to generate three-dimensional coordinates from such a distorted pixel group produces strange three-dimensional coordinates, and causes the motion of the target object to be tracked inaccurately.

The technology described in Patent Literature 1 is originally intended for determining a position of a video game character within a virtual space, when the character is in a virtual game space displayed on a plane-view display device. Although the technology disclosed in Patent Literature 1 is indeed sufficient for determining a position in such a situation, it does not provide sufficient accuracy for touch operations and the like on an image protruding from the screen of a stereoscopic display device (hereinafter, stereoscopic object). Equipping an expensive ranging sensor in order to track the distance of the stereoscopic object is unrealistic for reasons of cost and performance.

Non-Patent Literature 1 discloses a Continuously Adaptive Mean Shift (hereinafter, CAMSHIFT) algorithm. CAMSHIFT uses a Hue Saturation Value colour system for face tracking with a probability distribution of skin colours.

The discovery of the probability distribution of skin colours used in this algorithm is described below. Page 3, column 2 of Non-Patent Literature 1 states that the algorithm repeats the following steps 1 through 5.

Step 1: Choose a search window size.
Step 2: Choose the initial location of the search window.
Step 3: Compute the mean location in the search window.
Step 4: Centre the search window at the mean location computed in step 3.
Step 5: Repeat steps 3 and 4 until convergence, or until the mean location moves less than a preset threshold.

The aforementioned window is defined as a centroid joining the eyes, nose, and mouth. In step 1, the window size is determined by taking the width w and the length l of the centroid. The width w and the length l of the centroid are expressed by the mathematical formulae given in page 6, column 1, of Non-Patent Literature 1. The parameters a and b appearing in these formulae are computed as given in page 5, column 2, and are derived from a zeroth moment $M_{00}$, a first moment $M_{11}$, and a second moment $M_{22}$. The zeroth moment $M_{00}$, the first moment $M_{11}$, and the second moment $M_{22}$ are calculated from I(x,y), which is the pixel probability of a pixel value at coordinates (x,y).

The search window location $(X_c, Y_c)$ used in steps 2 and 3 is found by computing $X_c=M_{10}/M_{00}$ and $Y_c=M_{01}/M_{00}$. $M_{00}$ is the zeroth moment and $M_{10}$ is the first moment, each being computed by summing the pixel probability I(x,y) for each position in the window.

The inclination φ of the centroid joining the eyes, nose, and mouth is derived from the zeroth moment $M_{00}$, the first moment $M_{11}$, and the second moments $M_{20}$ and $M_{02}$, as given in page 5, column 2. The inclination φ of the centroid is the inclination of the face. In the probability distribution of skin colour, the face region proportional to distance from the camera. As such, provided that the probability distribution of skin colour is fixed, the distance from the camera to the face region can be calculated by searching for the centroid as described above. Thus, when the target object appears as a distorted pixel group, the technology described in Non-Patent Literature 1 repeatedly employing this algorithm is unable to track the target object and spends large amounts of time repeating the steps. This dramatically decreases responsiveness and causes stress for the user.

In addition, step 2 (choosing the initial location of the search window) and step 3 (computing the mean location in the search window) require a large amount of computation when calculating the pixel probability for a plurality of coordinates. Given that these calculations must be repeated, a microprocessor unit (hereinafter, MPU) looses speed, further increasing the difficulty of tracking. This concludes the description of the obstacles to realisation faced by the inventors in the process of discovering the present invention.

FIGS. 1A through 1D illustrate the internal configuration of various approaches to overcoming the above-described obstacles. Specifically, FIGS. 1A through 1D illustrate the internal configurations of a representative image processing device equipped to overcome the obstacles to realisation. The various configurations are discussed below through a basic aspect (hereinafter numbered 1) and various derivative aspects (hereinafter numbered 2, 3, 4, and so on).

(Aspect 1: Basic Aspect)

The aforementioned obstacles to realisation are surmountable by an image processing device determining a depth of a target object in real space by performing image processing, the image processing device comprising: a generator generating a histogram for a designated colour in frame image data obtained by filming the real space, the histogram indicating each of a plurality of designated colour pixel counts at each of a plurality of coordinates in a reference axis of a screen; a smoother performing smoothing of a generated histogram; and a depth determiner selecting one among the designated colour pixel counts indicated in a smoothed histogram, a selected count being associated with a specific set of coordinates, and determining the depth of the target object using the selected count. FIG. 1A illustrates the internal configuration of the basic aspect. In this aspect, smoothing is applied to a histogram, and three-dimensional coordinates generation is performed based on a pixel count indicated by the smoothed histogram. Here, the variations in the horizontal pixel count and the vertical pixel count for the pixel group are unified into orderly values. This enables the generation of three-dimensional coordinates of the target object based on these pixel counts to be made more precisely. Accordingly, the peak value of the histogram is easily found, and three-dimensional coordinates generation proceeds easily. The effect on the shape of the pixel group is constrained by the fact that each filmed image is different, which simplifies tracking.

Here, smoothing refers to a process of smoothing the values in the histogram for each of the coordinates. The value of each coordinate is added to the values of neighbouring coordinates and divided by the total number of coordinates, and the result is used as a new value. The smoothing filter is, for example, a moving average filter (i.e., an averaging filter) or a Gaussian filter. A moving average filter (also termed an averaging filter or simply a smoothing filter) uses the average of the sum of values for a given pair of coordinates and neighbouring coordinates, so as to produce a histogram of averaged values. For example, the average values are computed by combining the given pair of coordinates and neighbouring coordinates at a rate of 3×3 or 5×5. The rate is a collection of weighting factors allocated to the coordinates. However, the rate is adjusted such that all rates are combined to equal one.

A Gaussian filter is a filter in which the weighting factor applied when computing the average increases near a given pair of coordinates, and decreases with distance from the pair of coordinates. Applying such a rate results in a Gaussian distribution function. The smaller the weighting factor, the less effective the smoothing, while the larger the value, the more effective the smoothing. Aside from the moving average filter and the Gaussian filter, other filters such as a low-pass filter may also be used. A low-pass filter enables smoothing of the histogram values. In the example of Embodiment 1, provided below, the smoothing is performed using an impulse response filter. Here, the target object in real space is a capture target captured by the image processing of the present invention, and includes a control device described in Patent Literature 1, and a part of a person's body (i.e., a face or finger) as described in Non-Patent Literature 1. Explaining all of these objects would be overly complicated and as such, the capture target is hereinafter discussed as being a portion of a stylus that is of a predetermined colour (hereinafter, designated colour). Lastly, depth may be expressed in any unit system, but in the following examples, depth is intended to represent a Z coordinate of the capture target in an X-Y-Z coordinate system within which a stereoscopic object is located. The X-Y-Z coordinate system is defined such that the position of the screen of the display device is the X-Y coordinate system, and the Z axis extends from the screen to the user. The stereoscopic position of the stereoscopic object is defined within a space in which the origin of the Z axis is in the X-Y plane. Calculating the depth value using the Z coordinate in the X-Y-Z coordinate system provides a depth value calculated with sufficient precision for stereoscopic object operations.

(Aspect 2: Detailed Coordinates for Depth Value Determination)

In this aspect, the following variations are applied to the basic aspect. Namely, the specific set of coordinates include a coordinate in the reference axis associated with a maximum count in the smoothed histogram, and a coordinate in the reference axis associated with a second-highest or lower count in the smoothed histogram.

The maximum value in the histogram generated according to the frame image data is larger when the target object is near the camera, and is smaller when the target object is far from the camera. Given that smoothing is applied to the histogram, the sum of the values indicated by the histogram and the depth of the target object are correlated. Accordingly, a range of possible values for the sum of the histogram values is allocated to a plurality of depth levels for the target object, and the aforementioned sum of values is used to derive the appropriate depth.

(Aspect 3: Additional Components for Histogram Generation)

Figure 1B:
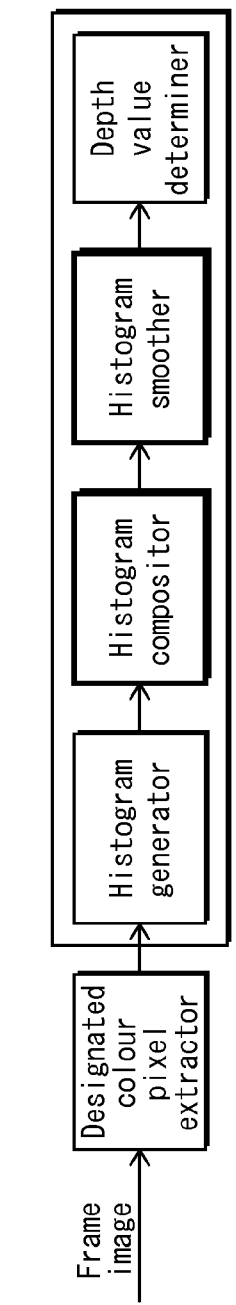

In this aspect, the following variations are applied to the basic aspect. The image processing device further comprises: a registration table in which two or more designated colours serving as a basis for histogram generation are registered in advance; and a histogram compositor that, when histograms have been generated for each of the two or more designated colours, sums the designated colour pixel counts for each of the designated colours at each of the coordinates and obtains a composite histogram indicating summed counts at each of the coordinates, wherein the specific set of coordinates used by the depth determiner are coordinates associated with a count in the composite histogram that exceeds a predetermined threshold. Applying these lower-level concepts produces an internal configuration as shown in FIG. 1B. The components shown as framed in bold lines correspond to the above-described variation.

The pixel components of two or more designated colours are registered, a histogram is generated for each of the colours, the histograms are composited, smoothing is applied to the resulting composite histogram, and depth value determination is performed based on the result. Thus, pixels of an object that is similar in colour to the capture target are nevertheless excluded from consideration in the depth value determination of the capture target. Accordingly, similarly-coloured objects such as a background item or the user's clothing are prevented from influencing the results, thereby improving the precision of depth value determination.

(Aspect 4: Additional Count Calculations)

In this aspect, the following variations are applied to the basic aspect. Namely, one of the two or more designated colours is a specified colour having a weighting factor allocated thereto, and the histogram compositor obtains the composite histogram by multiplying the designated colour pixel counts in the generated histogram of the specified colour by the weighting factor, and summing the result with the designated colour pixel counts at each of the coordinates.

A weighting factor is applied to the designated colour pixel count in the histogram. Thus, a tip of the stylus that is oriented toward the camera is valued more highly in the depth value calculation for the stylus. Accordingly, more precise detection is made possible.

(Aspect 5: Additional Components for Rotation Angle Determination)

Figure 1C:
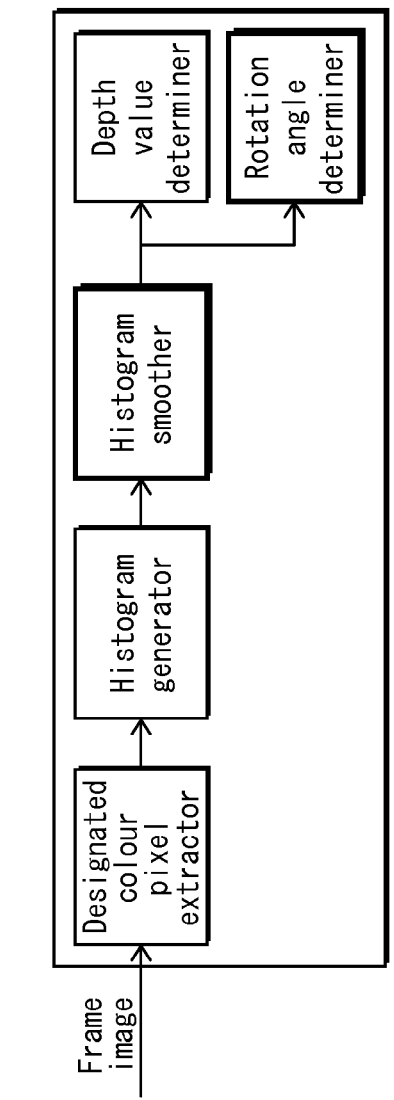

In this aspect, the following variations are applied to the basic aspect. That is, the target object in real space is an operation member having two or more designated colours, the image processing device further comprises a rotation angle determiner determining a rotation angle of the operation member, each histogram generated by the generator for the two or more designated colours is located at different coordinates in the reference axis, and the rotation angle determiner determines the rotation angle of the operation member according to a difference value representing a separation, with respect to the reference axis, between maximum coordinates and minimum coordinates in the histogram for each of the designated colours. Applying these lower-level concepts produces an internal configuration as shown in FIG. 1C.

Histogram generation and smoothing is repeated for each of two or more designated colours, thus enabling the rotation angle of the target object to be derived according to computations made according to the difference between the histogram values. Fine rotations of the target object are thus tracked as part of three-dimensional coordinates generation. The degree to which the stylus has rotated is calculated. This enables operations to be realised in response to fine rotations of the stylus, and improves usability.

(Aspect 6: Designated Colour Details 1)

In this aspect, the following variations are applied to the basic aspect. Specifically, a designated colour is designated by a combination of luminance component and colour-difference component in a pixel, the image processing device further comprises a pixel group extractor extracting a pixel group associated with a set of coordinates in the reference axis among pixels in the frame image data, the pixel group being a group of pixels matching the combination of luminance component and colour-difference component, and the histogram generator generates the histogram by associating a count of extracted pixels with each of the coordinates in the reference axis.

(Aspect 7: Designated Colour Details 2)

In this aspect, the following variations are applied to the basic aspect. Here, a designated colour is designated by a combination of a plurality of primary colour luminance components in a pixel, the image processing device further comprises a pixel group extractor extracting a pixel group associated with a set of coordinates in the reference axis among pixels in the frame image data, the pixel group being a group of pixels matching the combination of primary colour luminance components, and the histogram generator generates the histogram by associating a count of extracted pixels with each of the coordinates in the reference axis.

According to aspects 6 and 7, the pixel components making up pixels in a frame image are stored as designated pixel colours and indicated by a look-up table or the like. Thus, a bit value indicating the designated pixel colour in the frame image and a bit value indicated in the look-up table are subject to a logical operation to determine whether or not each pixel is of the designated colour. When a match is found, a count is incremented and histogram generation proceeds. Also, a bit mask may be used to absorb variation in the pixel components of the frame image.

(Aspect 8: Use of Determined Depth Value)

In this aspect, the following variations are applied to the basic aspect. That is, the target object in real space is an operation member for operating a stereoscopic object projecting from the screen through a stereoscopic effect of a stereoscopic viewing device, the reference axis includes an X axis and a Y axis of the frame image data, the depth determined by the depth determiner is a Z coordinate of the operation member in terms of three-dimensional coordinates, and the three-dimensional coordinates are used by the stereoscopic viewing device for generating an event in which behaviour of the stereoscopic object is changed. Accordingly, the position of a portion of the user's body in front of the screen is determined without using an optical ranging sensor. Thus, when applied to a display device, a determination regarding whether or not the user is too close to the screen can be made and processing, such as warning the user about being too close, can be executed.

(Aspect 9: Smoothing Details)

In this aspect, the following variations are applied to the basic aspect. Specifically, the smoothing is performed by applying an impulse response convolution to each of the coordinates appearing in the histogram. Impulse response convolution produces a greater weighting factor for a median value and a decreasing weighting factor with increasing distance from the median value. Thus, the histogram may be modified to resemble a predetermined ideal histogram in order to make a depth determination based on the surface area of the histogram.

(Aspect 10: Smoothing Target Variations)

Figure 1D:
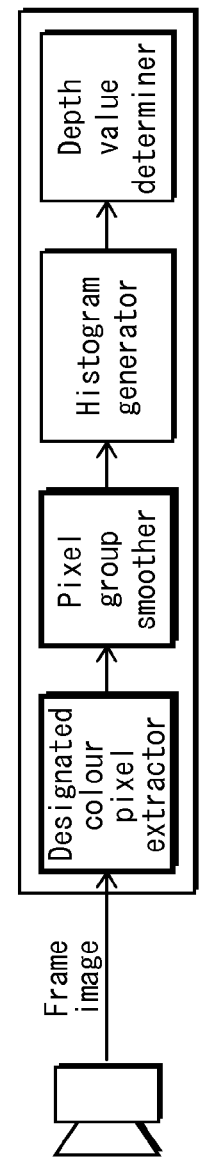

The following is presented as a variation of the basic aspect) An image processing device may be employed comprising: a pixel group extractor extracting a pixel group among pixels of a specific designated colour in frame image data; a smoother performing smoothing of pixel values for each of the pixels in the pixel group; a generator generating a histogram indicating each of a plurality of designated colour pixel counts in a smoothed pixel group at each of a plurality of coordinates in a reference axis of a screen; and a depth determiner selecting one among the designated colour pixel counts indicated in the histogram, a selected count being associated with a specific set of coordinates, and determining a depth of the target object using the selected count. Applying these lower-level concepts produces an internal configuration as shown in FIG. 1D. Variations in the pixels within the extracted pixel group are smoothed, and variation is constrained in the values generated therewith. Also, the smoothing of the pixels making up the pixel group is performed using a filter, which reduces implementation costs.

(Aspect 11: Connectivity with Other Devices)

The image processing device is usable with other devices, as follows. Here, a stereoscopic viewing device is used with an image processing device, and comprises: an execution unit executing an application; a playback unit performing playback of stereoscopic video in accordance with an instruction from the application; and an event manager generating an event in response to a user operation, the event indicating a depth produced by the image processing device, wherein the application causes the playback unit to change playback content of the stereoscopic viewing device according to the event. Operations such as a virtual touch on the stereoscopic object projecting from the screen of the stereoscopic display device are enabled. As such, the user is provided with a virtual reality experience in the virtual space. The user is thus liberated from everyday cares. Accordingly, the user is energised for the future.

(Aspect 12: Playback Device Variations)

In this aspect, the following variations are applied to the basic aspect of the stereoscopic device. Specifically, the stereoscopic video is one of a multi-view video stream and graphics rendered by the application, and the change of the playback content is switching the multi-view video streams or graphics subject to playback. Accordingly, user interactivity is improved.

(Aspect 13: Integrated Circuit)

An integrated circuit determines a depth of a target object in real space by performing image processing, the integrated circuit comprising: a generator generating a histogram for a designated colour in frame image data obtained by filming the real space, the histogram indicating each of a plurality of designated colour pixel counts at each of a plurality of coordinates in a reference axis of a screen; a smoother performing smoothing of a generated histogram; and a depth determiner selecting one among the designated colour pixel counts indicated in a smoothed histogram, a selected count being associated with a specific set of coordinates, and determining the depth of the target object using the selected count. Accordingly, the components of the image processing device are realisable as modules, and the image processing device is thus made applicable to the field of semiconductors.

(Aspect 14: Program)

An image processing program causes a computer to execute processing for determining a depth of a target object in real space by performing image processing, the image processing program comprising: generating a histogram for a designated colour in frame image data obtained by filming the real space, the histogram indicating each of a plurality of designated colour pixel counts at each of a plurality of coordinates in a reference axis of a screen; smoothing a generated histogram; and selecting one among the designated colour pixel counts indicated in a smoothed histogram, a selected count being associated with a specific set of coordinates, and determining the depth of the target object using the selected count. Distribution through a network provider server or some form of recording medium is enabled, thus making the image processing device applicable to the field of general computer software and online services.

Embodiment 1

An application of an image processing device is described below as an Embodiment of the present disclosure. Applications of the image processing device include a product in which the image processing device and a display device are provided separately, and a product in which the image processing device includes a display device. Embodiment 1 concerns the latter. The display device is stereoscopic display device incorporated in a television, a tablet terminal, a smartphone, or another digital apparatus.

Figure 2A:
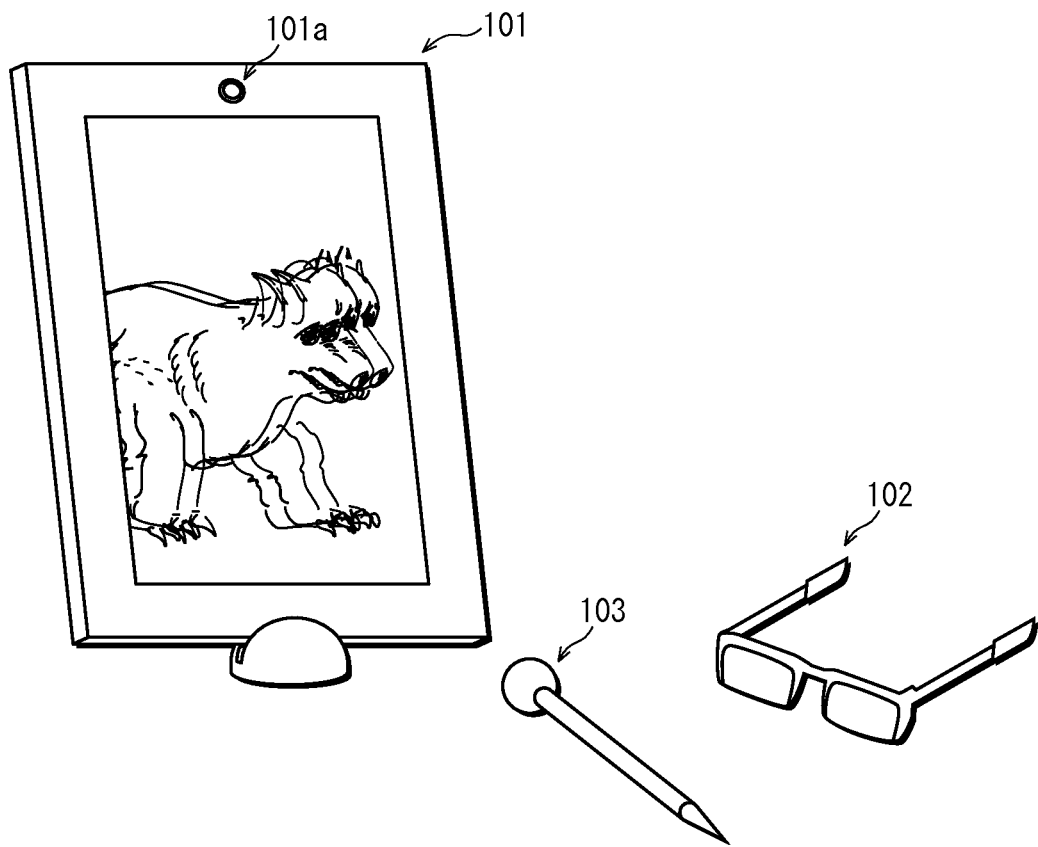
FIGS. 2A and 2B illustrate a display device and peripherals, supplying a stereoscopic playback environment.

FIG. 2A indicates a system including a display device and peripherals, supplying a stereoscopic playback environment. The system includes a stereoscopic television system 101 that displays a left-view image and a right-view image in the space of a single frame, shutter glasses 102 used by the user during stereoscopic playback, and a stylus 103 for making operations on a stereoscopic object displayed with depth during stereoscopic playback. The screen of the display device 101 illustrated in FIG. 2 shows the right-view image and the left-view image overlapping thereon. When wearing the shutter glasses 102, the user perceives the stereoscopic object as having depth with respect to the screen. A camera 101a is provided on a front face of the display device 101, above an upper side of the screen. The camera 101a is a webcam intended for the realisation of video telephony, used to film an image of the user. In the present Embodiment, the webcam is adapted to film an image of the user operating the stylus.

Figure 2B:
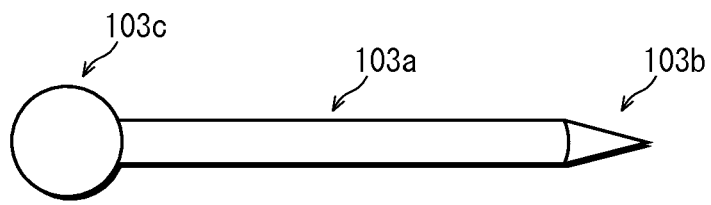

FIG. 2B illustrates the stylus 103. As shown, the stylus 103 includes a stem portion 103a, a pen tip 103b, and an orb 103c affixed to the stem. That is, the stylus 103 is a two-way stylus having the pen tip 103b adapted to operations on a touch panel and the orb 103c adapted to capture as a capture target. The tip portion on the pointed side serves to perform touch panel operations, while the orb is used for camera tracking operations.

Figure 3:
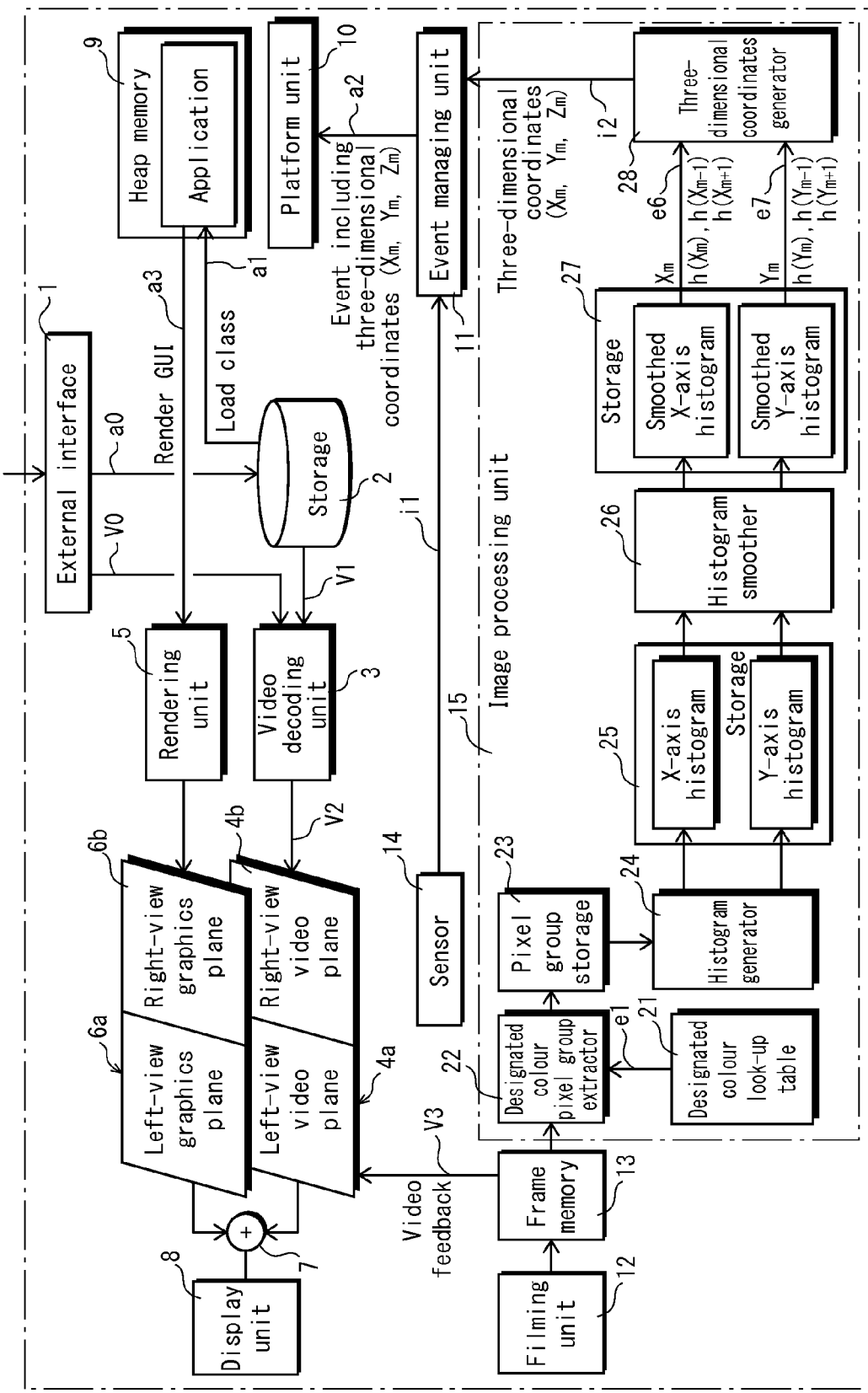
FIG. 3 illustrates the internal configuration of a stereoscopic display device that incorporates the image processing device.

The orb of the stylus is represented in a frame image by a round group of pixels, regardless of the filming angle. Thus, the filming angle of the camera has no effect on whether or not the orb is detected. Detection of the orb 103c by the camera is thus stable. In the present Embodiment, the orb is the capture target of an imaging process. FIG. 3 illustrates the internal configuration of a display device that incorporates the image processing device. In FIG. 3, components having reference numbers 1 through 15 are part of the display device. The components of the display device are explained below, in increasing reference number order. As shown in FIG. 3, the stereoscopic display device incorporated in the image processing device includes an external interface 1, storage 2, a video decoding unit 3, a left-view video plane 4a, a right-view video plane 4b, a rendering unit 5, a left-view graphics plane 6a, a right-view graphics plane 6b, a compositing unit 7, display unit 8, heap memory 9, a platform unit 10, an event managing unit 11, a filming unit 12, a frame memory 13, a sensor 14, and an image processing unit 15. For deeper understanding, the components of the display device are described below, with reference to a usage case illustrated in FIGS. 4A and 4B through 6. The usage case involves a user moving the stylus, which is the capture target, in front of the screen during playback of stereoscopic video.

The external interface 1 is an interface for external input that includes an input terminal, such as a network interface, a broadcast tuner, or a local drive.

The storage 2 stores various files obtained through the external interface 1. The files include a class file written in an object-oriented programming language for defining an application, a stream file containing a multi-view video stream, an image data file containing image data, and a data file containing 3D model data.

The video decoding unit 3 decodes the multi-view video stream. In the present Embodiment, the multi-view video stream is in frame sequential format. Frame sequential format is a video format of compound images, in which reference view video frames and additional view video frames are displayed in alternation for playback. In the following explanation, the reference view video frames are the left-view images, and the additional view video frames are the right-view images. The video decoding unit 3 decodes the multi-view video stream, obtains the right-view images and the left-view images, and writes the obtained images to the right-view video plane and the left-view video plane. The decoding is performed in accordance with a playback API call from the application. Arrows V0, V1, and V2 in FIG. 3 indicate the flow of video data. Arrows V0 and V1 schematically indicate the supply of data to the video decoding unit 3. Arrow V2 indicates the output of uncompressed images from the video decoding unit 3.

Figure 4A:
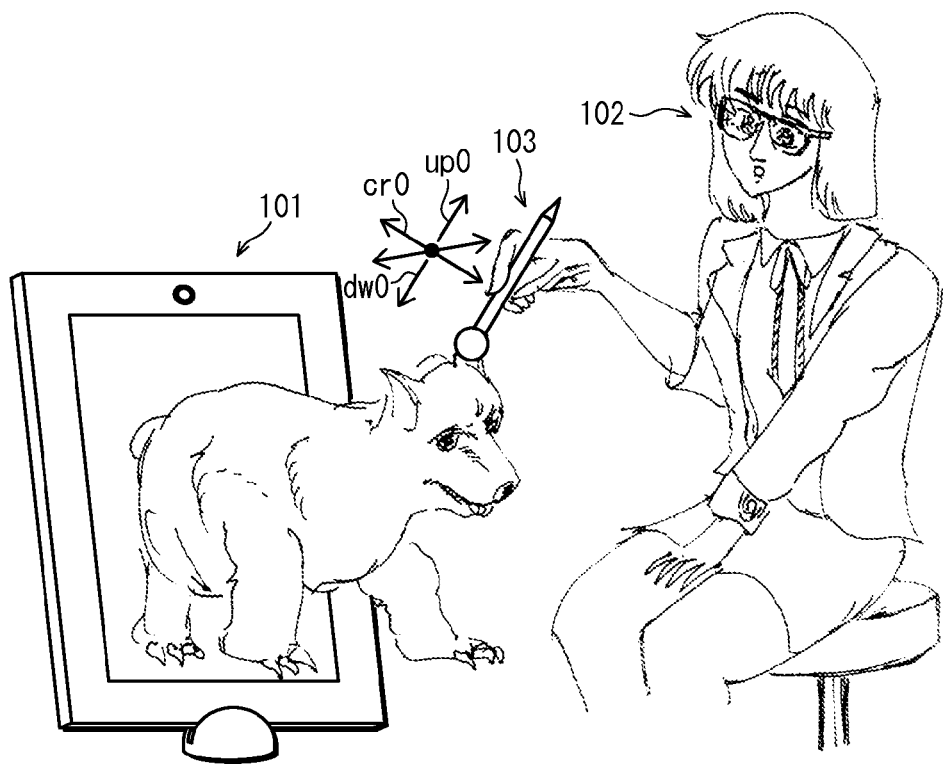
FIGS. 4A and 4B illustrate a stereoscopic video image a stereoscopic GUI viewable as a result of wearing shutter glasses.

The left-view video plane 4a and the right-view video plane 4b split an uncompressed pixel group equivalent to one screen of a decoded video stream into a left-view image and a right-view image, and store the images. The right-view image and the left-view image are made to overlap on the screen by displaying the respective pixel groups of the right-view image and the left-view image within a single frame period. The screen is then perceivable as a stereoscopic image by wearing the shutter glasses 102 for viewing. FIG. 4A illustrates the manner in which a stereoscopic image is viewed in this usage case. In FIG. 4A, a situation is supposed in which a stereoscopic object is projected from the screen during playback of a multi-view video stream. In this example, the bear is the stereoscopic object projected from the screen of the display device through multi-view video stream playback. In this situation, the stylus is applicable to performing a virtual touch on the projected bear.

The rendering unit 5 renders graphics in accordance with a rendering instruction from the application. The graphics include images obtained by expanding compressed images in a format such as PNG, JPEG, or TIFF, and images generated by performing a sequence of rendering processes, including coordinate conversion of 3D model data, illumination calculation, and viewpoint conversion. Illumination calculation includes texture mapping, and enables an expanded image to be overlaid on the surface of the 3D model data by applying the texture mapping thereto. During image rendering, a paired set of left-view graphics and right-view graphics for stereoscopic viewing are obtained by rendering a common image with two different rendering coordinates, the coordinates being separated by the ocular parallax distance. During the rendering of the 3D model data, a left-view position and a right-view position are defined in virtual space so as to be separated by the distance between human eyes. The paired left-view graphics and right-view graphics for stereoscopic viewing are then obtained by viewpoint conversion for the respective left-view position and right-view position.

Figure 4B:
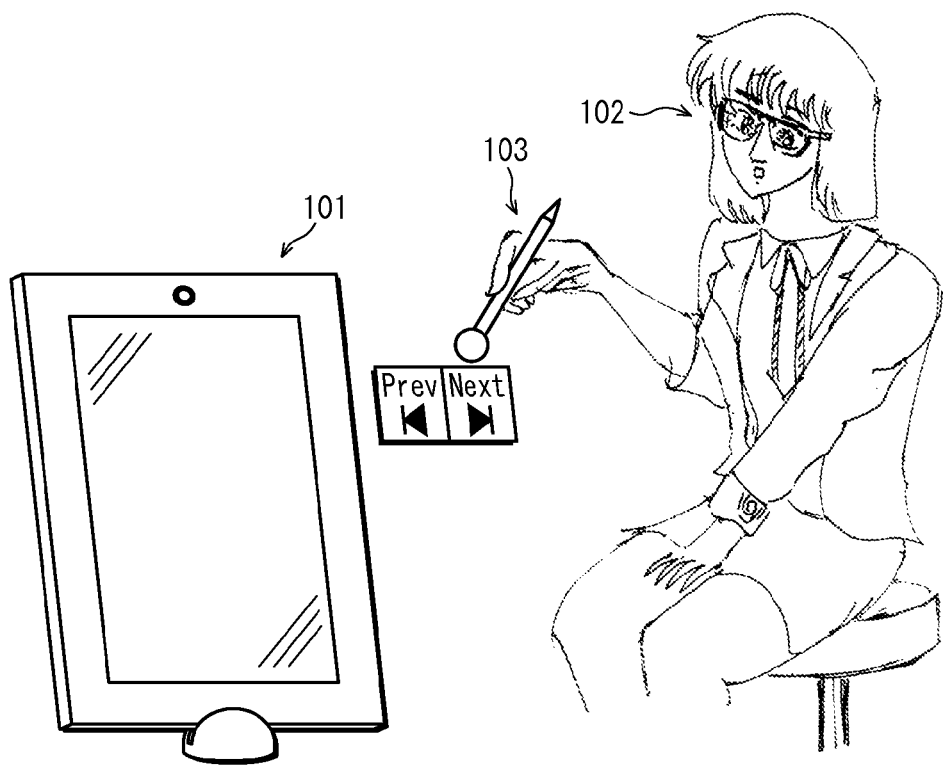

The left-view graphics plane 6a and the right-view graphics plane 6b split uncompressed pixel groups making up the graphics obtained by rendering into pixels making up the left-view graphics and pixels making up the right-view graphics, and store the results. The right-view graphics and the left-view graphics are made to overlap on the screen by displaying the respective pixel groups of the right-view graphics and the left-view graphics within a single frame period. A graphical user interface (hereinafter, GUI) is then perceivable as a stereoscopic image by wearing the shutter glasses 102 for viewing. FIG. 4B illustrates the stereoscopic GUI viewable as a result. In FIG. 4B, a situation is supposed in which a GUI rendered by the application and serving as a stereoscopic object is projected out of the screen during playback of a multi-view video stream. As shown, the GUI enables a selection of a previous page (Prev) or of a next page (Next). In such a situation, the stylus is applicable to making a touch operation on the GUI projecting from the screen.

The compositing unit 7 applies scaling and filtering to a pixel line within each of the left-view graphics plane, the left-view video plane, the right-view graphics plane, and the right-view video plane, and performs layer compositing of the video images and graphics such that matching coordinates overlap at a common position. As such, a composite stereoscopic image is obtained in which the stereoscopic video images and the graphics are combined.

The display unit 8 includes a plurality of light-emitting elements arranged in a matrix, namely organic electroluminescence elements (hereinafter, organic EL elements), a liquid crystal element, and plasma elements, drive circuits respectively disposed at four sides of the display panel, and an element control circuit. The display 8 causes the light-emitting elements to blink in accordance with pixels making up frame image data stored in the video planes 4a and 4b and in the graphics planes 6a and 6b.

The heap memory 9 is a stack region storing bytecode for an application loaded from a local drive or from a remote drive on a network, and is used for processing of the bytecode by the platform unit.

The platform unit 10 includes a class loader, a bytecode interpreter, and an application manager, and serves to load the class file from the local drive or from the remote drive on a network, and to execute a bytecode application as an instance thereof. The processing by the bytecode application includes multi-view video stream playback instructions and GUI rendering instructions. A multi-view video stream instruction involves selecting a multi-view video stream to be a playback target, and making a playback API call instructing a locator of the multi-view video stream. A GUI rendering instruction involves making a call to a fixed rendering API, having as arguments the image data or model data to be rendered and the rendering coordinates. Arrows a0, a1, a2, and a3 in FIG. 3 indicate the control flow and the data flow pertaining to the application. Arrow a0 schematically represents the class file download, and arrow a1 schematically represents the loading of the class from the local storage to the heap memory. Arrow a2 indicates the output of events triggered by a state transfer in the application, and arrow a3 indicates the GUI rendering instruction by the application. A characteristic point is seen in that an event serving as a trigger for the operations of the application includes three-dimensional coordinates indicating a specific portion of the stylus, and causes a change of playback target or a change of rendering target in accordance with the three-dimensional coordinates. When such an event occurs during playback of the multi-view video stream, a new stream playback instruction is made once the target multi-view video stream is changed to another. Here, the multi-view video stream being played back is a static stereoscopic image of a bear. When the multi-view video stream is changed to a stereoscopic video of the bear, image interactivity is enabled such that the stereoscopic image of the bear moves in response to the movement of the stylus. When such an event occurs while the GUI display is in an operation wait state, a new graphics rendering instruction is made once the image data or model data subject to rendering has been changed to another. Here, the stereoscopic graphics being played back is a GUI for receiving a page operation to navigate to the previous page or the next page. When the image data or model data is changed so as to render a previous page or a next page, image interactivity is enabled such that the screen browses the pages in response to the movement of the stylus.

Figure 5A:
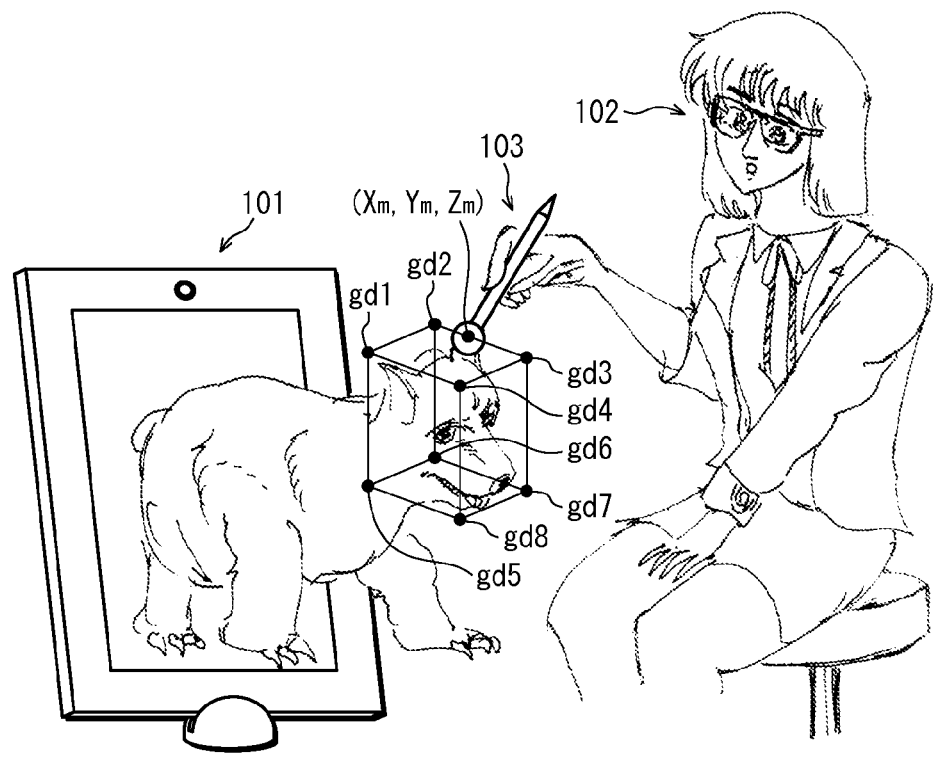
FIGS. 5A and 5B illustrate a position of a range for stylus detection.
Figure 5B:
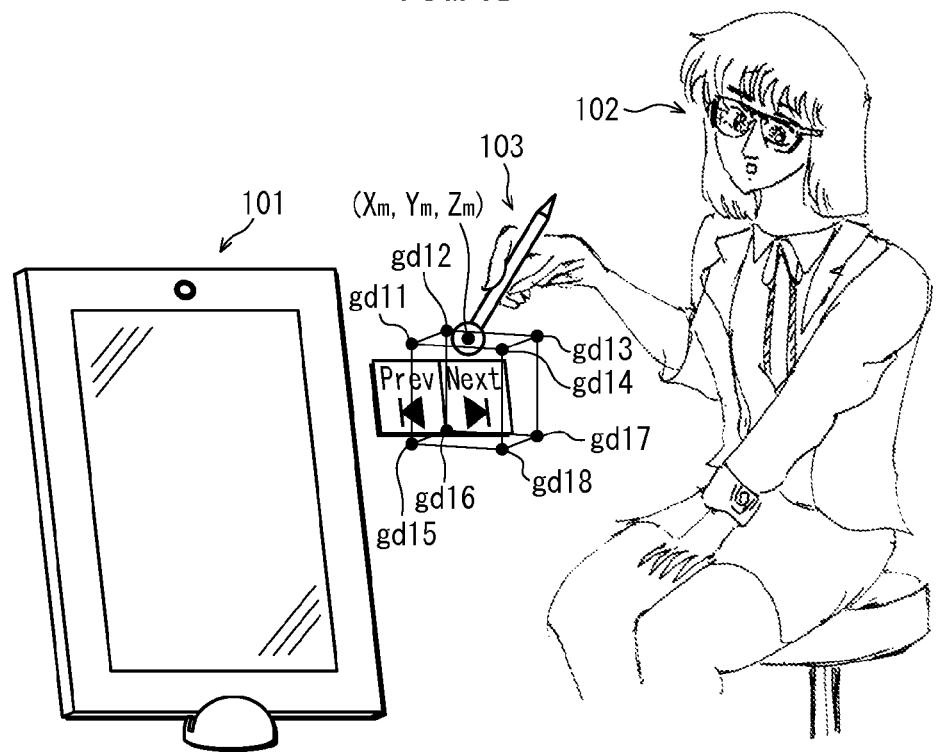

The event managing unit 11 defines a specific spatial interval within a stereoscopic space in which the stereoscopic object can exist. When three-dimensional coordinates are generated by the image processing device, the event managing unit 11 determines whether or not the coordinates are within the spatial interval. In the affirmative case, a touch event occurs, which is a notification that the stylus has come into contact with the stereoscopic object. When the determination is negative, no touch event occurs. FIGS. 5A and 5B illustrate the respective specific ranges for FIGS. 4A and 4B. In FIG. 5A, grid points gd1, gd2, gd3, gd4, and so on define a spatial interval precisely corresponding to the head of the bear in the static image. In FIG. 5B, grid points gd11, gd12, gd13, gd14, and so on define a spatial interval corresponding to the Next Page button, among the Next Page and Previous Page buttons of the GUI discussed above. The application is thus made to perform a change of playback target or a change in rendering target in accordance with stylus operations by having the touch event occur upon receiving notification from the image processing device that the stylus has entered the three-dimensional coordinates.

Figure 6:
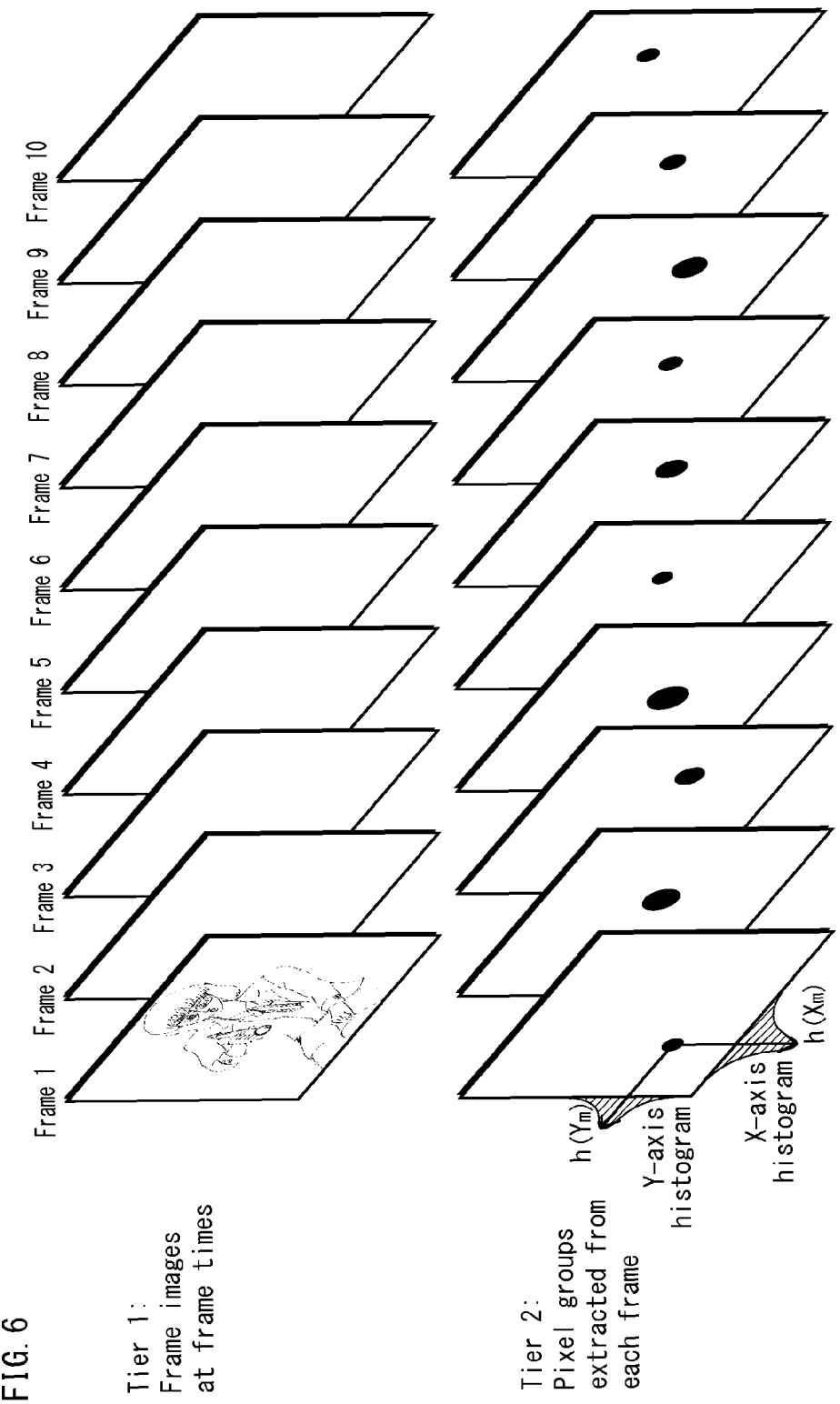
FIG. 6 illustrates a plurality of frames obtained by the filming unit 12 and processing by the image processing device on each of the frames.

The filming unit 12 controls the camera 101a, which is a webcam, to obtain a single frame image at regular frame intervals. The first tier of FIG. 6 illustrates a plurality of frames obtained by the filming unit 12. The image of Frame 1 in the first tier of FIG. 6 is a front view of the user poking the shaft of the stylus toward the head of the bear, which is the stereoscopic object. Frame 2 and so on are drawn as blanks. However, this is only intended to convey that the frame images are omitted from the drawing. In actuality, these frames continue to show the user as indicated in Frame 1. Given that the stereoscopic object exists only virtually, the camera does not film the image thereof. As such, an image of the user poking the stylus toward an empty space in front of the screen is filmed.

The frame memory 13 stores pixels in screen positions making up a frame obtained by the filming unit, for each of the frames. The resolution of the frame images is 1920× 1080, 640×480, or similar. The horizontal and vertical pixels are stored in a number corresponding to the resolution. Each pixel is able to represent a luminance component Y, a red-difference component Cr, a blue-difference component Cb, and a transparency T. Alternatively, these may be represented as a red pixel component R, a green pixel component G, a blue pixel component B, and a transparency T. Here, the transparency T indicates a degree to which the pixels of the graphics plane are transparent when the pixels of the video plane and the pixels of the graphics plane are overlaid by the compositing unit 7. Arrow V3 of FIG. 3 indicates the feedback of the user in the images filmed by the filming unit 12. The feedback consists of rewriting the pixels from the frame memory 13 to the video planes 4a and 4b. The GUI and the video data rendered by the application are combined through the above-described control flow and data flow, and the combined image is displayed on the display unit 8. The pixels of the filmed image in the frame memory 13 are output to the image processing unit 15 as well as to the video planes 4a and 4b, where the image processing unit applies image processing.

The sensor 14 detects an operation of a remote control or panel, a screen touch, or similar, and makes a notification to the event managing unit 11. Arrows i1 and i2 of FIG. 3 indicate input to the event manager. The input includes input i1 of touch coordinates from the sensor 14 and input i2 of three-dimensional coordinates generated by the image processing unit 15.

The image processing unit 15 captures the motion of the capture target by performing image processing on a plurality of frame images acquired by the filming unit 12 and generating three-dimensional coordinates. The captured motion of the capture target is back-and-forth motion of the capture target in a space between the screen of the display device and the user. Arrows up0 and dw0 in FIG. 3 indicate representative motions of the capture target moving away from the screen and moving toward the screen. Arrow cr0 indicates a representative motion of the capture target moving in parallel to the screen. The image processing unit 15 is a component of the display device accomplishing the role of the image processing device by performing image processing on each frame image upon acquisition by the filming unit 12, determining a depth of the stylus appearing in the frame image, and generating three-dimensional coordinates for the stylus, which are output to the event managing unit 11. The second tier of FIG. 6 indicates a pixel group extracted from each corresponding frame of the first tier. A pixel group corresponding to the stylus shaft can be extracted from each frame image given that each frame image includes an image of the user holding the stylus. Also, an X-axis histogram and a Y-axis histogram exist for the respective X axis and Y axis of an X-Y coordinate system defining the pixels within the pixel group. The third tier of FIG. 3 indicates three-dimensional coordinates ((X1, Y1, Z1)(X2, Y2, Z2)(X3, Y3, Z3) . . . ) generated from the X-axis histogram and the Y-axis histogram in the second tier. These are the results of the image processing by the image processing device. The three-dimensional coordinates have different values in each frame image.

The fourth tier of FIG. 6 indicates the calculation performed with the three-dimensional coordinates $(X_i, Y_i, Z_i)$ for any ith frame. Given maximum values of $h(X_m)$ and $h(Y_m)$ for the X-axis histogram and the Y-axis histogram of a frame i, the values $X_i$ and $Y_i$ of coordinates $(X_i, Y_i, Z_i)$ are $X_m$ and $Y_m$. The value $Z_i$ in $(X_i, Y_i, Z_i)$ is obtained according to the calculation $f(h(X_m)+h(X_m-1)+h(X_m+1)+h(Y_m)+h(Y_m-1)+h(Y_m+1))$. Here, the function $f(\ )$ derives the Z coordinate from the histogram values. In tier 4 of FIG. 6, the sum of the maximum value h(Zm) and the subsequent values h(Xm−1), h(Xm+1), h(Ym−1), h(Ym+1) based thereon is selected as the argument of the function. A call to function f( ) produces the Z coordinate with varying precision depending on the precision of the histogram values. As such, high histogram value precision is desirable.

This concludes the description of the display device components. Having completed the description of the display device components, the components of a device integrated within the display device as an image processing device (i.e., the image processing unit 15) are explained next. In FIG. 3, the components of the image processing unit 15 are assigned reference signs in the twenties. These components are explained below, in increasing reference number order. As shown in FIG. 3, the image processing unit 15 includes a designated colour look-up table 21, a designated colour pixel group extractor 22, storage 23, a histogram generator 24, histogram storage 25, a histogram smoother 26, smoothed histogram storage 27, and a three-dimensional coordinates generator 28. The following describes the components of the image processing unit 15 in increasing reference sign order. FIGS. 8 through 12 illustrate the principles of three-dimensional coordinate generation by the aforementioned components through a specific example. The specific example concerns an operation performed on the stereoscopic object using the orb on the shaft of the stylus.

The designated colour look-up table 21 is a look-up table referenced when a pixel group is acquired, that defines the pixel components of a designated pixel colour subject to acquisition. A designated colour is a colour registered in the look-up table, such as a formation colour that depends on the material of the stylus, a painted colour of paint applied to a portion of the stylus, a wrapping colour of a wrapper, and so on. A pixel colour is generally defined by a radial coordinate corresponding to paired hue and chroma values in a colour wheel. However, in the present Embodiment, the pixel colour is defined by a combination of a luminance component Y, a red-difference component Cr, and a blue-difference component Cb, or by a combination of a red component R, a green component G, and a blue component B. Accordingly, a particularly high-luminance shade of red can be designated among shades of red by registering a combination of a high luminance Y, a red-difference Cr, and a blue-difference Cb in the look-up table. FIG. 7A illustrates the internal configuration of a look-up table having the luminance Y, red-difference Cr, and blue-difference Cb components of a designated pixel colour registered therein. As shown, the look-up table has a plurality of designated pixel colour indices (labelled $m_p$, $m_q$, and $m_r$), each of the indices being associated with a combination of a luminance component Y (0-255), a red-difference component Cr (0-255), and a blue-difference component Cb (0-255). The respective values of the luminance Y, red-difference Cr, and blue-difference Cb components in the look-up table can each designate one gradation in a range of 1 to 255. FIG. 7B illustrates the bit configuration of an entry associated with an individual designated colour index within the look-up table in Y, Cr, Cb format. In the look-up table, one pixel is equivalent to 32 bits, including eight bits allocated to each of the luminance Y, red-difference Cr, and blue-difference Cb components. In FIG. 7B, the asterisks indicate masking applied to the least significant bits. Applying the bit masking to the least significant bits enables a range of tones that differ in terms of these bits to serve as the colour of a designated colour pixel group.

FIG. 7C illustrates the internal configuration of a look-up table having the red R, green G, and blue B components of a designated pixel colour registered therein. As shown, the look-up table has a plurality of designated pixel colour indices (labelled $m_p$, $m_q$, and $m_r$), each of the indices being associated with a combination of a red luminance component R (0-255), a blue luminance component B (0-255), and a green luminance component G (0-255). The respective values of the RPG components in the look-up table designate one gradation in a range of 0 to 255. FIG. 7D illustrates the bit configuration of an entry associated with an individual designated colour index within the look-up table in RGB format. In the look-up table, one pixel is equivalent to 32 bits, including eight bits allocated to each of the RGB components. The pixel expressions are complicated to explain in Y, Cr, Cb format and in RGB format. As such, the remainder of this description solely refers to the luminance Y, the red-difference Cr, and the blue-difference Cb.

Figure 8:
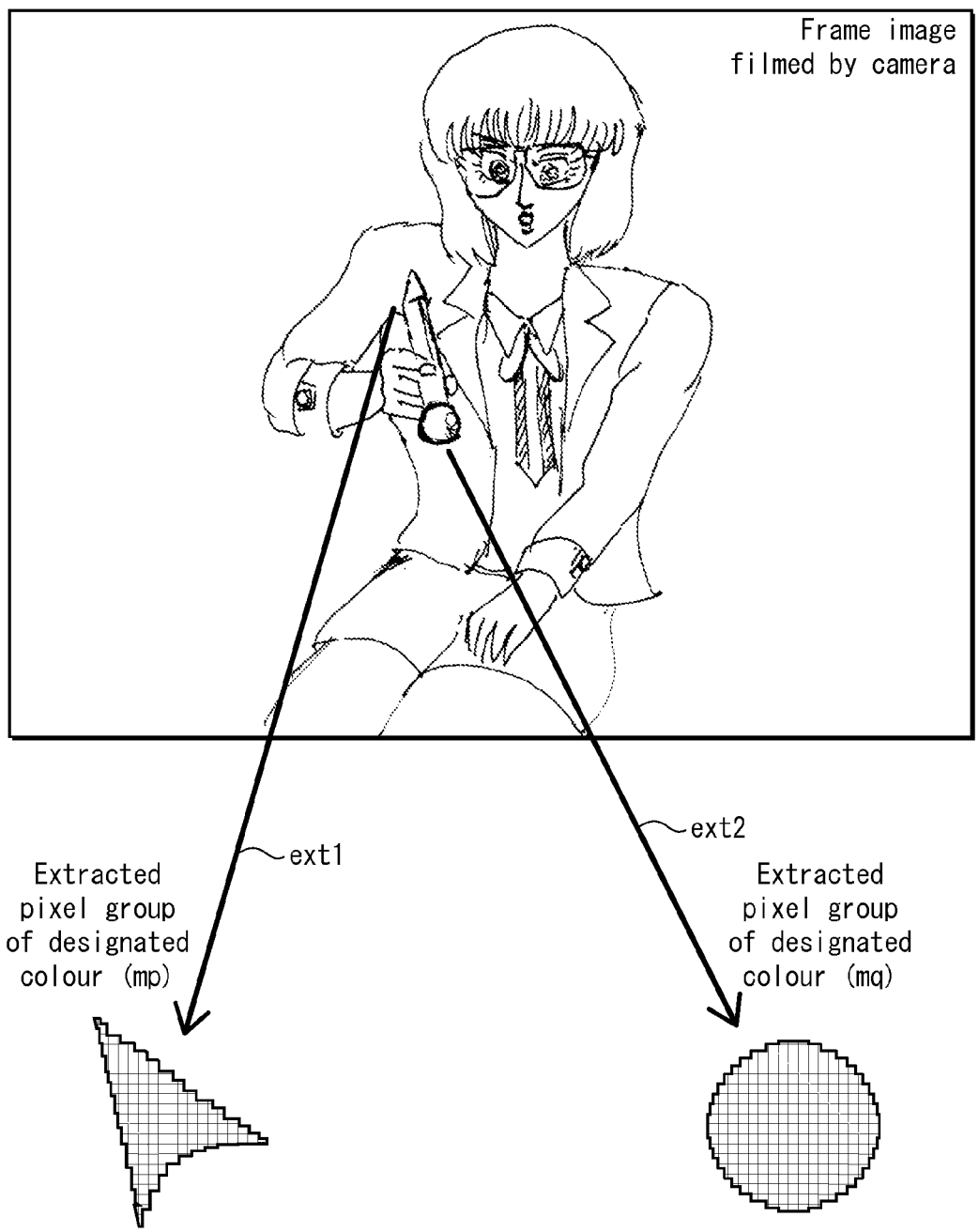
FIG. 8 illustrates a pixel group extracted by a designated colour pixel group extractor 22.

During a frame interval in which a frame image is obtained for the frame memory, the designated colour pixel group extractor 22 acquires an extracted image by extracting pixels matching the designated pixel colour components as defined by the designated colour look-up table 21 among pixels making up a frame image with a resolution on the order of 1920×1080 or 640×480. The extracted image has the pixels with components matching the designated pixel colour described in the look-up table arranged on a blank background. When two or more designated colours are present, two or more extracted images are generated, one for each of the designated colours. FIG. 8 illustrates a pixel group extracted by the designated colour pixel group extractor 22. Arrows ext1 and ext 2 in FIG. 8 schematically indicate the pixel groups extracted from the frame image. These pixels are extracted because the colour of the orb on the shaft of the stylus and the colour of the pen tip are designated colours registered in the image processing device. The orb on the stylus appears round to a user's eyes, but when the frame image is viewed at the micro level, the orb appears as a distorted shape having a jagged border. Through this extraction, an extracted image in which the pixel group of the stylus pen tip is arranged on a blank background and an extracted image in which the pixel group of the orb on the stylus shaft is arranged on a blank background are each generated.

FIGS. 9A, 9B, and 9C illustrate the changes in the pixel group over three cases in which the stylus is close to the screen, far from the screen, and at a middle distance from the screen, respectively. FIG. 9A represents the case where the stylus is at a distance Zmiddle from the screen. Here, Mmiddle represents the pixel group extracted from a captured image in which the stylus is at this distance. FIG. 9B represents the case where the stylus is far from the screen (at a distance Zfar). Here, Mfar represents the pixel group extracted from a captured image in which the stylus is at this distance. FIG. 9C represents the case where the stylus is close to the screen (at a distance Znear). Here, Mnear represents the pixel group extracted from a captured image in which the stylus is at this distance. In comparison to Mmiddle, the pixel group captured from the frame image in the case of Mfar, where the stylus is far from the screen, is made up of fewer horizontal pixels. Also, in comparison to Mmiddle, the pixel group captured from the frame image in the case of Mnear, where the stylus is close to the screen, is made up of more horizontal pixels. As such, the number of horizontal pixels and the number of vertical pixels in the pixel group provide clues to the depth value.

The histogram generator 24 enumerates the designated pixel colour appearing at each coordinate within an extracted image that is an extracted pixel group, and generates a histogram therefrom. The generation involves a plurality of X-axis coordinates and a plurality of Y-axis coordinates. The histogram indicating the association of designated colour pixel appearing at each X-axis coordinate is termed an X-axis histogram, and the histogram indicating the association of designated colour pixel appearing at each Y-axis coordinate is termed a Y-axis histogram.

The histogram storage 25 stores the X-axis histogram and the Y-axis histogram generated by the histogram generator. FIG. 10A illustrates the X and Y axes in the X-Y coordinate system defining the pixel group. The dashed lines indicate a projection range for the pixel group M projected onto the X and Y axes. The X-axis histogram and the Y-axis histogram pertain to the coordinates within the projection range. The X-axis histogram and the Y-axis histogram can be made up of array variables each specifying an array element using the coordinates. FIG. 10B indicates the array variables defining the X-axis histogram, where $X_0$, $X_1$, $X_2$, and $X_n$ are X coordinates associated with a value in the X-axis histogram. These coordinates are associated with the values in the X-axis histogram because the pixel group of FIG. 10A is made up of coordinates $X_0$, $X_1$, $X_2$, and $X_n$ on the X axis.

FIG. 10C indicates the array variables defining the Y-axis histogram. Here, $Y_0$, $Y_1$, $Y_2$, and $Y_n$ are Y coordinates associated the values in the Y-axis histogram. These coordinates are associated with the values in the Y-axis histogram because the pixel group of FIG. 10A is made up of coordinates $Y_0$, $Y_1$, $Y_2$, and $Y_n$ on the Y axis. The array variables are defined using an object-oriented programming language, such that the value of any given coordinates is obtainable by using the array variable for the X-axis histogram and the Y-axis histogram.

The histogram smoother 26 computes an average of the values indicated in the X-axis histogram and an average of the values indicated in the Y-axis histogram, and obtains a smoothed X-axis histogram and a smoothed Y-axis histogram in which the computed average values are used. The histogram smoother 26 of the present Embodiment uses an impulse response filter, developed from a moving average filter, a Gaussian filter, and so on. The smoothing by the impulse response filter is a smoothing operation that involves applying an impulse response convolution to the X-axis histogram and the Y-axis histogram as generated, thus obtaining a smoothed X-axis histogram and a smoothed Y-axis histogram. The convolution applied to the impulse response I[n] associated with the value for each of the coordinates indicated in the histogram is a discrete-time Fourier transform. FIG. 10D indicates the convolution of I[n] for an input impulse δ[n]. The impulse response I[n] is obtained by performing a discrete-time Fourier transform on a frequency response H(w) applied by a desired system. Math. 1 is given in FIG. 10E. Here, the discrete-time Fourier transform is abbreviated as DTFT.

Assuming that the impulse response continues from 0 to M in terms of X-axis coordinates, the output I[n]*x[n] of the convolution applied to the nth X coordinate x[n] among coordinates 0 through M is calculated as given by Math. 2 in FIG. 10E. Here, I[n] is defined as given by Math. 3. The smoothed X-axis histogram and the smoothed Y-axis histogram are obtained by performing the calculations of Math. 2 and Math. 3 on the values of the X-axis histogram and the Y-axis histogram.

Once the convolution of the impulse response is obtained from the aforementioned discrete-time Fourier transform, the values of the respective coordinates indicated in the histogram are idealised such that a peak value occurs at the centre and values approach zero at the edges. FIG. 11A is a graph indicating a curve approximating the shape of the histogram as smoothed with the impulse response. As shown, the highest value is at the central position, with increasingly lower values appearing with increasing distance from the centre. FIG. 11B shows an example of an X-axis histogram and FIG. 11C shows an example of a Y-axis histogram. The pixel group that serves as the basis of histogram generation has a distorted shape with a jagged border. Thus, neither of the X-axis histogram and the Y-axis histogram generated therefrom produce a perfect normal distribution. The central value is not always the highest value, and the same value may appear twice or more. When the impulse response filter is applied to FIG. 11A, the resulting smoothing produces FIGS. 11D, 11E, and 11F. FIG. 11D indicates the X-axis histogram and the Y-axis histogram after smoothing has been performed with the X-Y coordinate system specifying the pixel group. Here, comparison of the smoothed X-axis and Y-axis histograms reveals that, as shown in FIGS. 11B and 11C, two or more X and Y coordinates share the maximum value. As such, the peak is hard to define. In contrast to the unsmoothed histograms of FIGS. 11B and 11C, in which the highest value is found at a plurality of locations, the smoothed histograms shown in FIGS. 11D, 11E, and 11F have a unique maximum value ($X_m$, $Y_m$) in terms of the X and Y coordinates. Having a single location for the maximum value enables greater stability in maximum value detection.

The smoothed histogram storage 27 stores the smoothed X-axis and Y-axis histograms obtained by the histogram smoother 26 performing smoothing.

Figure 12:
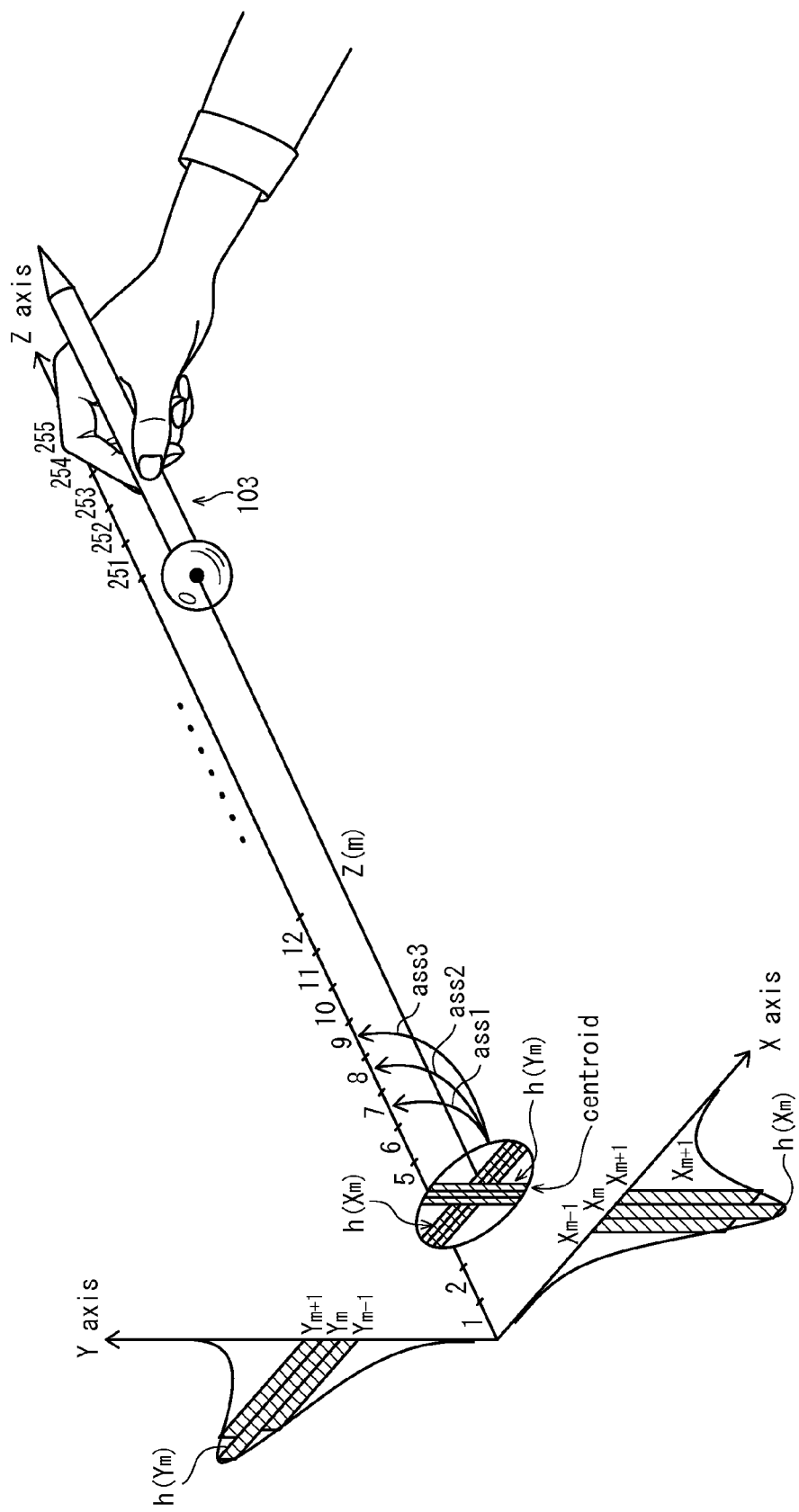
FIG. 12 stereoscopically illustrates relations between the stylus, the X-axis and Y-axis histograms, and the pixel group.

The three-dimensional coordinates generator 28 is a component developed to generate three-dimensional coordinates from a depth determination made by a depth determiner, and thus corresponds to the depth determiner described above. The three-dimensional coordinates generator 28 performs Z-coordinate generation as follows. First, an X coordinate having the maximum value in the smoothed X-axis histogram (i.e., $X_m$) and a Y coordinate having the maximum value in the smoothed Y-axis histogram (i.e., $Y_m$) are specified. Then, the sum of $X_m$, the values of coordinates near $X_m$, $Y_m$, and the values of coordinates near $Y_m$ is computed, and the value of $Z_m$, representing the depth of the stylus, is computed accordingly. Arrows e6 and e7 of FIG. 3 illustrate the three-dimensional coordinates generator 31 referencing the X-axis histogram and the Y-axis histogram. As described above, the three values $h(X_m)$, $h(X_{m-1})$, and $h(X_{m+1})$ are referenced from the X-axis histogram. Likewise, the three values $h(Y_m)$, $h(Y_{m-1})$, $h(Y_{m+1})$ are referenced from the Y-axis histogram. The sum of these values is hereinafter termed a histogram peak vicinity sum. FIG. 12 stereoscopically illustrates the relations between the stylus, the X-axis and Y-axis histograms, and the pixel group. The above-described histogram peak vicinity sum corresponds to a surface area of a centroid depicted in FIG. 12. That is, the centroid is three pixels wide and represents an intersection at the centre of the pixel group. The paired coordinates ($X_m$, $Y_m$) are at the intersection of the centroid. The total length of the centroid is calculated from the histogram peak vicinity sum. Calculating the histogram peak vicinity sum enables the depth of the orb relative to the screen to be appropriately calculated.

A stereoscopic video is generated with one of 255 levels of depth by using a right-view image and a left-view image with a parallax of 1 pixel to 255 pixels. The Z-axis of FIG.

12 indicates 255 possible depth values for reference. Here, the possible values of the sum of the above-described smoothed X-axis histogram and smoothed Y-axis histogram (i.e., the area or total length of the centroid) are divided into 255 gradations in a value range, and assigned to the respective 255 levels of stereoscopic depth. Arrows ass1, ass2, and ass3 in FIG. 12 symbolically indicate these assignments. Through such assignment, three-dimensional coordinates are obtained that enable determination of a touch on a stereoscopic object.

This concludes the explanation of the components of the image processing unit 15. The components of the image processing unit 15 are implemented like software in a playback device by having a processor execute a program realising the above-discussed functions written in an object-oriented programming language. The operations realised by the components of the image processing unit 15 are described next.

Figure 13:
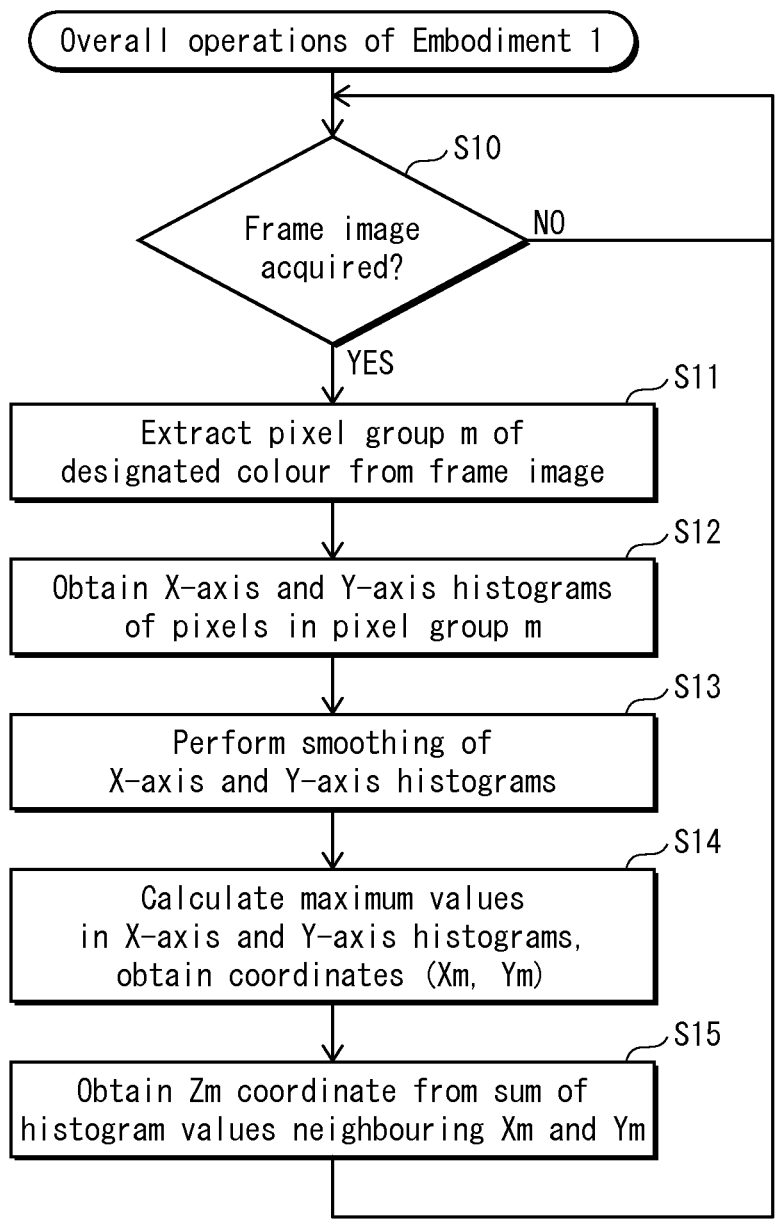
FIG. 13 is a flowchart indicating the overall operations pertaining to Embodiment 1.

FIG. 13 is a flowchart indicating the overall operations pertaining to Embodiment 1. This flowchart pertains to the highest-order operations, i.e., to the main routine.

The flowchart begins with step S10 upon activation. Steps S11 through S15 are executed when the result of step S10 is YES. Step S10 is a determination regarding whether or not a frame image has been acquired by the camera. Steps S11 through S15 involve acquiring a pixel group m of a designated colour from the acquired frame image (step S11), generating an X-axis histogram and a Y-axis histogram from the pixels making up the pixel group m (step S12), smoothing the X-axis histogram and the Y-axis histogram (step S13), obtaining the paired coordinates $(X_m, Y_m)$ by detecting respective maximum values in the X-axis histogram and the Y-axis histogram (step S14), and obtaining a Z-coordinate $Z_m$ from the sum of the histograms in the vicinity of each of $X_m$ and $Y_m$ (step S15). These steps are repeated in the stated order every time the result of step S10 is YES. The Z coordinate $Z_m$ is obtained from the respective sums in the vicinity of $X_m$ and $Y_m$ by computing $Z_m$ on the basis of $h(X_{m-1})+h(X_m)+h(X_{m+1})+h(Y_{m-1})+h(Y_m)+h(Y_{m+1})$. Here, h(n) is the value at a position n.

Figure 14B:
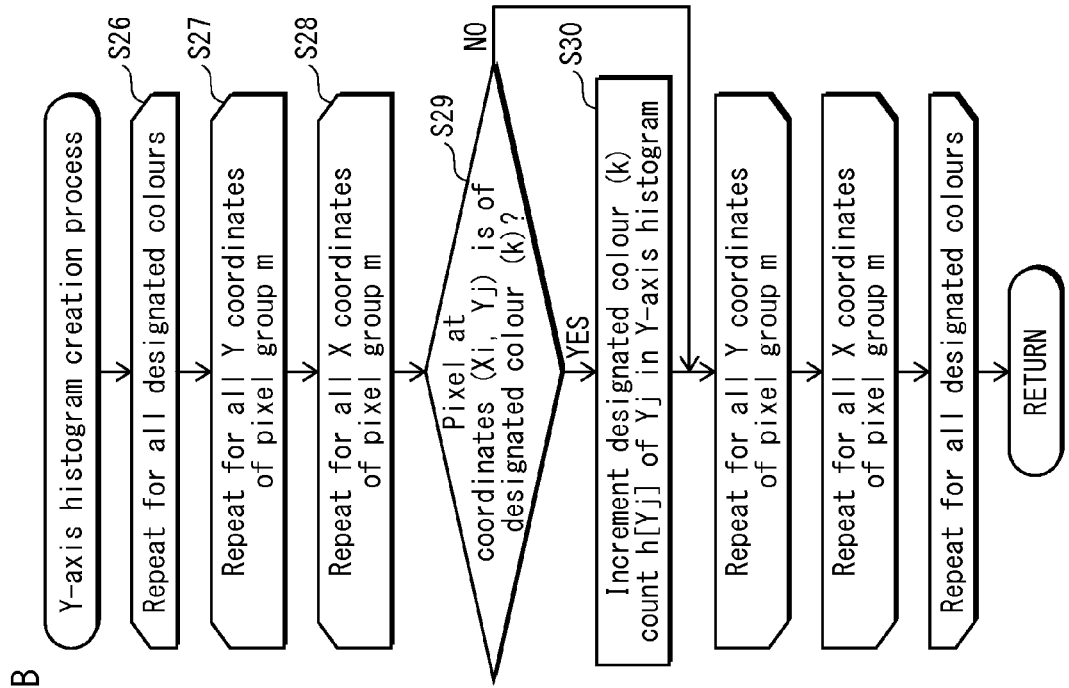
FIGS. 14A and 14B are flowcharts pertaining to the X-axis and Y-axis histogram generation processes.
Figure 14A:
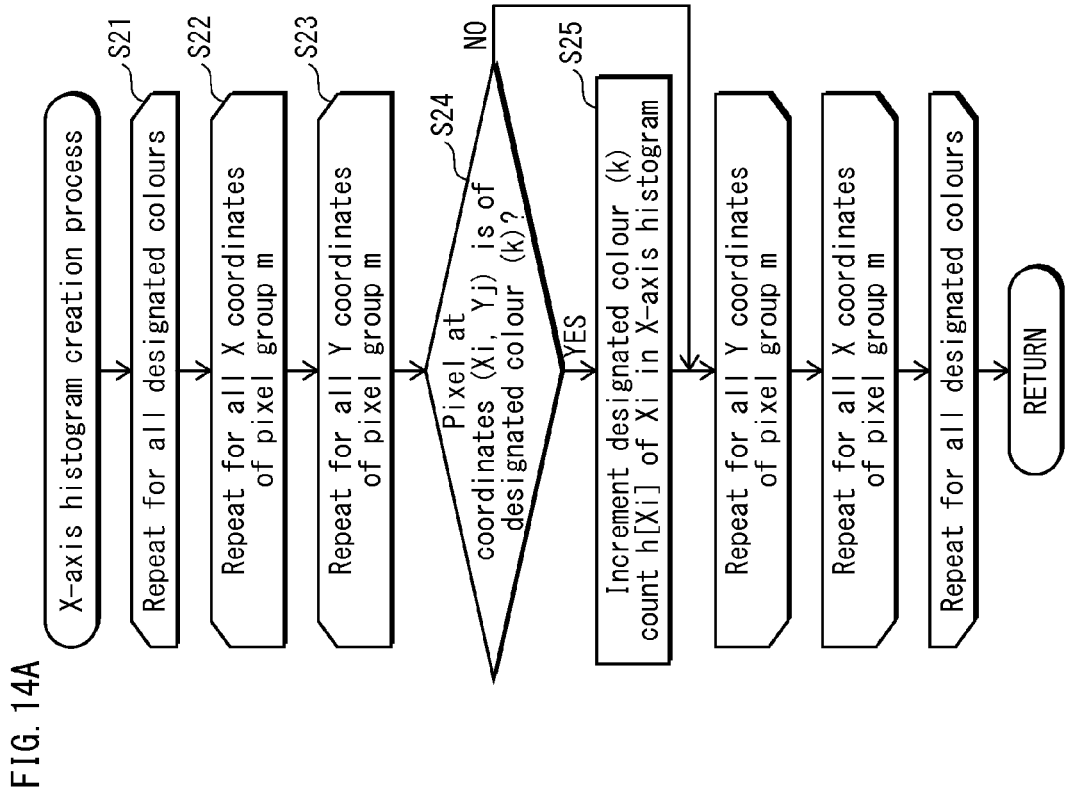

FIGS. 14A and 14B represent subroutines detailing step S12 from the flowchart of FIG. 13. FIG. 14A pertains to the X-axis histogram generation process. As shown, the process depicted in the flowchart is executed upon receiving one or more arguments, and returns the elements of the X-axis histogram when the process is complete. This flowchart is constructed from a loop nested three levels deep. The innermost loop, defined in step S23, repeats the processing of steps S24 and S25 for all Y coordinates of pixels in the pixel group m. The index j is a control variable defining the loop iteration in step S23. Step S22 repeats the innermost loop for all X coordinates in the pixel group m. The index i is a control variable defining the loop iteration in step S22. Furthermore, step S21 repeats the loop defined by step S22 for the X coordinates until all designated colours have been processed. The index k is a control variable defining the loop iteration in step S21. Step S24 is a determination regarding whether or not the pixels having the paired coordinates $(X_i, Y_j)$ are of the designated colour (k). In the affirmative case, the value $h(X_i)$ for $X_i$ in the X-axis histogram is incremented in step S25. In the negative case, the process moves on to the next Y coordinate.

The control variable j is incremented with each iteration of the loop. The pixel having the coordinate $Y_j$ indicated by the control variable j is processed along with the present loop. The value of each X coordinate in the X-axis histogram is determined by repeating this loop.

FIG. 14B pertains to the Y-axis histogram generation process. The process depicted by this flowchart is a subroutine that, upon completion, returns a Y-axis histogram to the process calling the subroutine. The returned value is as indicated at the end of the flowchart. This flowchart is constructed from a loop nested three levels deep. The innermost loop, defined in step S28, repeats the processing of steps S29 and S30 for all X coordinates of pixels in the pixel group m. Step S27 repeats the innermost loop for all Y coordinates in the pixel group m. Furthermore, step S26 repeats the loop defined by step S27 for the X coordinates until all designated colours have been processed. The significance of indices i, j, and k is as described above for FIG. 14A. Step S29 is a determination regarding whether or not the pixels having the paired coordinates $(X_i, Y_j)$ are of the designated colour (k). In the affirmative case, the value $h(Y_j)$ for $Y_j$ in the Y-axis histogram is incremented in step S30. In the negative case, the process moves on to the next X-coordinate.

The control variable i is incremented with each iteration of the loop. The pixel having the coordinate $X_i$ indicated by the control variable i is processed along with the present loop. The value of each Y coordinate in the Y-axis histogram is determined by repeating this loop.

Figure 15B:
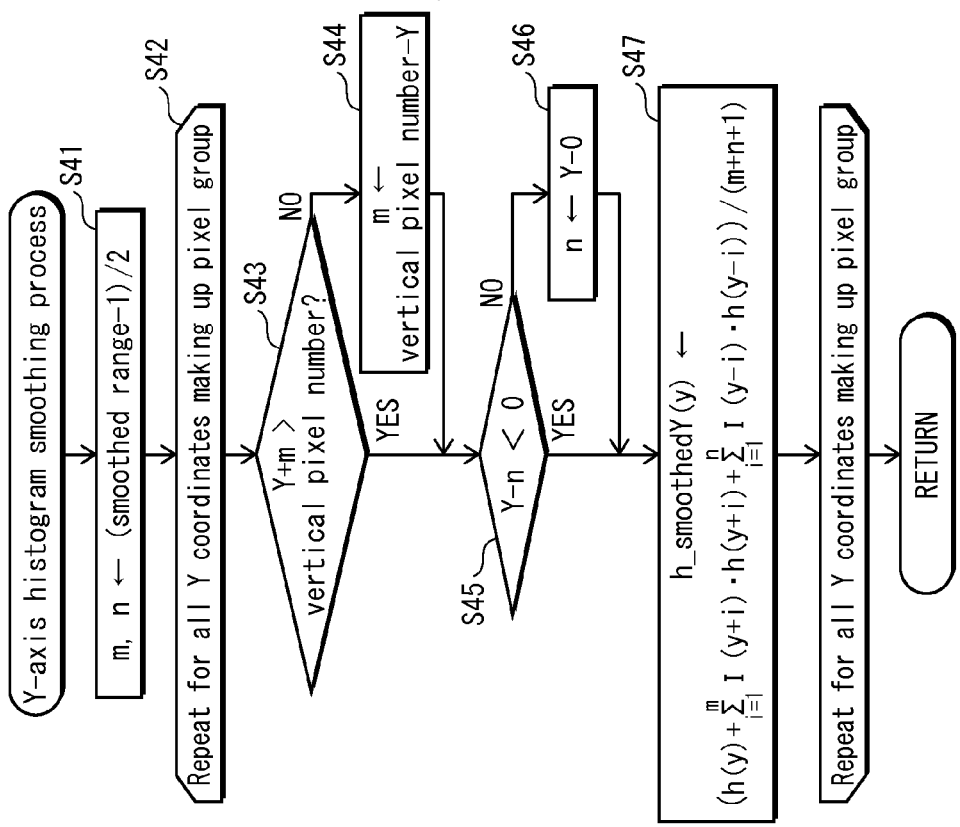
FIGS. 15A and 15B are flowcharts pertaining to the X-axis and Y-axis histogram smoothing processes.
Figure 15A:
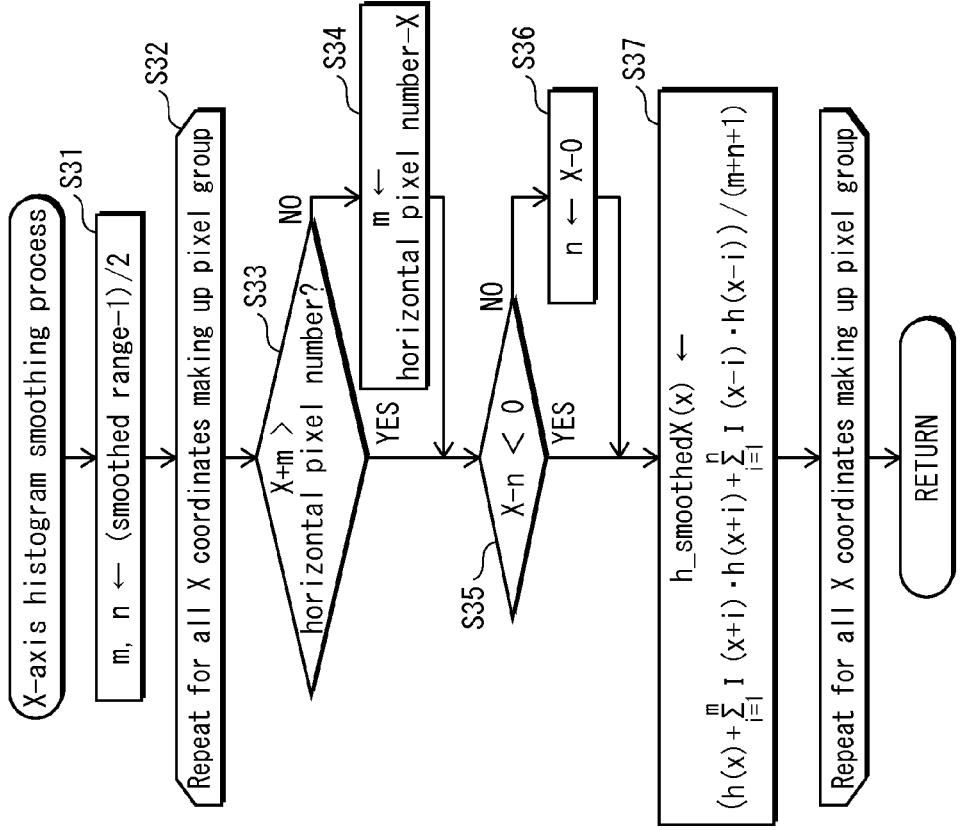

Step S13 in the flowchart of FIG. 13 is represented as subroutines in FIGS. 15A and 15B. FIG. 15A pertains to the X-axis histogram smoothing process. As shown, the process depicted in the flowchart is executed upon receiving one or more arguments, and returns a smoothed X-axis histogram when the process is complete. The variable m used in this flowchart defines the range of convolution applied to the positive direction of the X axis. Likewise, the variable n defines the range of convolution applied to the negative direction of the X axis.

In step S31, a calculation of (pixel group width−1)/2 is made, and the variables m and n are initialised. In step S32, the loop is defined. The loop repeats the processing of steps S33 through S37 for all X coordinates of pixels in the pixel group. Step S33 is a determination regarding whether the sum x+m exceeds the amount of horizontal pixels in the screen. In the affirmative case, (horizontal pixels in screen−x) is set to the variable m in step S34. In the negative case, m is not reset. Step S35 is a determination regarding whether or not the difference x−n is less than zero. In the affirmative case, the variable n is set to (x−0) in step S36. In the negative case, n is not reset. Step S37 applies the maximum value of the histogram and the neighbouring values for the X coordinates to a predetermined mathematical formula, thus establishing the X-coordinate values for the smoothed X-axis histogram. The formula used in step S37 is as follows. Here, hsmoothed#x(x) indicates a value of an X coordinate in the smoothed X-axis histogram.

The formula $\Sigma I(x+i) \cdot h(x+i)$ in step S37 represents the impulse response convolution, and is a convolution calculated for m neighbouring pixels. The index represents a given one among the plurality of neighbouring pixels in the positive direction of the X axis. Here, h(x+i) indicates the value of the histogram at i coordinates away from the X coordinate. Also, I(x+i) indicates the impulse response for calculating the value of the pixel at i coordinates away from the X coordinate. The $\Sigma$ symbol indicates that the sum of I(x+i) and h(x+i) is being calculated. The formula $\Sigma I(x-i) \cdot h(x-i)$ represents the impulse response convolution, and is a convolution calculated for m neighbouring pixels. The index i represents a given one among the plurality of neighbouring pixels in the positive direction of the X axis. Here, h(x−i) indicates the value of the histogram at i pixels forward of the X coordinate. Also, I(x−i) indicates the impulse response for calculating the value of the pixel at i coordinates forward of the X coordinate. The E symbol indicates that the sum of I(x−i) and h(x−i) is being calculated. The sum is then divided by (m+n+1) and the remainder is taken as the value in the smoothed X-axis histogram.

FIG. 15B pertains to the Y-axis histogram smoothing process. The significance of indices m and n is as described above for FIG. 15A. In step S41, a calculation of (pixel group width−1)/2 is made, and the variables m and n are initialised. In step S42, the loop is defined. The loop repeats the processing of steps S43 through S47 for all Y coordinates of pixels in the pixel group. Step S43 is a determination regarding whether the sum y+m exceeds the amount of vertical pixels in the screen. In the affirmative case, (vertical pixels in screen−x) is set to the variable m in step S44. In the negative case, m is not reset. Step S45 is a determination regarding whether or not the difference y−n is less than zero. In the affirmative case, the variable n is set to (y−0) in step S46. In the negative case, n is not reset. Step S47 applies the maximum value of the histogram and the neighbouring values for the Y coordinates to a predetermined mathematical formula, thus establishing the Y-coordinate values for the smoothed Y-axis histogram. The formula used in step S47 is as follows. Here, hsmoothed#y(y) indicates a value of a Y coordinate in the smoothed Y-axis histogram.

The mathematical formula $\Sigma I(y+i) \cdot h(y+i)$ in step S47 indicates the impulse response convolution applied to m pixels in the positive direction of the Y axis. The index i represents a given one among the plurality of neighbouring pixels in the positive direction of the Y axis. Here, h(y+i) indicates the value of the histogram at i pixels away from the Y coordinate. Likewise, I(y+i) indicates the impulse response to which the convolution is applied in order to calculate the value at i coordinates away. The $\Sigma$ symbol indicates that the sum of I(y+i) and h(y+i) is being calculated. The mathematical formula $\Sigma I(y-i) \cdot h(y-i)$ indicates the impulse response convolution applied to m pixels in the negative direction of the Y axis. Here, h(y−i) indicates the value of the histogram at i pixels forward of the Y coordinate. Likewise, I(y−i) indicates the impulse response to which the convolution is applied in order to calculate the value at y−i coordinates. The E symbol indicates that the sum of I(y−i) and h(y−i) is being calculated. The sum is then divided by (m+n+1) and the remainder is taken as the value in the smoothed Y-axis histogram. The smoothing of the histograms performed in steps S37 and S47 as described above is performed by summing a value h(x) of a pixel having an X coordinate and the values h(x+i) of neighbouring pixels, and then dividing. When i=1, the calculation is I(x−1)h(x−1)+I(x+1)h(x+1)/3.

According to the above-described Embodiment, the application is enabled to move in response not only to motion on the surface of the screen, but also to movements of the stylus approaching or moving away from the screen. The application is able to change the multi-view video stream that is subject to playback whenever the coordinates of the tip of the stylus are within a spatial interval determined in advance within the three-dimensional coordinates of a spatial interval for which stereoscopic information is defined. When the post-change multi-view video stream is a video of a stereoscopic object moving away, the user experiences the stereoscopic object responding to an operation made with the stylus.

Embodiment 2

Embodiment 2 pertains to improved processing for beneficial contrast in the capture target. When the stylus is selected as the capture target, indoor lighting or outdoor sunlight may produce a stylus image in the captured frame image having contrast between a plurality of colours. The contrasting colours include a colour of a directly-illuminated portion, a normally-illuminated portion, and a shadowed portion. For example, although the stylus may have a single formation colour and painted colour, the play of light thereon creates a contrast on the capture target. Thus, in the present Embodiment, a plurality of colours including a colour of a directly-illuminated portion, a colour of a normally-illuminated portion, and a colour of a shadowed portion are registered in the image processing device. Then, a pixel group is extracted for each designated colour, and the X-axis and Y-axis histograms are generated for each extracted pixel group. A combined histogram is then generated from the X-axis histogram and Y-axis histogram of each designated colour.

Figure 16:
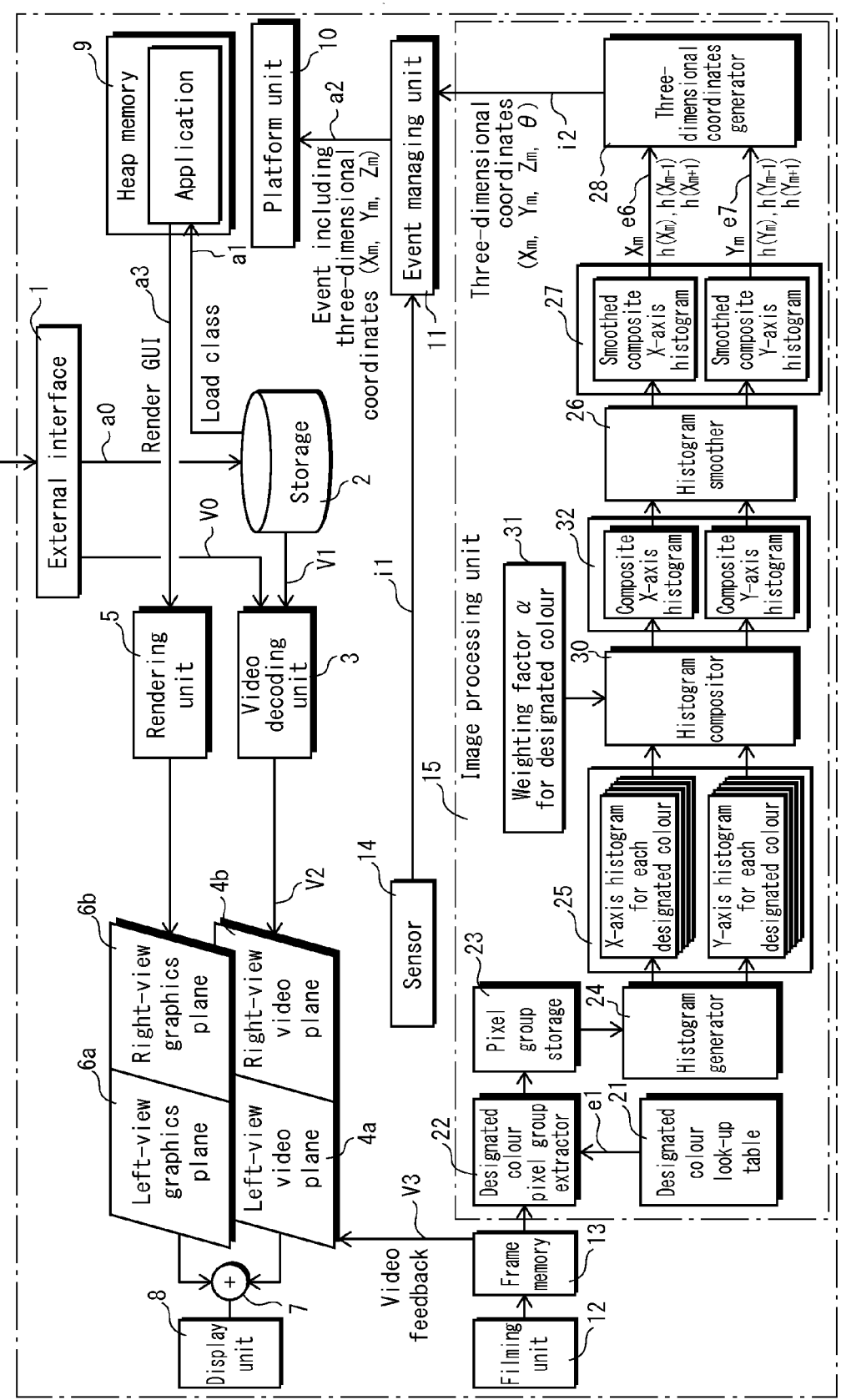
FIG. 16 illustrates the internal configuration of a display device pertaining to Embodiment 2.

FIG. 16 illustrates the internal configuration of an image processing unit 15 pertaining to Embodiment 2. As shown, the configuration is similar to that illustrated in FIG. 3, differing only in terms of additional components. That is, the internal configuration of the image processing device shown in FIG. 16 features newly-added components and previously-described components that have been modified accordingly.

The newly added components have reference signs in the thirties. These include a histogram compositor 30 calculating a value of a designated pixel colour indicated in an X-axis histogram and a value of the designated pixel colour indicated in a Y-axis histogram for all coordinates, thus obtaining a composite X-axis histogram and a composite Y-axis histogram, a weighting factor storage 31 storing, for each designated colour, a factor for weighting the histogram values during compositing, and a composite histogram storage 32 storing the composite X-axis and Y-axis histograms. The improvements to previously-described components influenced by the newly-added components are as follows: (1) the histogram generator 24 generates the X-axis histogram and the Y-axis histogram for each designated colour and stores the histograms in the histogram storage 25 before passing the results to the histogram compositor 30; (2) the target of smoothing by the histogram smoother 26 is the composite X-axis and Y-axis histograms stored in the composite histogram storage 32; and (3) the smoothed composite X-axis and Y-axis histograms smoothed by the histogram smoother 26 are used as the basis of three-dimensional coordinates generation by the three-dimensional coordinates generator 28. Accordingly, the stylus tip is captured using two or more colours, the three-dimensional coordinates of the tip are obtained, and the application is controlled on the basis thereof.

Figure 17:
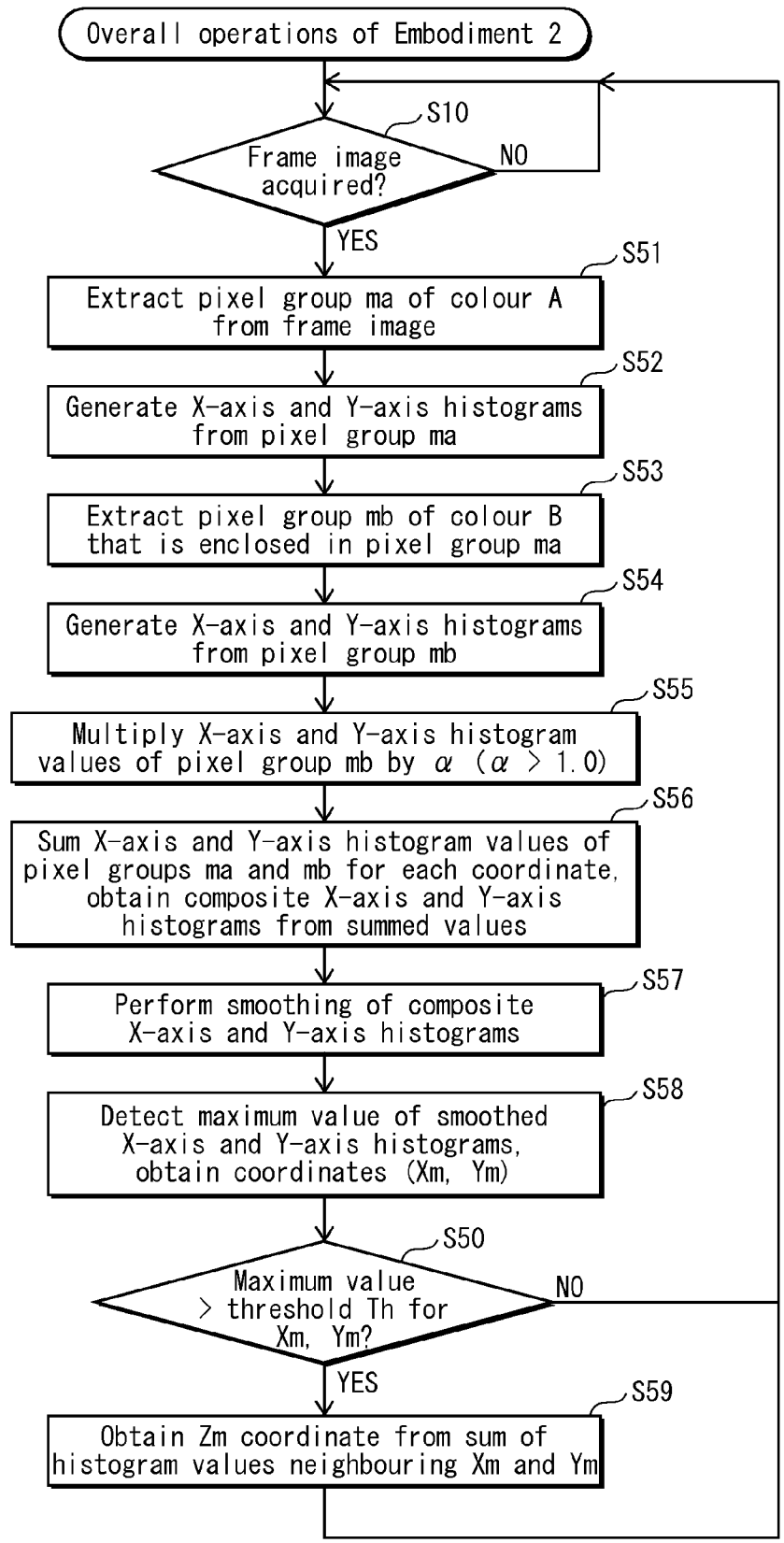
FIG. 17 is a flowchart indicating the overall operations pertaining to Embodiment 2.

FIG. 17 is a flowchart indicating the overall operations pertaining to Embodiment 2. This flowchart is based on the flowchart depicted in FIG. 13, differing in that some steps have been replaced with new steps.

The new steps are executed when step S10 of FIG. 13 results in a YES. The new steps have reference signs in the fifties. The sequence of new steps is as follows. First, pixel group ma of colour A is extracted from a frame image (step S51). Then, an X-axis histogram and a Y-axis histogram are generated for the pixels making up the pixel group ma (step S52). Next, pixel group mb of colour B is extracted such that pixel group mb is enclosed within pixel group ma (step S53). X-axis and Y-axis histograms are generated from the pixels making up pixel group mb (step S54). Subsequently, the values of the X-axis and Y-axis histograms for pixel group mb are multiplied by a factor of a (step S55). Then, the X-axis and Y-axis histograms for pixel group ma and for pixel group mb are summed for each of the coordinates, thus obtaining a composite X-axis histogram and a composite Y-axis histogram using the total X-coordinate and Y-coordinate values (step S56). Next, the composite X-axis and Y-axis histograms are smoothed, and the maximum values of the composite X-axis and Y-axis histograms are detected to obtain the paired coordinates $(X_m, Y_m)$ (step S58). Step S10 is looped when a determination of whether the maximum value of $(X_m, Y_m)$ in step S50 exceeds a threshold Th is negative. When the determination is affirmative, the Z coordinate is calculated from the sum of the vicinity of each coordinate $X_m$ and $Y_m$. A new frame image is input for every iteration of the loop. Each new frame image serves as the target of histogram generation in the current loop.

Figure 18:
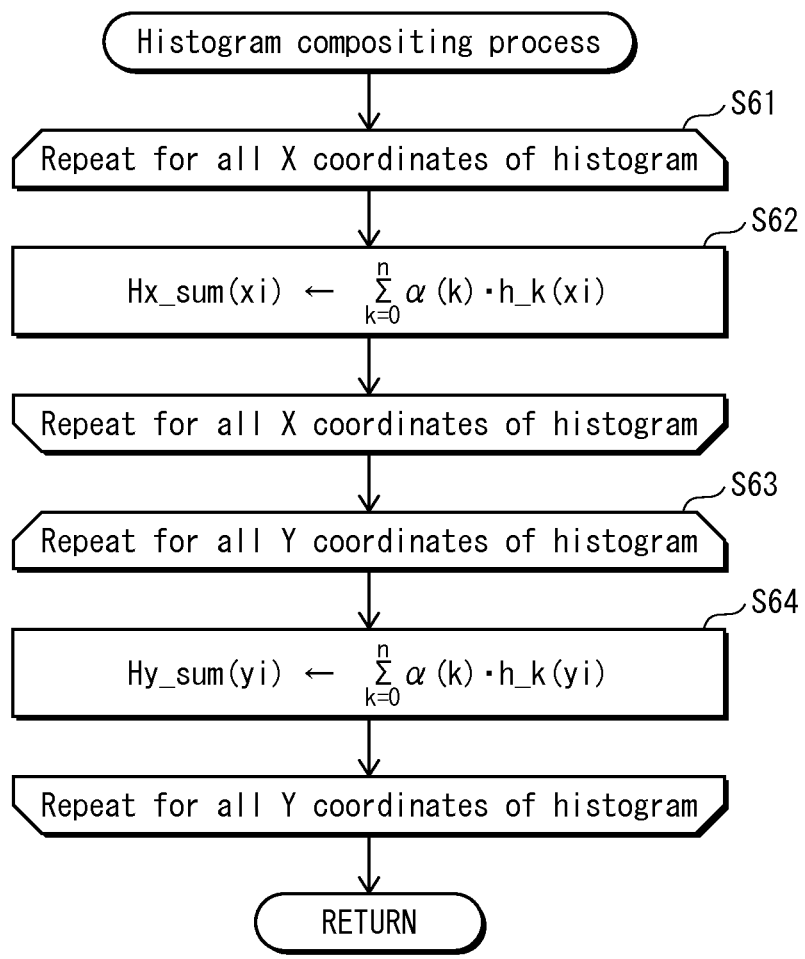
FIG. 18 is a flowchart pertaining to a histogram compositing process.

Step S56 in the flowchart of FIG. 17 is presented as a subroutine in FIG. 18. FIG. 18 pertains to the histogram compositing process. In this flowchart, k is an index indicating each of a plurality of designated colours, and α(k) is a weighting factor of a designated colour (k). Here, h#k(xi) indicates the value of a coordinate xi in the X-axis histogram generated for designated colour (k). Also, Hx#sum(xi) indicates the value of a coordinate xi in the composite X-axis histogram generated for designated colour (k). As shown, the process depicted in the flowchart is executed upon receiving one or more arguments, and returns a composite X-axis histogram and a composite Y-axis histogram when the process is complete.

In step S61, a loop is defined that repeats execution of step S62 for each X coordinate in the X-axis histogram. The Σ calculation in step S62 is a calculation of multiplying the weighting factor α(k) for each designated colour (k) by the value h#k(xi) of each coordinate xi in the X-axis histogram generated for the designated colour (k), for all designated colours (where k is an index of value 1 through n representing a designated colour). The sum of the results Hx#sum (xi) is the value of the coordinate xi in the composite X-axis histogram generated for the designated colour (k). This loop of processing provides the X-axis histogram value for each designated colour as the loop is repeated.

In step S63, a loop is defined that repeats execution of step S64 for each Y coordinate in the Y-axis histogram. The Σ calculation in step S64 is a calculation of multiplying the weighting factor α(k) for each designated colour (k) by the value h#k(yi) of each coordinate yi in the Y-axis histogram generated for the designated colour (k), for all designated colours (where k is an index of value 1 through n representing a designated colour). The sum of the results Hy#sum (yi) is the value of the coordinate yi in the composite Y-axis histogram generated for the designated colour (k). This loop of processing provides the Y-axis histogram value for each designated colour as the loop is repeated. The processing thus provides a plurality of data elements, one per iteration of the loop.

The technical significance of the processing applied to the histograms in the present Embodiment is described below. The designated colour of the pixel group subject to extraction is registered in the look-up table as a combination of a luminance Y, a red-difference Cr, and a blue-difference Cb defining the designated colour. However, in some cases, a single registered combination of luminance Y, red-difference Cr, and blue-difference Cb may be insufficient to acquire enough information for histogram generation.

Conversely, when the histogram is used to produce a target pixel group with a combination of luminance Y, red-difference Cr, and blue-difference Cb for which the lower bits include some variance, then pixels that do not represent the stylus but are coloured similarly may be picked up. The pixels that do not represent the stylus but are coloured similarly may represent a portion of the user's clothing or an object in the background that happens to be coloured similarly to the stylus. However, a set of colours that make a contrast on the stylus may be used as the target of histogram generation, and such a histogram may be composited such that the values thereof are used. This enables colours that coincidentally resemble those of the stylus to be excluded from the depth value determination, despite appearing in the frame image. This is the technical significance of using contrast.

Figure 19A:
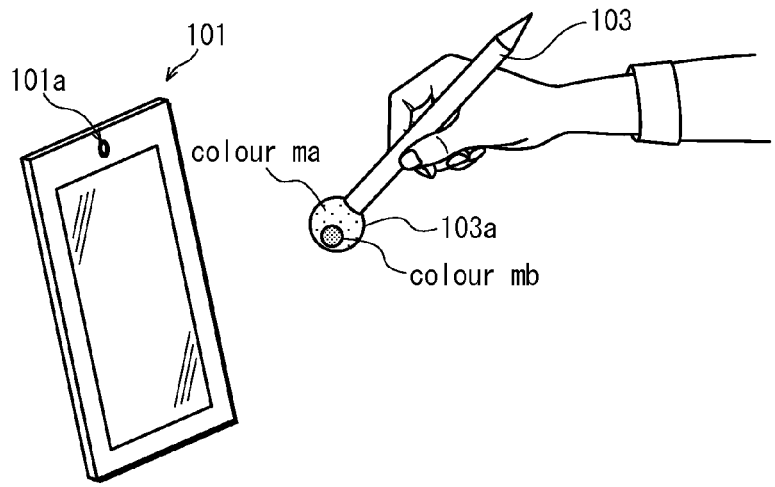
FIGS. 19A and 19B respectively illustrate a stylus pertaining to Embodiment 2, and a pixel group extracted for the stylus along with X-axis and Y-axis histograms generated therefrom.
Figure 19B:
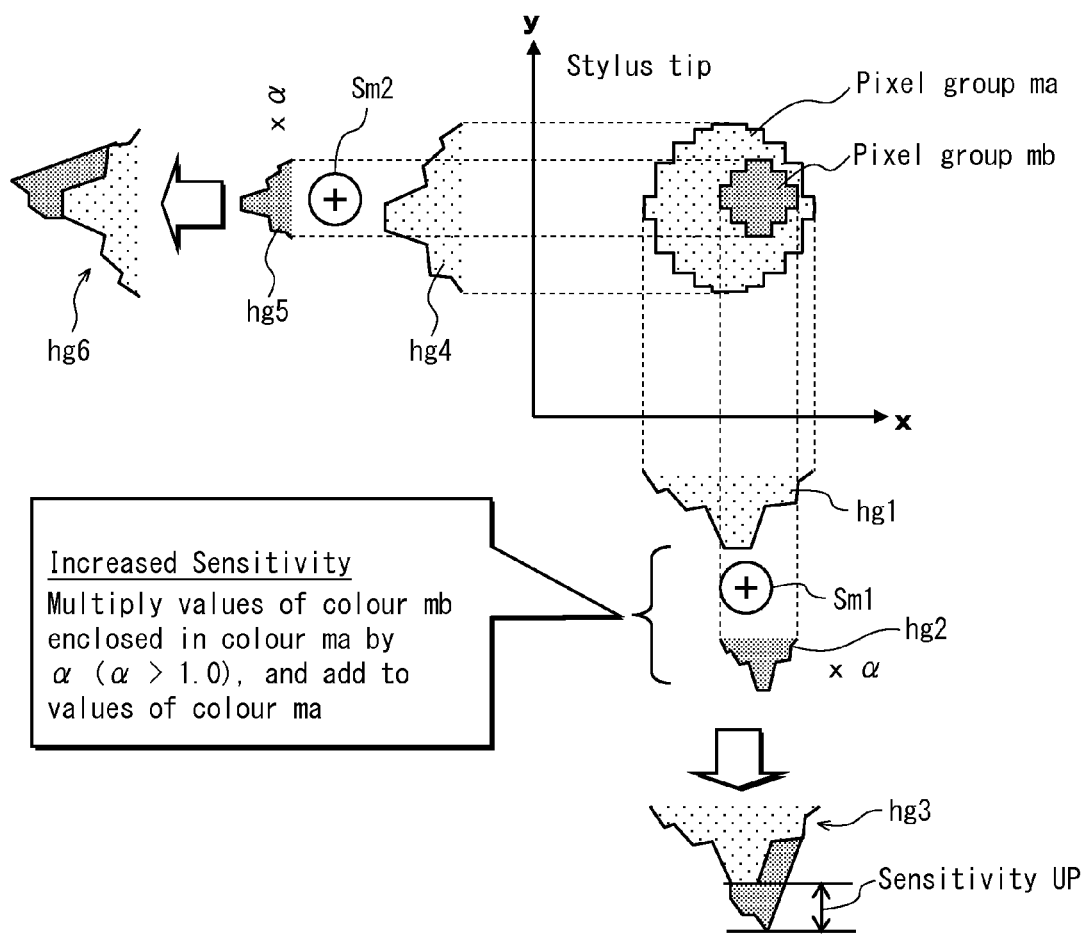

The principles of the contrast processing used in Embodiment 2 are described next, with reference to a specific example. The specific example is illustrated by FIG. 19A, in which a stylus is being used under indoor lighting. The stylus has been painted a colour corresponding to designated colour ma. However, the reflection from the indoor lighting causes highlights to appear. FIG. 19A depicts an annular region on the surface of the orb affixed to the end of the stylus having a highlighted portion under the lighting and thus appearing to be coloured as designated colour mb. Other regions of the surface appear as designated colour ma. The designated colour mb is registered in the image processing unit as a combination of a luminance Y, a red-difference Cr, and a blue-difference Cb. FIG. 19B indicates a pixel group extracted from the image of the orb, and the X-axis histogram and the Y-axis histogram generated therefrom. Here, the + symbol labelled sm1 indicates that X-axis histogram hg1 for designated colour ma and X-axis histogram hg2 for designated colour mb are subject to addition, and schematically represents the composite X-axis histogram hg3 thus obtained. Likewise, the + symbol labelled sm2 indicates that Y-axis histogram hg4 for designated colour ma and Y-axis histogram hg5 for designated colour mb are subject to addition, and schematically represents the composite Y-axis histogram hg6 thus obtained.

Next, as a follow-up to the overview of the X-axis histogram and Y-axis histogram compositing, the steps thereof are described in detail with reference to FIGS. 20A through 20D.

Figure 20A:
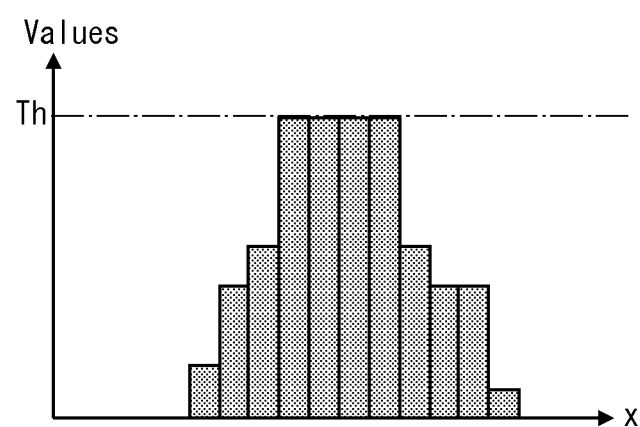
FIGS. 20A through 20D illustrate an X-axis histogram generated for a pixel group of designated colour ma, and an X-axis histogram generated for a pixel group of designated colour mb.
Figure 20B:
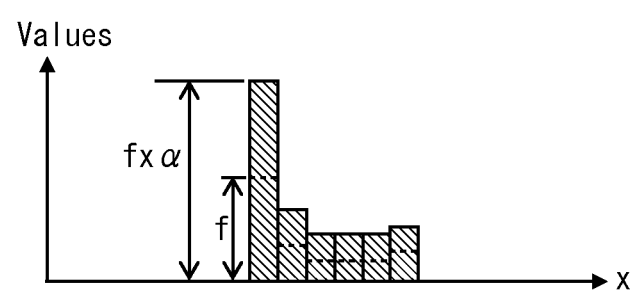
Figure 20C:
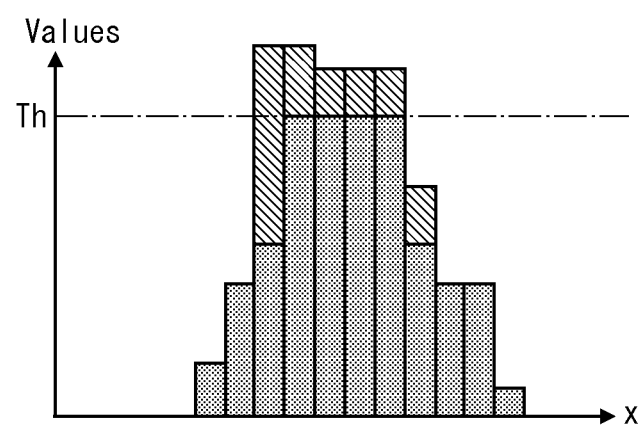
Figure 20D:
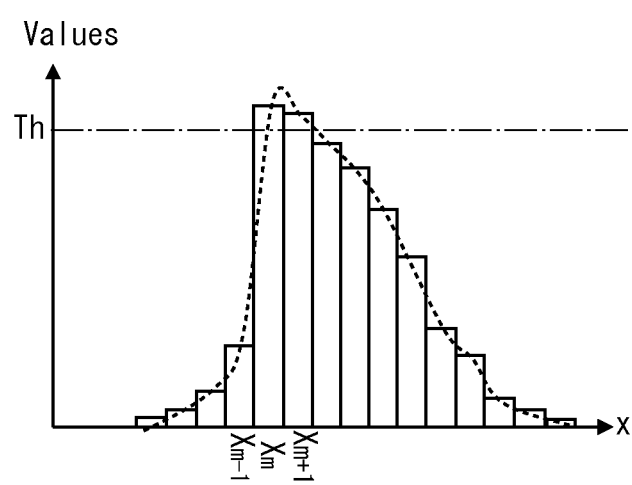

FIG. 20A illustrates an X-axis histogram generated for a pixel group of designated colour ma, and FIG. 20B illustrates an X-axis histogram generated for a pixel group of designated colour mb. A weighting factor is assigned to designated colour mb, such that the values of the X-axis histogram for designated colour mb are multiplied by the factor of α. FIG. 20C illustrates a composite X-axis histogram obtained by compositing the X-axis histogram for designated colour ma and the X-axis histogram for designated colour mb. Although the values of the histogram for designated colour ma are all below the threshold, the values of the composite histogram include values that exceed the threshold. FIG. 20D indicates a smoothed composite X-axis histogram obtained by performing smoothing of the composite histogram. The dashed line indicates an approximate curve. Here, the X coordinate having the maximum value in the smoothed histogram and the pair of values neighbouring that X-coordinate (i.e., $X_m$, $X_{m-1}$, and $X_{m+1}$) are found.

For each of two designated colours, a histogram is generated from the pixels making up the pixel group with respect to the X axis and the Y axis (FIGS. 20A and 20B). Then, the histograms for the two colours are added together to generated a composite histogram (FIG. 20C). Further, the histogram is smoothed (FIG. 20D), and the smoothed histogram is used as the bases for depth value determination. Thus, the accuracy of detection is increased, enabling small objects to be detected.

Figure 21:
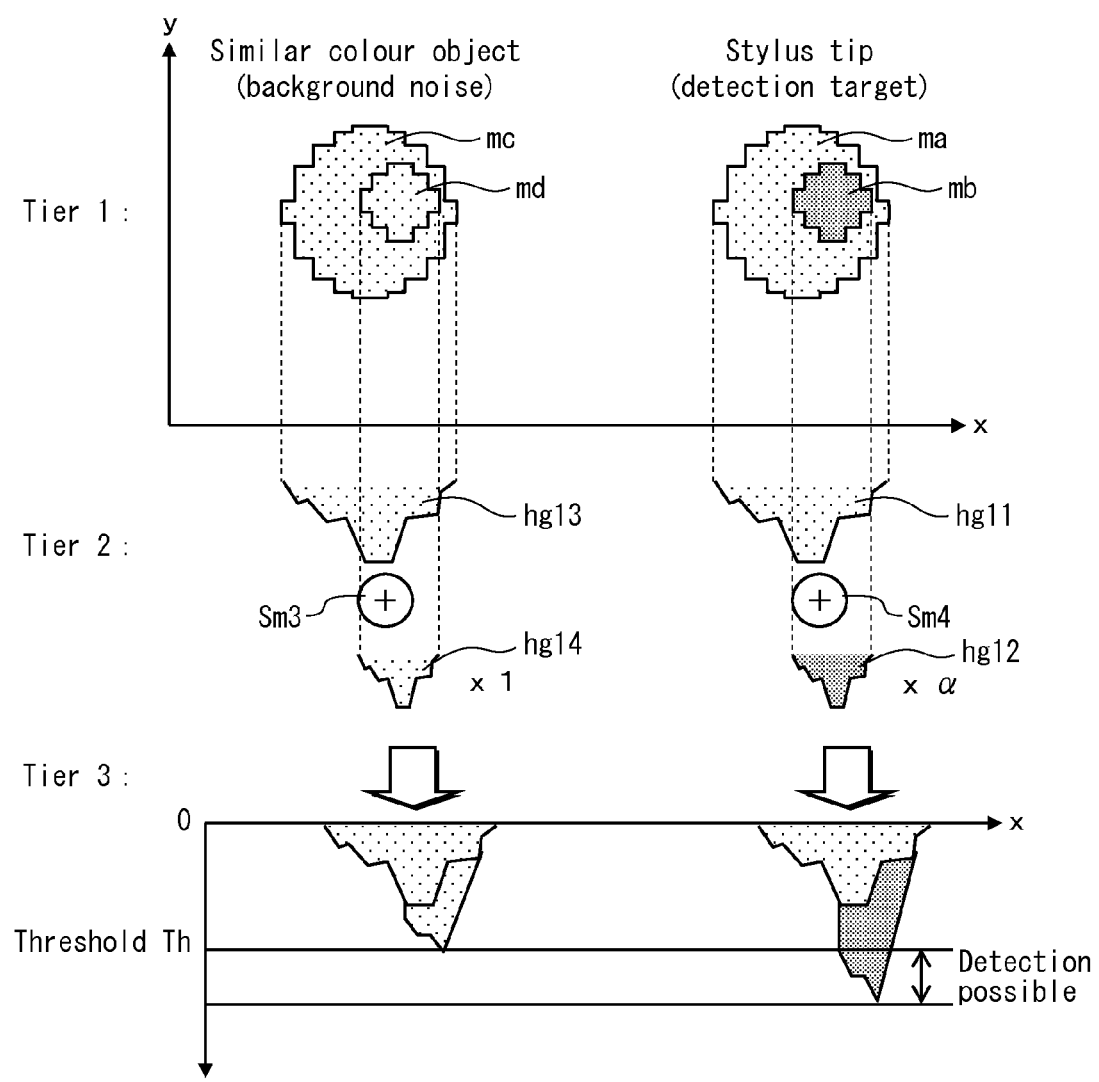
FIG. 21 illustrates a method of distinguishing an orb on the stylus from an object of a similar colour.

Having explained the details of the X-axis histogram compositing process, the method for distinguishing objects similar in colour to the orb of the stylus is described with reference to FIG. 21. The first tier of FIG. 21 illustrates a comparison between a pixel group extracted from the image of the orb on the stylus and a pixel group extracted from an image of an object in a similar colour. In FIG. 21, the object in the similar colour has a portion of colour mc and a contrasting portion of colour md. The contrasting colours mc and md are registered as designated colours, such that as shown in the second tier, X-axis and Y-axis histograms are generated for each of the colours mc and md.

The second tier shows two X-axis histograms generated for the respective designated colours from the pixel group in the similar colour, and two X-axis histograms generated for the respective designated colours of the pixel group of the orb on the stylus. Here, the + symbol labelled sm3 indicates that X-axis histogram hg11 for designated colour ma and X-axis histogram hg12 for designated colour mb are subject to addition, these colours representing the orb of the stylus. Likewise, the + symbol labelled sm4 indicates that X-axis histogram hg13 for designated colour mc and X-axis histogram hg14 for designated colour md are subject to addition, these colours representing the similar object.

The third tier indicates a composite X-axis histogram obtained by compositing the two X-axis histograms generated from the pixel group of the similar colour, and a composite X-axis histogram obtained by compositing the two X-axis histograms generated for the pixel group of the orb the stylus. Here, designated colour mb is registered with a factor α that is greater than one. Thus, the maximum value of the X-axis histogram obtained from the two X-axis histograms generated for the pixel group of the orb of the stylus exceeds the threshold Th.

In contrast, the pixel group of the similar colour does not include colour mb. Thus, the maximum value of the X-axis histogram obtained from the two X-axis histograms generated for the pixel group of the similar colour does not exceed the threshold Th. As described above, assigning a weighting factor to designated colour mb enables the pixel group of the orb on the stylus to be distinguished from another pixel group.

Erroneous object detection is prevented and three-dimensional coordinates generation is stabilised by setting a value less than the threshold Th in the X-axis histogram and the Y-axis histogram to zero, and subtracting the threshold Th from values greater than or equal to the threshold, thereby cancelling out background noise. Further, object detection is enabled through the increased sensitivity resulting from the above-described compositing process performed on the histograms. For example, when the threshold Th is located as shown in FIG. 20A, detection is impossible when the value is zero for one colour. However, this approach nevertheless provides results.

A situation is considered in which the stylus has two or more formation colours, painted colours, and wrapping colours. In such a situation, the lighting causes contrast to form for each of these colours. As such, a plurality of designated colours are registered in the image processing device, namely those of a directly-illuminated portion, a normally illuminated portion, and a shadowed portion. Then, a pixel group is extracted for each designated colour, X-axis and Y-axis histograms are generated for each extracted pixel group, and the histograms so generated are composited into composite X-axis and Y-axis histograms for each designated colour. This enables more precise depth value determination.

In the present Embodiment, the colour of a highlight on the stylus is registered as a designated colour. However, some form of marking in a specific colour may be applied to the tip of the stylus, and the combination of luminance Y, red-difference Cr, and blue-difference Cb of the marking may be registered as the designated colour mb.

Embodiment 3

Figure 22:
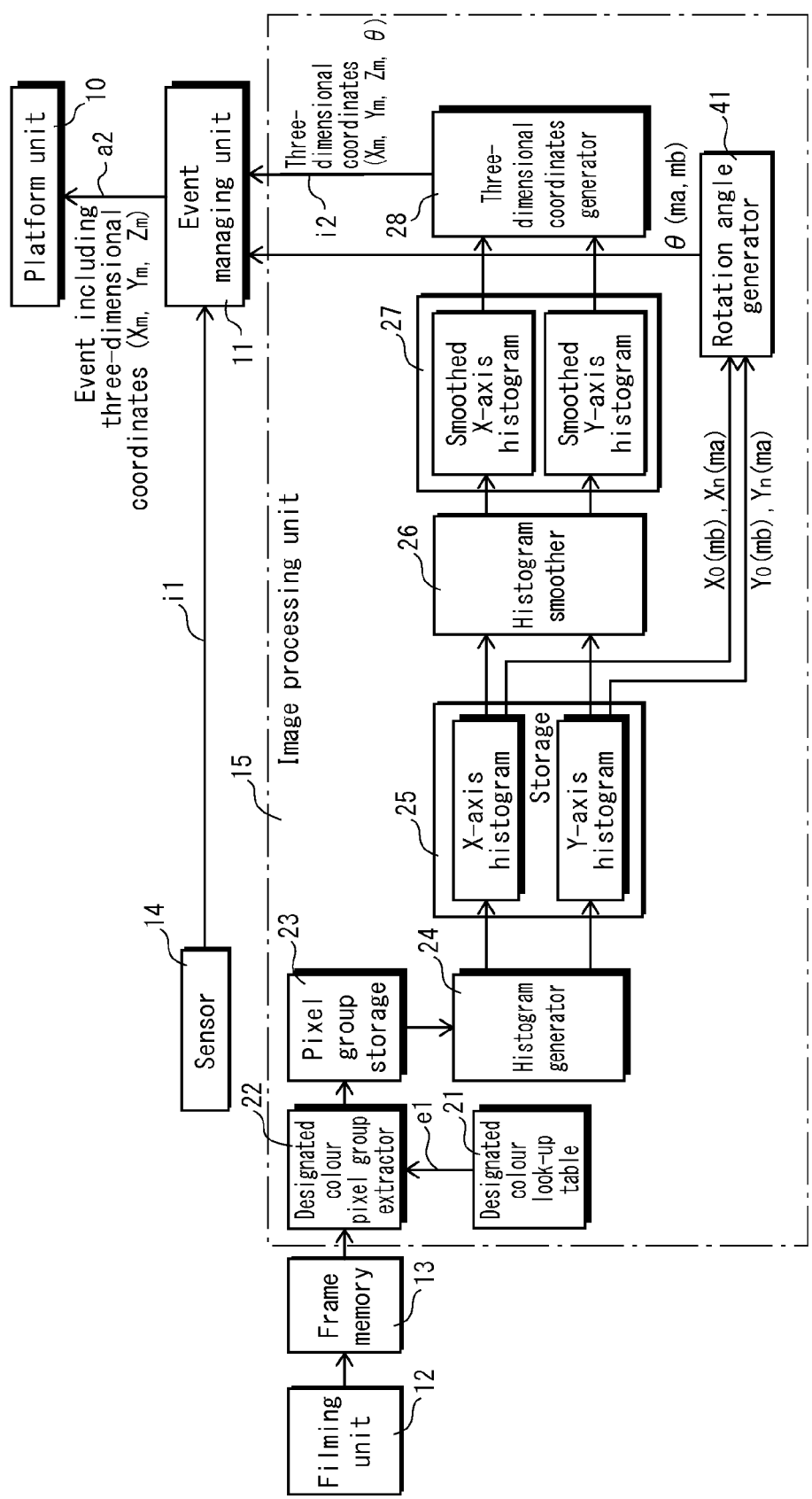
FIG. 22 illustrates the internal configuration of an image processing unit 15 pertaining to Embodiment 3.

In the present Embodiment, components are added that calculate not only the Z coordinate of the stylus, but also a rotation angle thereof. FIG. 22 illustrates the internal configuration of an image processing unit 15 pertaining to Embodiment 3. As shown, the configuration is similar to that illustrated in FIG. 3, differing only in terms of additional components. The newly-added components added in FIG. 2 include a rotation angle generator 41 that calculates a rotation angle of the stylus by obtaining an X coordinate and a Y coordinate from the X-axis histogram and the Y-axis histogram. The rotation angle generator 41 corresponds to the aforementioned rotation angle generator determiner, and the rotation angle generated by the rotation angle generator 41 serves as the basis for event generation by the event manager. The compositing unit described above in the preceding Embodiments is omitted from the following description. The inclusion of the newly-added component is entirely optional. The configuration of the stylus used in the present Embodiment is explained prior to describing the internal configuration of Embodiment 3.

The rotation angle is one of a roll angle measured when the stylus rotates about the X axis, a pitch angle measured when the stylus rotates about the Y axis, and a yaw angle measured when the stylus rotates about the Z axis. The rotation angle used in the following example is a roll angle. The principles of rotation angle determination in the present Embodiment are described below, as part of the specific example. In this example, the stylus shown in FIG. 23A is selected for use.

Figure 23A:
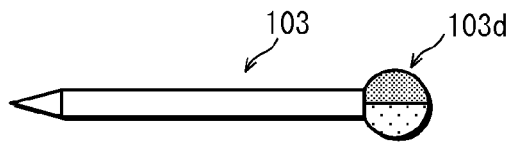
FIGS. 23A through 23D respectively illustrate a stylus pertaining to Embodiment 3, a pixel group extracted for the stylus, and X-axis and Y-axis histograms generated therefrom.

FIG. 23A is an outside view of the stylus pertaining to the present Embodiment. In FIG. 23A, the orb is painted on one side with designated colour ma, and is painted on the other side with designated colour mb.

Figure 23B:
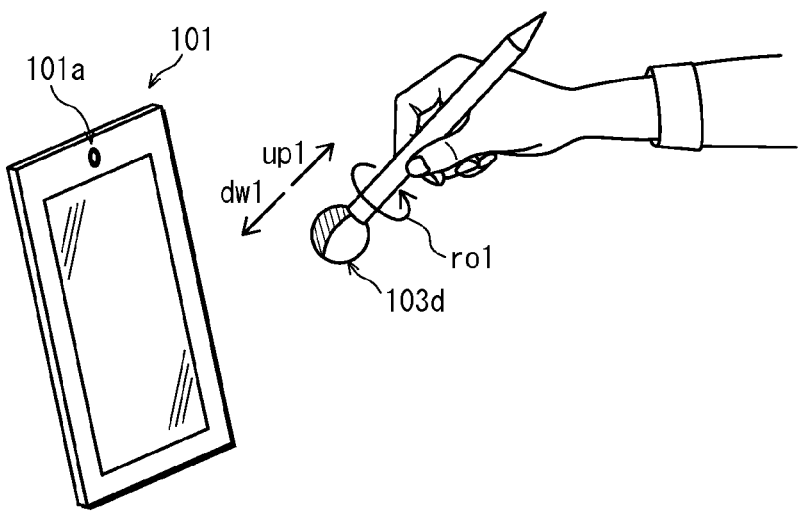

FIG. 23B illustrates the orb on the end of the stylus in motion with respect to the screen. The arrows up1 and dw1 indicate the path of motion perpendicular to the screen. The arrow ro1 indicates leftward and rightward rotation of the stylus. When the stylus has a rotation angle of θ with respect the X axis and the Y axis, the image of the boundary between the colours similarly makes an angle of θ. FIG. 24C illustrates the X-axis histogram and the Y-axis histogram for each designated colour generated from a filmed image of the orb having two colours.

Figure 23C:
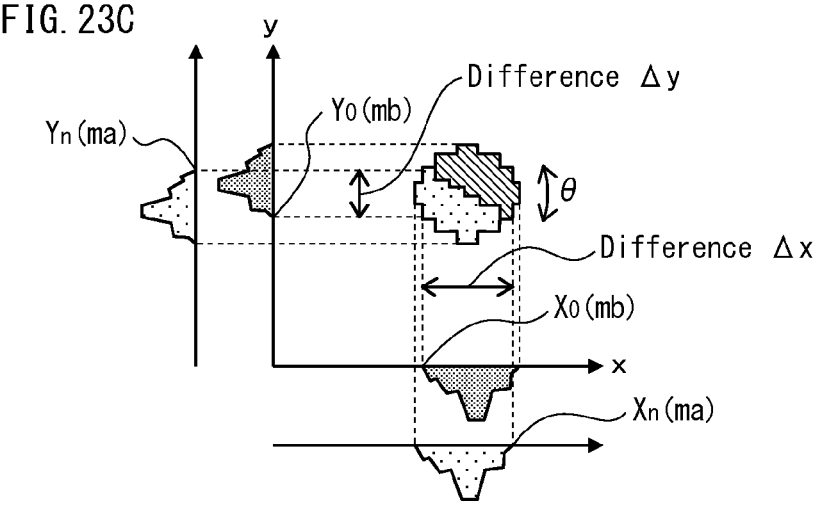

The Y-axis histogram for designated colour mb has a minimum coordinate $Y_0(mb)$ that is a smallest value of mb in the Y-axis histogram. The Y-axis histogram for designated colour ma has a maximum coordinate $Y_n(ma)$ that is a maximum value of ma in the Y-axis histogram. The X-axis histogram for designated colour mb has a minimum coordinate $X_0(mb)$ that is a smallest value of mb in the X-axis histogram. The X-axis histogram for designated colour ma has a maximum coordinate $X_n(ma)$ that is a maximum value of ma in the X-axis histogram. The Y-axis histograms for the designated colours shown in FIG. 23C indicate a difference Δy with respect to the Y axis, given as $Y_n(ma)-Y_0(mb)$. The X-axis histograms for the designated colours shown in FIG. 23C indicate a difference Δx with respect to the X axis, given as $X_n(ma)-X_0(mb)$.

Figure 23D:
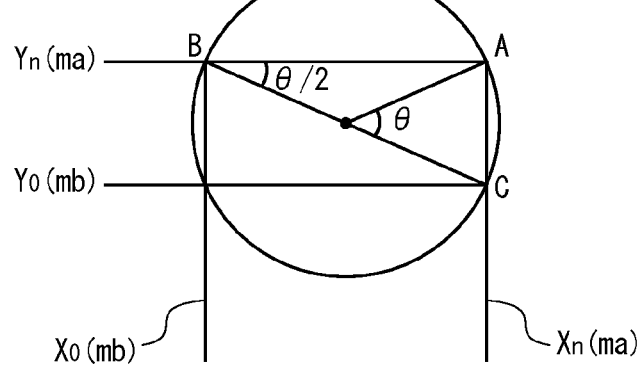

FIG. 23D illustrates the geometrical relationship between θ and the histogram coordinates. As shown, triangle ABC has a side AB that is equivalent to $X_n(ma)-X_0(mb)$, and a side AC that is equivalent to $Y_n(ma)-Y_0(mb)$. Also, an angle of θ/2 is formed between side AB and side BC. The relationship $\tan(θ/2)=AC/AB$ holds, and the angle θ is derived therefrom. Applying two colours to the orb of the stylus as shown in FIG. 23A enables a rotation angle θ to be obtained based on the relative positions of the colours, as shown in FIG. 23B.

Figure 24:
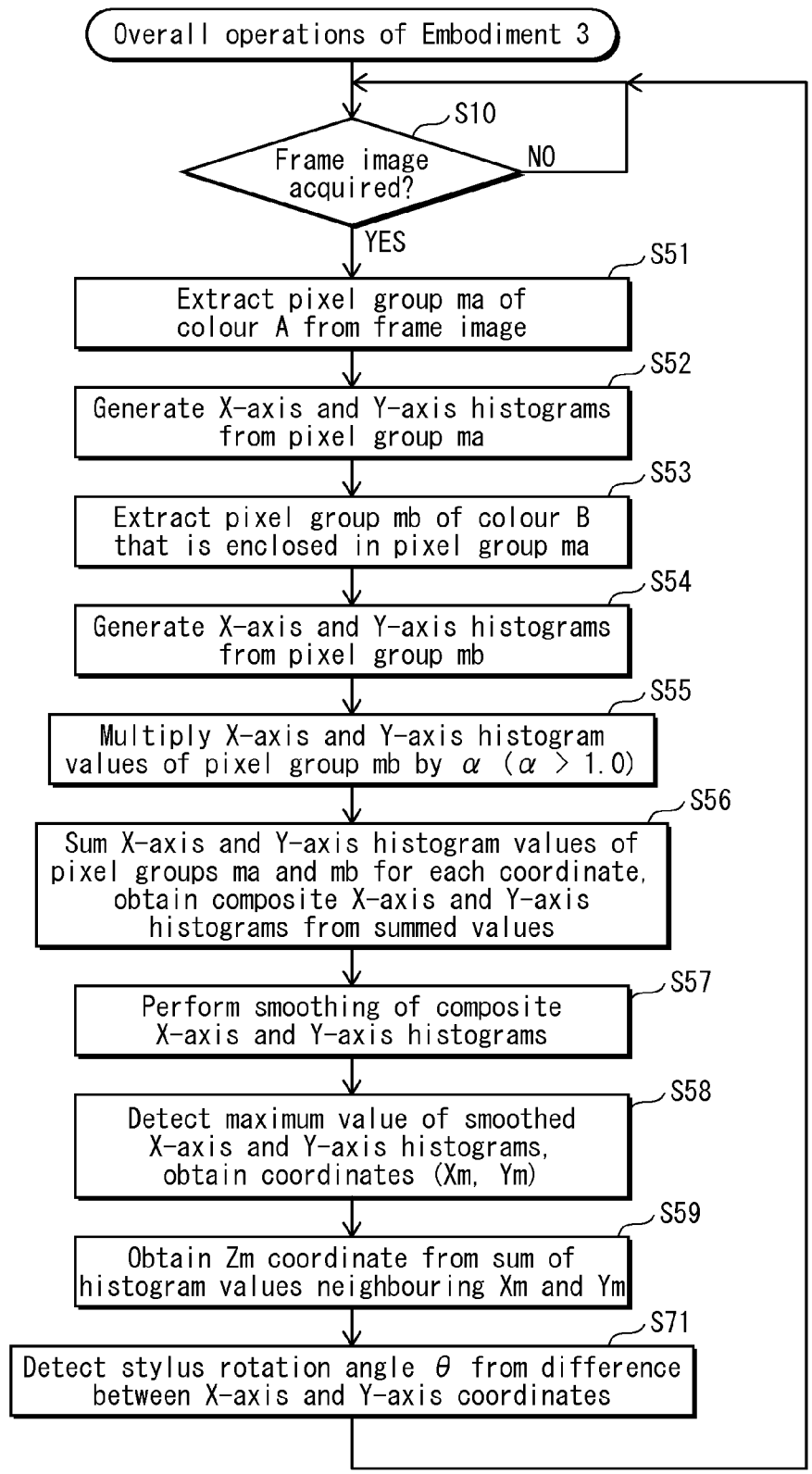
FIG. 24 is a flowchart indicating the overall operations of the image processing device pertaining to Embodiment 3.
Figure 25:
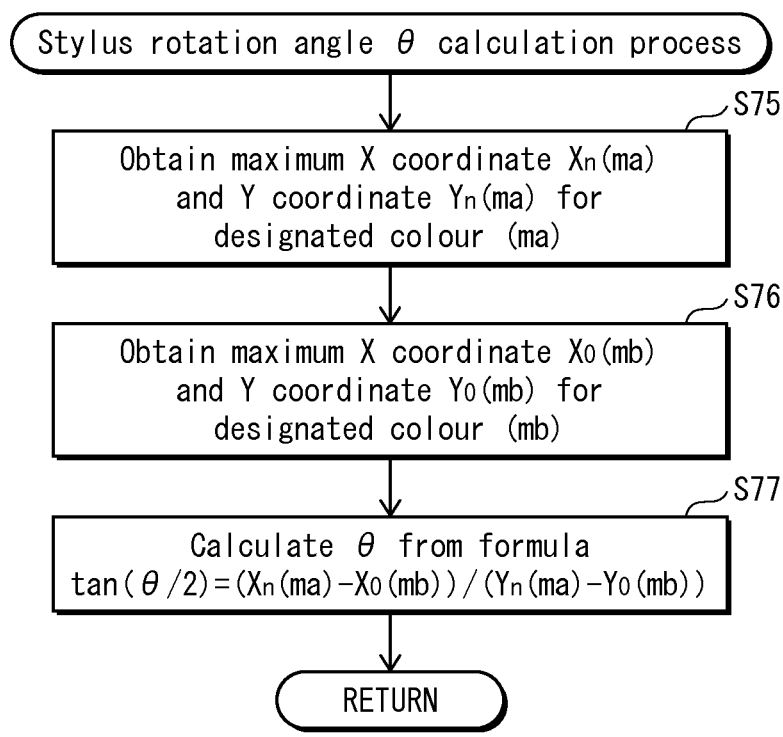
FIG. 25 is a flowchart indicating a calculation process for a rotation angle of the stylus.

FIG. 24 is a flowchart indicating the overall operations of the image processing device pertaining to Embodiment 3. This flowchart is based on the flowchart of FIG. 17, with improvements made thereto. The improvements to the flowchart are the addition of step S71 after the coordinate Zm is obtained from the sum of Xm, Ym, and neighbouring values in step S59. Step S71 involves calculating the rotation angle θ of the stylus from the difference in coordinates of the X-axis histograms and the Y-axis histograms. Step S71 in the flowchart of FIG. 24 is presented as a subroutine in FIG. 25. FIG. 25 is a flowchart indicating a calculation process for the rotation angle of the stylus. As shown, the process depicted in the flowchart is executed upon receiving one or more arguments, and returns the rotation angle of the stylus when the process is complete. Step S75 is a step of acquiring a maximum X coordinate $(X_n(ma))$ from the X-axis histogram for designated colour ma and acquiring a maximum Y coordinate $(Y_n(ma))$ from the Y-axis histogram for designated colour ma. Step S76 is a step of acquiring a maximum X coordinate $(X_0(mb))$ from the X-axis histogram for designated colour mb and acquiring a maximum Y coordinate $(Y_0(mb))$ from the Y-axis histogram for designated colour mb. Finally, in step S77, the angle θ is calculated from the relation $\tan(θ/2)=(X_n(ma)-X_0(mb))/(Y_n(ma)-Y_0(mb))$.

According to the above-described Embodiment, the process of generating three-dimensional coordinates from the X-axis histogram and the Y-axis histogram is accompanied by a process of calculating the rotation angle of the stylus. This enables the movements of the stylus in real space to be captured more precisely.

Embodiment 4

Figure 26A:
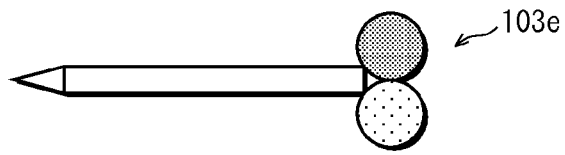
FIGS. 26A through 26E illustrate a stylus pertaining to Embodiment 4, a pixel group extracted for the stylus, and X-axis and Y-axis histograms generated therefrom.
Figure 26B:
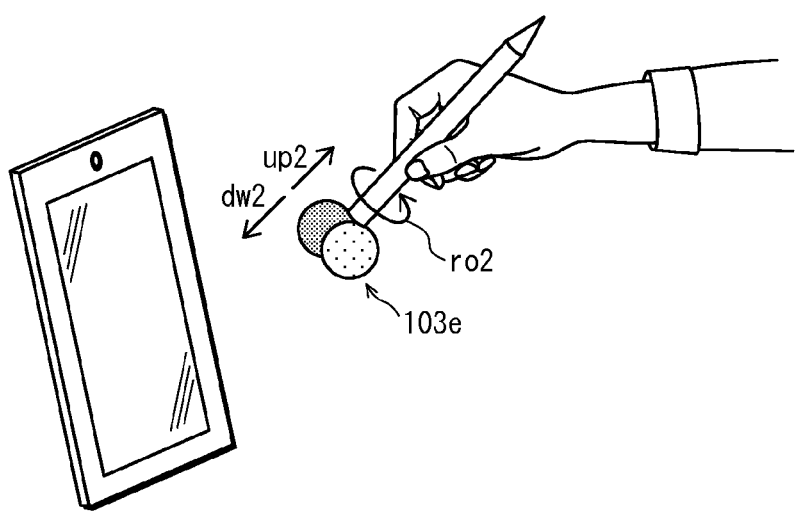

The present Embodiment discusses a stylus adapted to rotation angle determination. A configuration for a stylus adapted to rotation angle determination has two orbs affixed to the shaft of the stylus. FIGS. 26A through 26E pertain to the stylus of the present Embodiment. FIG. 26A shows the shaft of the stylus having an orb pair 103e in which one orb is painted designated colour ma and another orb is painted designated colour mb. FIG. 26B schematically shows the movements of the stylus as captured in the present Embodiment. The arrows up2 and dw2 indicate the path of motion perpendicular to the screen. The arrow ro2 indicates leftward and rightward rotation of the stylus. The principles of rotation angle determination using the aforementioned orb pair are described below, with reference to FIGS. 26C through 26E.

Figure 26C:
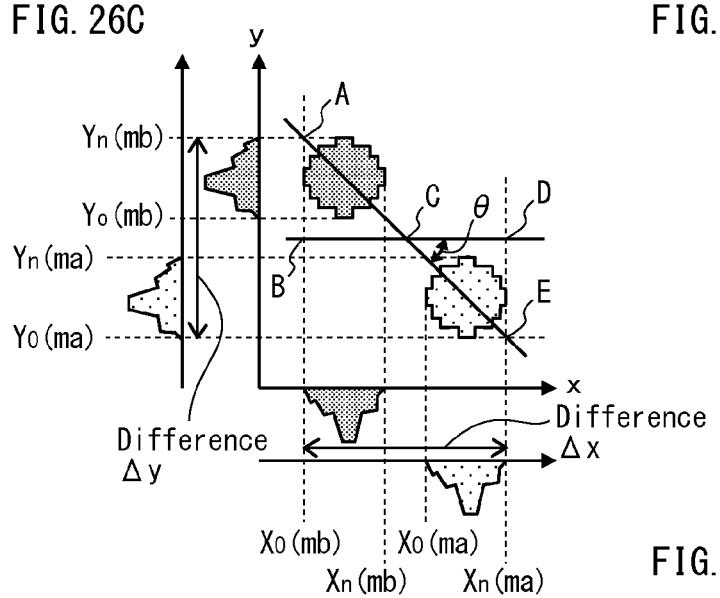

FIG. 26C indicates a pixel group acquired from a frame image of the orb pair 103e. FIG. 26C also depicts X-axis and Y-axis histograms generated for designated colour ma, and X-axis and Y-axis histograms generated for designated colour mb, with respect to the X-axis and the Y axis. The Y-axis histograms for the designated colours shown in FIG. 26C indicate a difference Δy in the Y axis, given as $Y_n(ma)-Y_0(mb)$. The X-axis histograms for the designated colours shown in FIG. 26C indicate a difference Δx with respect to the X axis, given as $X_n(ma)-X_0(mb)$.

Figure 26D:
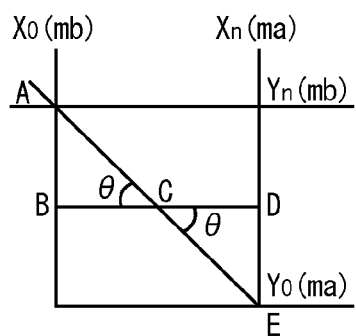
Figure 26E:
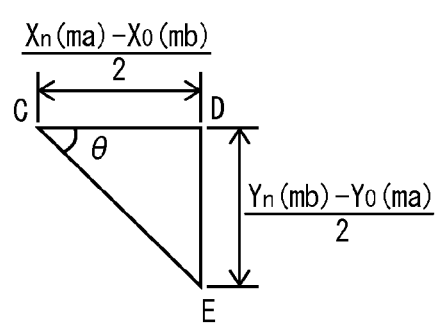

FIG. 26D illustrates the geometric relationships used to find the rotation angle of the stylus. The rotation angle θ of the stylus is found using triangles ABC and CDE in the XY plane. FIG. 26E illustrates the geometric relationships in extracted triangle CDE. The orbs have the same diameter, and the centre of each orb is at the same distance from the centre of the stylus. As such, triangle ABC and triangle CDE are congruent. Point E has an X coordinate of $X_n(ma)$ and point A has an X coordinate of $X_0(mb)$. As such, side BC and side CD each have a length equal to half of $X_n(ma)-X_0(mb)$, i.e., equal to $X_n(ma)-X_0(mb)/2$.

Similarly, point A has a Y coordinate of $Y_n(mb)$ and point E has a Y coordinate of $Y_0(ma)$. As such, side AB and side DE each have a length equal to half of $Y_n(mb)-Y_0(ma)$, i.e., equal to $Y_n(mb)-Y_0(ma)/2$.

Figure 27:
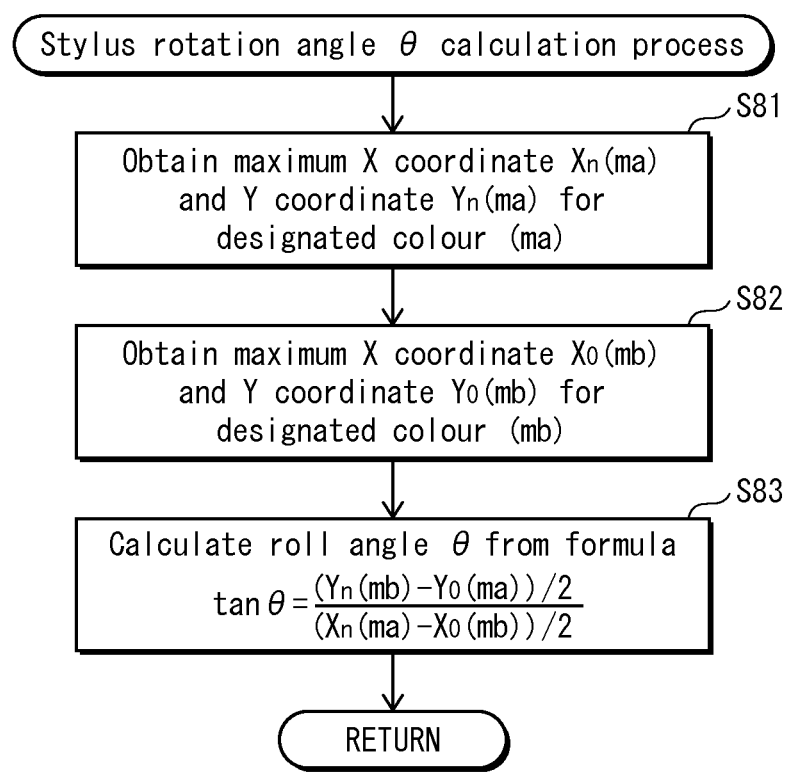
FIG. 27 is a flowchart indicating a calculation process for a rotation angle of the stylus.

This concludes the explanation of the improvements to the stylus made in the present Embodiment. Next, improvements to the operations performed in the present Embodiment are described. The improvements to the operations performed in the present Embodiment are realised according to the flowchart of FIG. 27, which represents the stylus rotation angle calculation in step S71 of FIG. 24. FIG. 27 is a flowchart indicating a calculation process for the rotation angle of the stylus. In FIG. 27, step S81 is a step of acquiring a maximum X coordinate $(X_n(ma))$ from the X-axis histogram for designated colour ma and acquiring a minimum Y coordinate $(Y_0(ma))$ from the Y-axis histogram for designated colour ma. Step S82 is a step of acquiring a minimum X coordinate $(X_0(mb))$ from the X-axis histogram for designated colour mb and acquiring a maximum Y coordinate $(Y_n(mb))$ from the Y-axis histogram for designated colour mb. Finally, in step S83, the angle θ is calculated from the relation $\tan(θ/2)=(Y_n(mb)-Y_0(mb)/2)/(X_n(ma)-X_0(mb))/2)$.

According to the above-described Embodiment, providing a plurality of orbs in different colours at end of the shaft of the stylus as shown in FIG. 26A enables the rotation angle θ to be obtained from the positional relationship between the colours, as shown in FIG. 26B. The stylus having the orb pair provided on the shaft produces histogram coordinates with a large difference for each of the designated colours. As such, this enables fine rotations of the stylus to be captured.

Embodiment 5

Figure 28A:
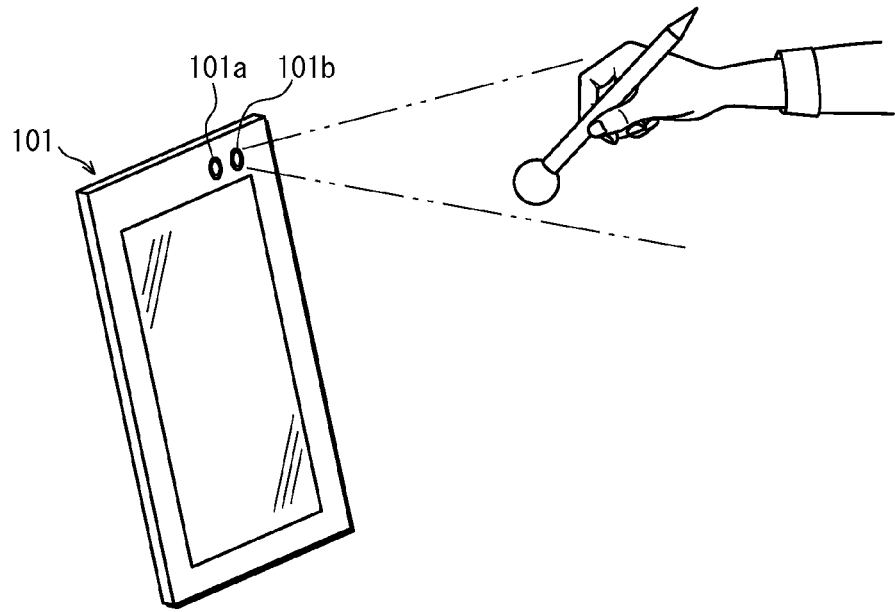
FIGS. 28A, 28B, and 28C illustrate a display device 101 equipped with a camera 101a and a light-emitting element 101b.
Figure 28B:
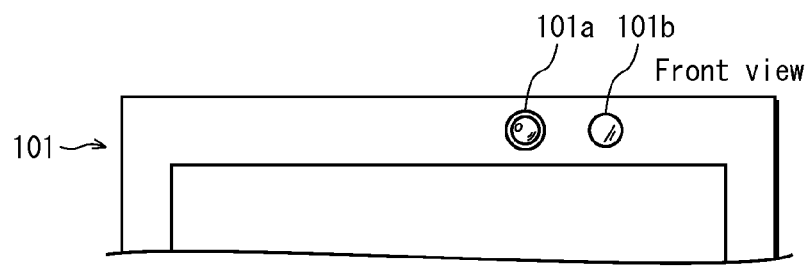
Figure 28C:
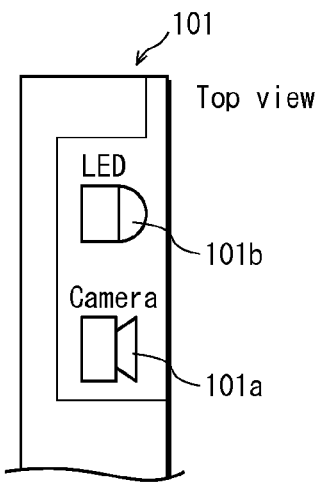

Embodiment 5 discloses a light-emitting element 101b that is equipped alongside the camera and provided on the stereoscopic display device. FIG. 28A is a perspective view of the present Embodiment, depicting the display device 101 having the camera 101a and the light-emitting element 101b, as well as the stylus 103. In FIG. 28A, the orb affixed to the end of the stylus is processed with a diffusing material that is white in colour and reflects the colour of the LED. FIG. 28B shows a frontal view of the camera 101a and the light-emitting element 101b at the front face of the display device. FIG. 28C shows a transparent view of the display device that indicates the arrangement of the camera 101a and the light-emitting element 101b as mounted in the display device. When the stylus is positioned as shown in FIG. 28A, the orb of the stylus diffuses the light emitted by the LED and the diffused light reaches the camera 101a. The image processing device has the colour of the orb when illuminated in this manner registered as a designated colour.

A pixel group of the colour so registered is then extracted and an image is generated therefrom.

The light-emitting element paired with the camera illuminates the stylus, the image processing unit 15 generates histograms from the image of the illuminated stylus, and the resulting histograms are used to determine the depth from maximum values of smoothed histograms. Thus, erroneous detection is avoided, despite the presence of a background colour similar to the designated colour of the stylus.

Embodiment 6

The stylus pertaining to Embodiment 1 is a two-way stylus having a pen tip adapted to making operations on a touch panel, and an orb adapted to capture as a capture target. However, this may lead to a problem in that the pen tip and the orb may be captured simultaneously and cause erroneous detection. In the present Embodiment, improvements to the stylus are described that provide a reduction in erroneous detection.

FIGS. 29A through 29E illustrate the improvements that prevent erroneous detection. FIG. 29A shows a stylus covered by a tubular case 110 such that the stylus is slidable within the case. The first tier of FIG. 29A shows the tubular case 110 sliding along the direction of shaft while containing the orb. The second tier shows a cross-sectional view in which the orb is contained. In such a situation, the orb on the shaft is hidden by the tubular case 110. The third tier shows a cross-sectional view where the tubular case has been made to slide toward the pen tip. In such a situation, the orb on the shaft is visible and is thus usable for making operations on the stereoscopic object. As described above, the case slides along the shaft to expose the pen tip, or slides toward the pen tip to expose the orb. Accordingly, one of the pen tip and the orb on the shaft is selectable for use as a target of three-dimensional coordinates generation. According to the stylus of FIG. 29A, the tip at one end of the stylus and the orb at the other end of the stylus are exposed by a sliding case. As such, erroneous detection is avoided even when the tip and the orb share the same colour.

FIG. 29B depicts a configuration where the stylus is filled with a gel resin. The first tier shows an external view of the stylus, which is provided with a push button 111 at one side and a through-hole 112 at the pen tip. The second tier shows a cross-sectional view. As shown in the second tier, an inner cavity of the stylus is filled with gel resin 113. The third illustrates the situation when the push button 111 is pushed down. Pushing down on the push button 111 causes the gel resin 113 to be extruded through the through-hole 112 such that a ball of gel forms at the pen tip side. The colour of the gel is registered in the look-up table of the image processing device as a designated colour. As such, when the user picks up the stylus and makes an operation while the ball of gel is formed at the pen tip of the stylus, histogram generation is performed using a pixel group representing the image of the gel. Depth value determination is then performed according to a maximum value of the smoothed histogram that results. According to FIG. 29B, when the push button 111 on the stylus is pressed down, an object made of coloured resin is formed at the tip, which is then filmed by the camera 101a. This prevents erroneous detection, even in cases where the tip and the orb share a common colour.

FIG. 29C shows an orb provided with a conical hole. The orb is provided on the stylus by fitting the pen tip of the stylus into this hole. According to FIG. 29C, the orb is speared by the pen tip, thus enabling operations to be made on the touch panel with only one end of the stylus while also enabling tracking operations by the camera 101a.

FIG. 29D shows an example of a pen tip that is a removable pyramid. FIG. 29E shows an example of an orb that is removable from the stylus. According to FIG. 29E, the colour of the pen tip or the colour of the orb at the back is changeable in accordance with background colours, thus reducing the chance of erroneous detection.

Embodiment 7

In the previous Embodiments, three-dimensional coordinates are generated for capturing a touch made on a stereoscopic object with a stylus, using a camera 101a. However, the present Embodiment concerns tracking the movements of the stylus along a screen.

The principles of capturing movement along a screen are described below with reference to FIGS. 30A through 30C.

Figure 30A:
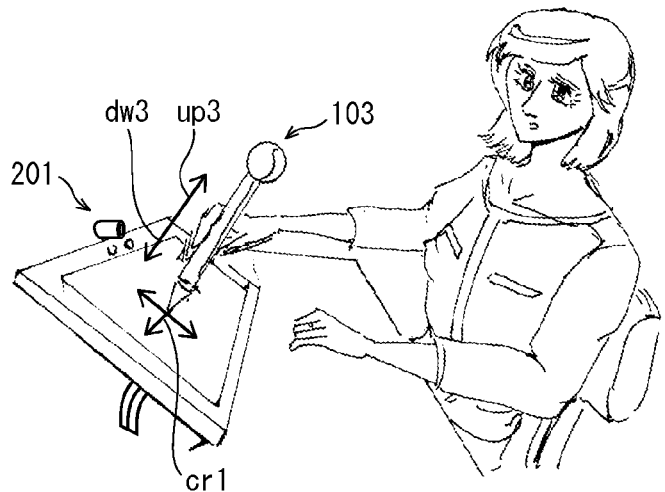
FIGS. 30A, 30B, and 30C illustrate a display device pertaining to Embodiment 7.
Figure 30B:
Figure 30C:
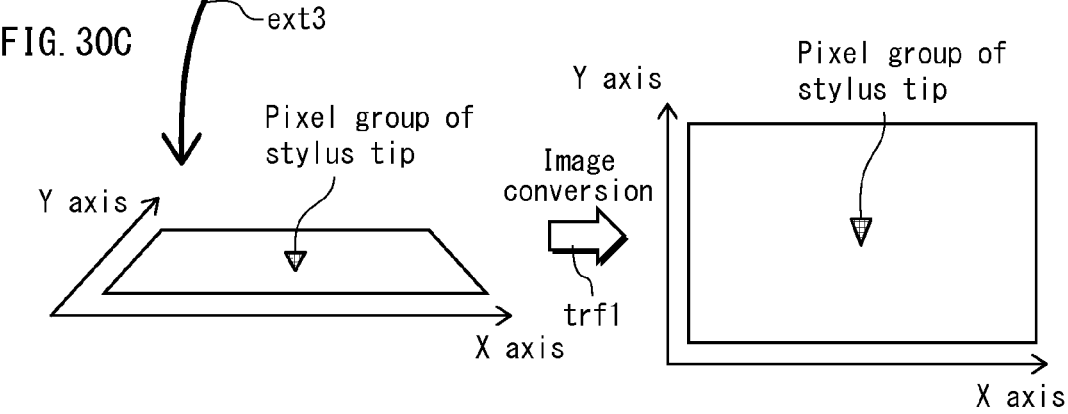

FIG. 30A is an external view of the display device used in Embodiment 7. A camera 201 is affixed to the display device via a support member, and is disposed so as to look down at the screen from an oblique perspective. In FIG. 30A, the screen of the display device is facing toward the upper right, and the tip of the stylus is sliding along the surface of the screen. Arrows up3 and dw3 indicate the upward and downward movement of the stylus relative to the screen. The crossing arrows cr1 schematically represent the path of the stylus tip on the screen. As clearly indicated by the path of the stylus tip, the present Embodiment captures not only movements of the stylus in space at a distance from the screen, but also captures movements of the stylus made along the surface of the screen. This is accomplished by having the image processing device perform three-dimensional coordinates generation from an image.

As shown in FIG. 30A, the camera 201a is located above the display. Thus, the image captured by the camera 201a shows the tip of the stylus rather than a frontal view of the user. FIG. 30B shows a frame image captured by the camera 201a shown in FIG. 30A. The frame image of FIG. 30B clearly shows the pen tip of the stylus in a lower portion thereof. A pixel group is then extracted from the frame image and image conversion is performed on the extracted pixel group, such that an extracted image of the lower half of the frame image is converted into a full-screen image. FIG. 30C shows the extracted image prior to conversion and the full-screen image after conversion. The left-hand side of FIG. 30C shows an extracted portion of the screen from the display device in the frame image of FIG. 30B. The camera is positioned obliquely above the screen. As such, the extracted portion of the screen is shaped as viewed from the oblique position (i.e., trapezoidally). Here, arrow ext3 in FIG. 30C schematically indicates the portion extracted from the frame image. Also, arrow trf1 schematically represents the conversion. The right-hand side of FIG. 30C shows the full-screen image after conversion. Given the image after conversion, three-dimensional coordinates generation is applicable to stylus operations made on a planar image. According to the configuration of Embodiment 7, motion of the pen tip along the screen is subject to capture and image processing by the image processing unit 15. Thus, a tablet terminal no longer requires a touch sensor, which leads to reduced costs.

According to the above-described Embodiment, a histogram is generated for a filmed image of the stylus in motion along the screen at a near distance therefrom. The resulting histogram is then smoothed, and the maximum value thereof is used for depth value determination. As such, coordinates indicating a depth value of the pen tip of the stylus are generated. The three-dimensional coordinates of the stylus and the rotation angle are used alongside a touch position on the screen and an orientation of the tablet terminal. Thus, an application can be executed according to operations made with the stylus at a spatial position. When the application is a game or a browser, the application is made to perform operations according to stereoscopic motions of the stylus.

Embodiment 8

In the present Embodiment, a three-dimensional gesture is realised that is applicable to capture as a capture target in the previously-described Embodiments. When the user draws a spiral at the front of the display device, an X-axis histogram and a Y-axis histogram are respectively generated for a plurality of frame images that illustrate the path of this movement. The three-dimensional coordinates generated therefrom enable a continuous line drawn by the user to be converted into a three-dimensional coordinate model in stereoscopic form. The upper portion of FIG. 31 illustrates a spiral drawn in space by the user, as well as three-dimensional coordinates tr1, tr2, tr3, etc. generated from the motion of the stylus.

The lower portion of FIG. 31 illustrates a pyramid drawn in space by the user, as well as three-dimensional coordinates ur1, ur2, ur3, etc. generated from the motion of the stylus.

A plurality of three-dimensional coordinates are generated, indicating the path of motion by the stylus as filmed in a plurality of frame images obtained by the camera 101*a*. A gesture made by the user is then identified according to the coordinates, and a stereoscopic model is generated therefrom, thus enabling display as computer graphics. The basics of gesture identification are as follows. The image processing device is equipped with a gesture dictionary. The dictionary lists gesture patterns to be identified, along with an example of a normalised three-dimensional vector sequence for each gesture. In the above example, a normalised three-dimensional vector sequence is respectively associated with each of the spiral and the pyramid. The three-dimensional coordinates for the capture target in each frame image are generated by the image processing device performing the image processing described in the preceding Embodiments on each of the plurality of frame images. A three-dimensional vector indicating the motion of the capture target is generated according to the plurality of three-dimensional coordinates and then normalised. The normalised three-dimensional vector is then used to search the aforementioned gesture dictionary, and a most similar gesture is selected. The application executes processing associated with the selected gesture. In such a situation, the user is able to use the stylus to draw a spiral and thereby cause a tornado in a game, or to draw a tetrahedron and thereby build a pyramid in the game.

(Notes)

The most desirable Embodiments known to the applicant at the time of application have been described above. However, additional improvements and variations are also possible, as discussed in connection with the following technical topics. Each of the Embodiments may optionally be realised as described above, or in combination with the following improvements and variations. These are left to the discretion of the person realising the Embodiment.

(Histogram Generation Adjustments)

The depth of a stereoscopic object varies according to the size of the screen. As such, the weighting factor applied when generating the histograms and when summing the histogram values, as well as the impulse response for convolution, may be adjusted according to the stereoscopic object depth.

(Touch Event Generation)

The target of a touch event is described above as being a specific spatial interval within three-dimensional coordinates. However, all events may be converted into touch events and transmitted as such to the application. Given that the portion of a stereoscopic object subject to operation varies among applications, this approach enables an application to perform appropriate processing. In such a situation, the event manager may cause the application to load processing.

A touch event that includes three-dimensional coordinates generated by the image processing device is usable for device set-up input, configuration input, and the like, by realising interactive processing through a GUI that allows user identification via password input.

(Stereoscopic Theatre System Applicability)

The display device described in Embodiment 1 may be part of a stereoscopic theatre system that includes a recording medium and playback device therefor, as well as the display device. In such a situation, the display device includes only the display unit and the image processing unit, while the platform unit, the heap memory, a video decoder, the rendering unit, the video planes, the graphics planes, and the event manager are components of the playback device. Here, the image processing device of the display device outputs three-dimensional coordinates to the playback device, using the display device as an interface. The playback device for the recording medium thus receives the three-dimensional coordinates and accordingly drives an application by generating events.

(Smoothing Variations)

In the above-described Embodiments, smoothing is realised by a moving average filter, a Gaussian filter, or an impulse response filter. However, no such limitation is intended. A calculation such as summing the values of a plurality of coordinates and dividing the result by the number of coordinates is also sufficient. Other examples are given below. Applicable methods of smoothing include kernel function smoothing, smoothing by locally fitting a polynomial, scatter plot smoothing, smoothing by fitting a spline function, moving line smoothing, Friedman super-smoothing, moving median smoothing, Tukey's running median smoothing, and endpoint smoothing applied to a moving median.

(Coordinates Subject to Value Summation)

The coordinates subject to summation of the histogram values may be a continuous set of coordinates along the X axis or the Y axis, or may be a fixed number of coordinates at a given separation. Separating the coordinates subject to summation enables a histogram having fewer coordinates to be used, and thus reduces the processing load of histogram generation.

(Values for Depth Value Determination)

The values serving as the basis of depth value determination are given above as a maximum value $X_m$, a preceding value $X_{m-1}$, and a subsequent value $X_{m+1}$. However, these may be replaced with $X_m$ and values at a given separation therefrom. Also, $X_m$ need not necessarily be used. The depth value determination may instead be based on the value of $X_{m-1}$ or of $X_{m+1}$, or otherwise based on values in the vicinity of the maximum value. Likewise, the values serving as the basis of depth value determination are given above as a maximum value $Y_m$, a preceding value $Y_{m-1}$, and a subsequent value $Y_{m+1}$. However, these may be replaced with $Y_m$ and values at a given separation therefrom. Also, $Y_m$ need not necessarily be used. The depth value determination may instead be based on the value of $Y_{m-1}$ or of $Y_{m+1}$, or otherwise based on values in the vicinity of the maximum value.

(Multi-View Video Stream Configuration)

The multi-view video stream is described above as being in a frame sequential format. However, the format may also be a vertical line interleave format, a horizontal line interleave format, a top-down format, a side-by-side format, a field sequential format, or a block interleaved format. The block interleaved format is, for example, used in a mixed video where a base viewpoint video and an additional viewpoint video are in block units that alternate such that the mixed video is distributed in blocks.

(Depth Determination Target)

The target of depth determination may also be a person or a person's body part. In such a situation, the designated colour from the Hue-Saturation Value colour system given in Non-Patent Literature 1 is registered in the look-up table of the image processing device, and a pixel group is extracted accordingly. However, when a person's body is the target of capture, the person's hand, arm, face, and neck may all appear within the frame image. In such circumstances, the pixel group may be extracted from each of the hand, arm, face, and neck, according to the look-up table described above, such that no accurate depth determination is possible. Thus, the light-emitting element 101b described in Embodiment 1 is used to illuminate a portion of the person's body that is to be the target of depth determination. The look-up table has a combination of a luminance Y, a red-difference Cr, and a blue-difference Cb for the illuminated portion registered therein as a luminance component, a red-difference component, and a blue-difference component. As such, the portion of the person's body that is the target of depth determination is constrained to being only a fingertip.

(Designated Colour Registration)

A plurality of colours representing the pattern of contrast formed on the surface of the stylus may be registered as designated colours, and histogram generation may proceed to generate an X-axis histogram and a Y-axis histogram according to the designated colours. The pattern of contrast may be any of a checkerboard pattern, a rainbow pattern, a lattice pattern, a barcode pattern, a QR Code™ and so on. As such, a plurality of designated colour combinations are registered in the look-up table, enabling objects of similar colours to be appropriately distinguished from the capture target.

(Scope of Mathematical Formulae and Calculation Process)

The various mathematical formulae given in the present description and the accompanying drawings do not represent mathematical concepts, but rather indicate numerical calculations realised by a computer. As such, any modifications or additions needed to enable execution thereof by the computer are applicable. For example, a saturate calculation or a conversion to positive values may be applied to the numerical values in order to treat said values as integers, as fixed point values, or as floating point values. Furthermore, in each of the Embodiments, the mathematical processing and computation based on the mathematical formulae is realised by a multiplier in read-only memory (hereinafter, ROM) using a constant ROM. The constant ROM contains a value computed in advance by taking the product of a multiplier and a constant. For example, when the multiplier has a 16-bit length, then the multiplier is divided into four 4-bit portions, and the product of the integer and each of the 4-bit portions, i.e., a multiple of a constant 0 through 15, is stored in the aforementioned constant ROM. The product of the above-described 4-bit portions and the 16-bit constant has a length of 20 bits. The four constants are thus stored at the same address, which is one word having a length of 20×4=80 bits. As described above, the calculations are performed by a multiplier in ROM. Thus, the calculations and computations described in the present description do not represent pure arithmetic calculations but instead include reading, from a recording medium, values obtained from the results of calculations stored on the recording medium or in ROM.

(Hardware Configuration of Image Processing Unit 15)

The histogram generator 24 is also realisable as a histogram generation circuit having the following hardware configuration. Specifically, the histogram generator 24 is realised by: a comparing circuit that compares the tone bit values of the luminance Y, the red-difference Cr, and the blue-difference Cb to the luminance Y, the red-difference Cr, and the blue-difference Cb in the look-up table for the designated colour; a counter circuit that increments a count every time the comparing circuit determines a match; and a writing circuit that writes the pixel coordinates and the count value to memory.

The histogram smoother 26 is also realisable as a histogram smoothing circuit having the following hardware configuration. Specifically, the histogram smoothing circuit includes an adder applying a predetermined weighting factor to values of neighbouring coordinates and summing the result, and a divider dividing the results produced by the adder by the number of pixels among the plurality of pixels. The above-described smoothing is thus achieved as a weighted average. As such, the histogram smoother is realizable by having an arithmetic circuit in a general purpose processor compute the following sum of products. The arithmetic circuit operates according to a multiplication instruction, and multiplies a value stored in a register by a coefficient likewise stored in the register. Meanwhile, a sum-product value stored in a register dedicated to sum-product results is extracted. Then, the multiplied value is added to the extracted sum-product value, and the register dedicated to sum-product results stores the new sum. The arithmetic circuit repeatedly executes the above-described operations. The register dedicated to sum-product results accumulates the sum-product values computed to date. Once a predetermined number of iterations of the multiplication process have been performed, the accumulated value in the register dedicated to sum-product results is transferred to the general-purpose register. The division operation is then performed, and the result thereof is a smoothed value.

The three-dimensional coordinates generator 28 is also realisable as a three-dimensional coordinates generation circuit having the following hardware configuration. Specifically, the three-dimensional coordinates generation circuit includes: a comparing circuit that performs a comparison of values for each of the coordinates; a register circuit that stores the largest value found through the comparison and a value based thereon; a ROM circuit that stores a plurality of depth values; and a selector circuit that selects an appropriate depth value among the depth values stored in the ROM circuit for output, according to the sum of the values.

(Depth Correction According to Capture Target Shape)

With regard to depth value determination, a depth value correction is beneficially performed according to the shape of the capture target. FIG. 32A illustrates a depth value correction for the orb. The left-hand side shows an example of a filmed image, and the middle shows a pixel group obtained when pixel group extraction is performed thereon using a designated colour. The surface area of the centroid illustrated on the right-hand side is then obtainable from a maximum value computed by generating an X-axis histogram and a Y-axis histogram from the extracted pixel group. The centroid is the basis of depth value determination. However, the depth value determination may also be made from a partial surface of the orb. FIG. 32B illustrates a correction process for the depth value of the pen tip. The left-hand side illustrates the pen tip of the stylus, and the middle illustrates an extracted image extracted from a filmed image of the pen tip. The right-hand side illustrates the centroid obtained from the maximum values of smoothed histograms generated from the extracted pixel group. As the centroid indicates, the shape of the pixel group for the pen tip is approximately an inverted triangle, and the centroid generated therefrom are longest on the bottom side. The bottom side corresponds to the pen tip. Thus, a correction equal to the length len1 of the bottom side is applied to the depth value $Z_m$ of the stylus. Furthermore, the angle θ formed by the bottom side of the centroid with respect to the left side or the right side is beneficially used. The angle θ satisfies the relation tan θ=len2/len1. Thus, the ratio of len2 to len1 is used as the angle θ, which indicates the tilt of the pen tip with respect to the X-Y plane when compared to the rotation angle of the pen tip itself. Using the angle θ for the depth value determination enables more intuitive operations of the pen tip.

(Continuously Adaptive Mean Shift Application)

The value of $X_m$ in the X-axis histogram and the value of $Y_m$ in the Y-axis histogram are usable for depth value determination through the application of a Continuously Adaptive Mean Shift (hereinafter, CAMSHIFT). The horizontal width and the vertical width of the centroid is determined by the values $h(X_m)$ and $h(Y_m)$. Thus, the values $h(X_m)$ and $h(Y_m)$ are used in Step 1 of CAMSHIFT to find the horizontal width and the vertical width of the centroid. This enables the realisation of depth value determination applicable to capturing a portion of a person.

(Integrated Circuit Application)

The image processing unit 15 is a semiconductor integrated circuit embedded within the display device. The image processing unit 15 may also be a system Large-Scale Integration (hereinafter, LSI) package mounted on a high-density substrate. The system LSI may be realised as a plurality of individual bare chips mounted on a high-density substrate, or may be a multi-chip module in which a plurality of bare chips are packaged so as to have the appearance of a single LSI. The integrated circuit architecture includes the following: (1) a front-end processing unit that is a pre-programmed Direct Memory Access (hereinafter, DMA) master circuit or similar, executing overall stream processing; (2) a signal processing unit made up of a Single Instruction, Multiple Data (hereinafter, SIMD) processor or similar, executing overall signal processing: (3) a back-end unit performing overall operations of pixel processing and image compositing, resizing, image format conversion, and audiovisual output; (4) a media interface that is an interface with a drive or network; and (5) a memory controller that is a slave circuit for memory access, executing reading and writing of packets and data according to a request from the front-end unit, the signal processing unit, and the back-end unit. In terms of package type, applicable types for a system LSI include a quad flat package (hereinafter, QFP) and a pin grid array (hereinafter, PGA). A QFP is a system LSI mounted with pins at the four sides thereof. A PGA is a system LSI mounted using a multitude of pins at the bottom face thereof.

As for the realisation of the integrated circuit, any of the following may be added as internal processing components: a conversion circuit converting a frame image, a pixel group, or a histogram into a desired format; a cache memory temporarily storing a data stream; a buffer memory performing a data transfer speed adjustment; an initialisation circuit reading a required program from ROM into Random-Access Memory (hereinafter, RAM) when power is initially supplied, thus initialising the integrated circuit; a power supply circuit supplying electric power according to the state of the histogram; a program manager managing, as a master program, a plurality of programs that correspond to components of the image processing device in an MPU of a control unit, and scheduling the programs according to a priority; and an interrupt handler generating an interrupt signal in response to external conditions such as a reset or a power supply interruption. Also, the video recorder, the rendering unit, and the platform unit may be unified into a whole.

(Embodiment as a Program)

A program representing the above-described Embodiments may be realised as follows. First, a software developer uses a programming language to write a source program for realising the flowcharts and functional elements of the Embodiments. The software developer writes the source program in accordance with the syntax of a programming language, using class structures, variables, array variables, and calls to outside functions.

The resulting source program is then passed to a complier as a file. The compiler generates an object program by translating the source program.

The translation by the compiler involves steps of syntax analysis, optimization, resource allocation, and code generation. Syntax analysis is parsing the syntax and meaning of the source program through character analysis, thus conversing the source program into an intermediate program. Optimization is performing operations on the intermediate program to convert the program into basic blocks, and to analyse the control flow and data flow. Resource allocation is allocating variables in the intermediate program to a register or memory usable by a processor targeted thereby, so as to supply the appropriate resources for a processer targeted by an instruction set. Code generation is converting intermediate instructions in the intermediate program into program code to obtain the object program.

The object program thus generated is made up of one or more pieces of program code that cause a computer to execute individual steps of the flowcharts described in the above Embodiments, or to realise operations corresponding to the individual functional components. The program code is the processor's native code, Java™ bytecode, or some other type of code. The steps may be executed through the program code in various ways. When a call to an external function is made to realise the steps, the program code is a call statement calling the appropriate function. Alternatively, when the program code itself realises a single step, each corresponding piece of code belongs to a separate object program. For a Reduced Instruction Set Computing (hereinafter, RISC) processor in which types of instructions are restricted, arithmetic calculation instructions, logical calculation instructions, branch instructions, and so on are combined to realise the steps of the flowcharts. When the object program is generated, the programmer places linkers thereto. A linker spatially allocates the object programs and the relevant library programs so as to link them as one and generate a load module. The load module so generated is intended to be read by a computer. The computer is thus made to execute the steps of the flowcharts and the functions of the components. The computer program is recorded on a non-volatile computer readable recording medium and distributed to a user.

(Network Applications)

The display device and the image processing device may be connected via a network. In such a situation, the image processing device receives frame images captured by the camera of the display device via the network, and performs three-dimensional coordinates therewith. The three-dimensional coordinates so generated are then output to the display device. An application being executed by the display device performs operations triggered by the three-dimensional coordinates. A time code may be associated with the three-dimensional coordinates generated by the image processing device. The time code associated with the three-dimensional coordinates specifies a playback timestamp of the frame image used as the basis for three-dimensional coordinates generation. The application is able to reference the timecode so as to ignore three-dimensional coordinates generated from an old frame image, or so as to skip through a subset of three-dimensional coordinates generated as burst over a short period.

INDUSTRIAL APPLICABILITY

The image processing device, integrated circuit, and image processing program pertaining to the present invention are applicable to enabling extraction of three-dimensional positioning information relating to a specific object from a video using few calculations, and further applicable to the development of a remote control system for a camera-bearing device.

REFERENCE SIGNS LIST

12 Filming unit
24 Histogram generator
26 Histogram smoother
28 Three-dimensional coordinates generator

The invention claimed is:

1. An image processing device determining a depth of a target object in real space by performing image processing, the image processing device comprising:
   a generator generating an X-axis histogram for a designated color and a Y-axis histogram for the designated color, the X-axis histogram indicating a pixel count at each of a plurality of coordinates along an X-axis, the Y-axis histogram indicating a pixel count at each of a plurality of coordinates along a Y-axis, the X-axis and the Y-axis being axes of a screen, a pixel count at a given coordinate indicating the number of pixels having the designated color at the given coordinate in frame image data obtained by filming the real space;
   a smoother performing smoothing of the X-axis histogram and the Y-axis histogram to acquire a smoothed X-axis histogram and a smoothed Y-axis histogram, respectively; and
   a depth determiner determining three-dimensional coordinates of the target object using the smoothed X-axis histogram and the smoothed Y-axis histogram, wherein
   the three-dimensional coordinates are expressed as (Xu, Yu, f(h1(Xu), h2(Yu))) when Xu is an X coordinate in the smoothed X-axis histogram, h1(Xu) is a pixel count at the coordinate Xu, Yu is a Y coordinate in the smoothed Y-axis histogram, h2(Yu) is a pixel count at the coordinate Yu, and f(h1(Xu), h2(Yu)) is a function for determining a Z coordinate from the pixel count h1(Xu) and the pixel count h2(Yu),
   the pixel count h1(Xu) and the pixel count h2(Yu) determine a centroid intersecting at a center of the target object,
   the function f(h1(Xu), h2(Yu)) determines the Z coordinate of the target object based on a length of the centroid determined by the X-axis histogram and the Y-axis histogram,
   the smoothing for the smoothed X-axis histogram and the smoothed Y-axis histogram involves applying an impulse response convolution to pixel counts at the coordinates in the X-axis histogram and pixel counts at the coordinates in the Y-axis histogram,
   the smoothed X-axis histogram includes a peak pixel count at the center along the X-axis and pixel counts approaching zero at edges along the X-axis, and the smoothed Y-axis histogram includes a peak pixel count at the center along the Y-axis and pixel counts approaching zero at edges along the Y-axis,
   an impulse response I[n] used in the impulse response convolution is obtained by converting a frequency response H(w),
   the impulse response I[n] is obtained by:

(Math 1)

$$I[n] = \text{DTFT}^{-1}[H(w)]$$

where DTFT denotes a discrete-time Fourier transform, and the impulse response continues from 0 to M in terms of the X coordinates and an output I[n]*x[n] of the impulse response convolution applied to an nth X coordinate x[n] among coordinates 0 through M is calculated as:

(Math 2)

$$I[n] * x[n] = \sum_{m=0}^{M} I[m]x[n-m],$$

and I[n] is defined as:

(Math 3)

$$I[n] = \begin{cases} I^n, & n \geq 0 \\ 0, & \text{otherwise} \end{cases}.$$

2. The image processing device of claim 1, wherein the pair of the coordinate Xu and the coordinate Yu is either a pair composed of a coordinate associated with a maximum pixel count in the smoothed X-axis histogram and a coordinate associated with a maximum pixel count in the smoothed Y-axis histogram or a pair composed of a coordinate associated with a second-highest or lower pixel count in the smoothed X-axis histogram and a coordinate associated with a second-highest or lower pixel count in the smoothed Y-axis histogram.

3. The image processing device of claim 1, wherein the designated color is designated by a combination of pixel components including a luminance component and a color-difference component, the image processing device further comprises a pixel group extractor extracting, among pixels in the frame image data, a group of pixels that match the combination of the luminance component and the color-difference component, the extracted pixels associated with the plurality of coordinates along the X-axis and the plurality of coordinates along the Y-axis, and the generator generates the X-axis histogram by associating, with each of the plurality of coordinates along the X-axis, a number of pixels in the pixel group that are associated with the coordinates along the X-axis and generates the Y-axis histogram by associating, with each of the plurality of coordinates along the Y-axis, a number of pixels in the pixel group that are associated with the coordinates along the Y-axis.

4. The image processing device of claim 1, wherein the designated color is designated by a combination of pixel components including a plurality of primary color luminance components, the image processing device further comprises a pixel group extractor extracting, among pixels in the frame image data, a group of pixels that match the combination of the primary color luminance components, the extracted pixels associated with the plurality of coordinates along the X-axis and the plurality of coordinates along the Y-axis, and the generator generates the X-axis histogram by associating, with each of the plurality of coordinates along the X-axis, a number of pixels in the pixel group that are associated with the coordinates along the X-axis and generates the Y-axis histogram by associating, with each of the plurality of coordinates along the Y-axis, a number of pixels in the pixel group that are associated with the coordinates along the Y-axis.

5. The image processing device of claim 1, wherein the target object in real space is an operation member for operating a stereoscopic object projecting from the screen through a stereoscopic effect of a stereoscopic viewing device, and the three-dimensional coordinates (Xu, Yu, f(h1(Xu), h2(Yu))) are used by the stereoscopic viewing device for generating an event which changes behavior of the stereoscopic object.

6. The image processing device of claim 1, wherein the designated color is a color of a colored substance that protrudes from a tip of an operation body when the operation body is manipulated by a user.

7. The image processing device of claim 1, wherein processing including determining a size of a window by using the function f(h1(Xu), h2(Yu) by taking a width and the length of the centroid, mapping of the window at a location in the frame image data, and a process related to pixels surrounded by the window is repeated.

8. An image processing device, comprising a pixel group extractor extracting, among pixels in the frame image data, a group of pixels of a designated color from each of an X-axis and a Y-axis, the X-axis and the Y-axis being axes of a screen;

a smoother performing smoothing of pixel values of the pixels in the pixel group from each of the X-axis and the Y-axis to acquire a smoothed pixel group;

a generator generating an X-axis histogram indicating a pixel count at each of a plurality of coordinates along the X-axis and a Y-axis histogram indicating a pixel count at each of a plurality of coordinates along the Y-axis, a pixel count at a given coordinate indicating the number of pixels at the given coordinate in the smoothed pixel group; and a depth determiner determining three-dimensional coordinates of the target object using the X-axis histogram and the Y-axis histogram, wherein the three-dimensional coordinates are expressed as (Xu, Yu, f(h1(Xu), h2(Yu))) when Xu is an X coordinate in the X-axis histogram, h1(Xu) is a pixel count at the coordinate Xu, Yu is a Y coordinate in the Y-axis histogram, h2(Yu) is a pixel count at the coordinate Yu, and f(h1(Xu), h2(Yu)) is a function for determining a Z coordinate from the pixel count h1(Xu) and the pixel count h2(Yu), the pixel count h1(Xu) and the pixel count h2(Yu) determine a centroid intersecting at a center of the target object, the function f(h1(Xu), h2(Yu)) determines the Z coordinate of the target object based on a length of the centroid determined by the X-axis histogram and the Y-axis histogram, the smoothing for the smoothed pixel group involves applying an impulse response convolution to the pixel values of the pixels in the pixel group from each of the X-axis and the Y-axis, an impulse response I[n] used in the impulse response convolution is obtained by converting a frequency response H(w), the impulse response I[n] is obtained by:

(Math 1)

$$I[n] = \text{DTFT}^{-1}[H(w)]$$

where DTFT denotes a discrete-time Fourier transform, and the impulse response continues from 0 to M in terms of the X coordinates and an output I[n]*x[n] of the impulse response convolution applied to an nth X coordinate x[n] among coordinates 0 through M is calculated as:

(Math 2)

$$I[n] * x[n] = \sum_{m=0}^{M} I[m]x[n-m], \quad \text{(Math 2)}$$

and I[n] is defined as:

(Math 3)

$$I[n] = \begin{cases} I^n, & n \geq 0 \\ 0, & \text{otherwise} \end{cases}. \quad \text{(Math 3)}$$

9. A stereoscopic viewing device used with the image processing device of claim 1, comprising:

an execution unit executing an application;

a playback unit performing playback of stereoscopic video in accordance with an instruction from the application; and an event manager generating an event in response to a user operation, the event indicating the three-dimensional coordinates determined by the image processing device, wherein the application causes the playback unit to change playback content of the stereoscopic viewing device according to the event.

10. The stereoscopic viewing device of claim 9, wherein the stereoscopic video is one of a multi-view video stream and graphics rendered by the application, and the change of the playback content is one of a change in the multi-view video stream and a change in the graphics that are played back.

11. An integrated circuit determining a depth of a target object in real space by performing image processing, the integrated circuit comprising:
  a generator generating an X-axis histogram for a designated color and a Y-axis histogram for the designated color, the X-axis histogram indicating a pixel count at each of a plurality of coordinates along an X-axis, the Y-axis histogram indicating a pixel count at each of a plurality of coordinates along a Y-axis, the X-axis and the Y-axis being axes of a screen, a pixel count at a given coordinate indicating the number of pixels having the designated color at the given coordinate in frame image data obtained by filming the real space;
  a smoother performing smoothing of the X-axis histogram and the Y-axis histogram to acquire a smoothed X-axis histogram and a smoothed Y-axis histogram, respectively; and
  a depth determiner determining three-dimensional coordinates of the target object using the smoothed X-axis histogram and the smoothed Y-axis histogram, wherein
  the three-dimensional coordinates are expressed as (Xu, Yu, f(h1(Xu), h2(Yu))) when Xu is an X coordinate in the smoothed X-axis histogram, h1(Xu) is a pixel count at the coordinate Xu, Yu is a Y coordinate in the smoothed Y-axis histogram, h2(Yu) is a pixel count at the coordinate Yu, and f(h1(Xu), h2(Yu)) is a function for determining a Z coordinate from the pixel count h1(Xu) and the pixel count h2(Yu),
  the pixel count h1(Xu) and the pixel count h2(Yu) determine a centroid intersecting at a center of the target object,
  the function f(h1(Xu), h2(Yu)) determines the Z coordinate of the target object based on a length of the centroid determined by the X-axis histogram and the Y-axis histogram,
  the smoothing for the smoothed X-axis histogram and the smoothed Y-axis histogram involves applying an impulse response convolution to pixel counts at the coordinates in the X-axis histogram and pixel counts at the coordinates in the Y-axis histogram,
  the smoothed X-axis histogram includes a peak pixel count at the center along the X-axis and pixel counts approaching zero at edges along the X-axis, and the smoothed Y-axis histogram includes a peak pixel count at the center along the Y-axis and pixel counts approaching zero at edges along the Y-axis,
  an impulse response I[n] used in the impulse response convolution is obtained by converting a frequency response H(w),
  the impulse response I[n] is obtained by:
(Math 1)

$$I[n] = \text{DTFT}^{-1}[H(w)]$$

where DTFT denotes a discrete-time Fourier transform, and
  the impulse response continues from 0 to M in terms of the X coordinates and an output I[n]*x[n] of the impulse response convolution applied to an nth X coordinate x[n] among coordinates 0 through M is calculated as:
(Math 2)

$$I[n] * x[n] = \sum_{m=0}^{M} I[m]x[n-m],$$

and I[n] is defined as:
(Math 3)

$$I[n] = \begin{cases} I^n, & n \geq 0 \\ 0, & \text{otherwise} \end{cases}.$$

12. A non-transitory recording medium recording thereon an image processing program causing a computer to execute processing for determining a depth of a target object in real space by performing image processing, the image processing program causing the computer to execute:
  generating an X-axis histogram for a designated color and a Y-axis histogram for the designated color, the X-axis histogram indicating a pixel count at each of a plurality of coordinates along an X-axis, the Y-axis histogram indicating a pixel count at each of a plurality of coordinates along a Y-axis, the X-axis and the Y-axis being axes of a screen, a pixel count at a given coordinate indicating the number of pixels having the designated color at the given coordinate in frame image data obtained by filming the real space;
  smoothing the X-axis histogram and the Y-axis histogram to acquire a smoothed X-axis histogram and a smoothed Y-axis histogram, respectively; and
  determining three-dimensional coordinates of the target object using the smoothed X-axis histogram and the smoothed Y-axis histogram, wherein
  the three-dimensional coordinates are expressed as (Xu, Yu, f(h1(Xu), h2(Yu))) when Xu is an X coordinate in the smoothed X-axis histogram, h1(Xu) is a pixel count at the coordinate Xu, Yu is a Y coordinate in the smoothed Y-axis histogram, h2(Yu) is a pixel count at the coordinate Yu, and f(h1(Xu), h2(Yu)) is a function for determining a Z coordinate from the pixel count h1(Xu) and the pixel count h2(Yu),
  the pixel count h1(Xu) and the pixel count h2(Yu) determine a centroid intersecting at a center of the target object,
  the function f(h1(Xu), h2(Yu)) determines the Z coordinate of the target object based on a length of the centroid determined by the X-axis histogram and the Y-axis histogram,
  the smoothing for the smoothed X-axis histogram and the smoothed Y-axis histogram involves applying an impulse response convolution to pixel counts at the coordinates in the X-axis histogram and pixel counts at the coordinates in the Y-axis histogram,
  the smoothed X-axis histogram includes a peak pixel count at the center along the X-axis and pixel counts approaching zero at edges along the X-axis, and the smoothed Y-axis histogram includes a peak pixel count at the center along the Y-axis and pixel counts approaching zero at edges along the Y-axis, an impulse response I[n] used in the impulse response convolution is obtained by converting a frequency response H(w), the impulse response I[n] is obtained by:

(Math 1)

$$I[n] = DTFT^{-1}[H(w)]$$

where DTFT denotes a discrete-time Fourier transform, and the impulse response continues from 0 to M in terms of the X coordinates and an output I[n]*x[n] of the impulse response convolution applied to an nth X coordinate x[n] among coordinates 0 through M is calculated as:

(Math 2)

$$I[n] * x[n] = \sum_{m=0}^{M} I[m]x[n-m], \quad \text{(Math 2)}$$

and I[n] is defined as:

(Math 3)

$$I[n] = \begin{cases} I^n, & n \geq 0 \\ 0, & \text{otherwise} \end{cases}. \quad \text{(Math 3)}$$

* * * * *